US009206815B2

(12) United States Patent
Shiraichi et al.

(10) Patent No.: US 9,206,815 B2
(45) Date of Patent: Dec. 8, 2015

(54) FAN, MOLDING DIE, AND FLUID FEEDER

(75) Inventors: Yukishige Shiraichi, Osaka (JP);
Masaki Ohtsuka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 570 days.

(21) Appl. No.: 13/634,480

(22) PCT Filed: Mar. 7, 2011

(86) PCT No.: PCT/JP2011/055225
§ 371 (c)(1),
(2), (4) Date: Sep. 12, 2012

(87) PCT Pub. No.: WO2011/114925
PCT Pub. Date: Sep. 22, 2011

(65) Prior Publication Data
US 2013/0004329 A1 Jan. 3, 2013

(30) Foreign Application Priority Data

Mar. 15, 2010 (JP) .................................. 2010-057669
Mar. 15, 2010 (JP) .................................. 2010-057675
Mar. 15, 2010 (JP) .................................. 2010-057677

(51) Int. Cl.
*F04D 29/30* (2006.01)
*F04D 29/28* (2006.01)
(Continued)

(52) U.S. Cl.
CPC .............. *F04D 29/282* (2013.01); *F04D 17/04* (2013.01); *F04D 29/30* (2013.01); *F04D 29/666* (2013.01);
(Continued)

(58) Field of Classification Search
CPC ... F04D 29/002; F04D 29/281; F04D 29/282; F04D 29/283; F04D 29/30; F04D 17/04; F05D 2240/306; F05D 2250/711; F05D 2250/712; F05D 2250/713
See application file for complete search history.

(56) References Cited

U.S. PATENT DOCUMENTS

| 3,306,528 | A | * | 2/1967 | Eck | ............................... | 415/116 |
| 4,531,890 | A | * | 7/1985 | Stokes | .......................... | 416/187 |
| 4,900,228 | A | * | 2/1990 | Yapp | ............................. | 416/183 |
| 2007/0084235 | A1 | | 4/2007 | Okazawa et al. | | |

FOREIGN PATENT DOCUMENTS

JP    10-299694 A    11/1998
JP    2000-9083 A    1/2000
(Continued)

OTHER PUBLICATIONS
Chinese Office Action mailed Oct. 21, 2014 for related Application No. 201180013707.0 with an English translation.

*Primary Examiner* — Ninh H Nguyen
(74) *Attorney, Agent, or Firm* — Birch, Stewart, Kolasch & Birch, LLP

(57) ABSTRACT

A centrifugal fan includes a plurality of fan blades arranged spaced apart from each other in a circumferential direction. The fan blade has an inner edge portion disposed on an inner peripheral side and an outer edge portion disposed on an outer peripheral side. The fan blade has a blade surface including a pressure surface and a suction surface. When cut along a plane orthogonal to a rotation axis of the fan, the fan blade has a blade cross section having concave portions formed at the pressure surface and the suction surface. A plurality of fan blades include fan blades having blade cross sections of different shapes. With such a configuration, the fan has an excellent air-blowing capacity while preventing noise. A molding die for use in production of the fan and a fluid feeder including the fan are also provided.

13 Claims, 49 Drawing Sheets

(51) Int. Cl.
  *F04D 17/04* (2006.01)
  *F04D 29/66* (2006.01)
  *B29C 45/26* (2006.01)
  *B29L 31/08* (2006.01)

(52) U.S. Cl.
  CPC ............ *B29C 45/26* (2013.01); *B29L 2031/08* (2013.01); *F05D 2240/305* (2013.01); *F05D 2240/306* (2013.01); *F05D 2250/711* (2013.01); *F05D 2250/712* (2013.01); *F05D 2250/713* (2013.01)

(56) References Cited

FOREIGN PATENT DOCUMENTS

| | | | |
|---|---|---|---|
| JP | 2000240590 A * | 9/2000 | ............ F04D 29/30 |
| JP | 2006-170043 A | 6/2006 | |
| JP | 2006-329099 A | 12/2006 | |
| JP | 2008-241188 A | 1/2008 | |
| KR | 10-2000-0012664 A | 3/2000 | |
| SU | 1740793 A2 | 6/1992 | |

* cited by examiner

FAN, MOLDING DIE, AND FLUID FEEDER

TECHNICAL FIELD

The present invention generally relates to a fan, a molding die, and a fluid feeder, and more particularly to a fan such as a centrifugal fan and a cross-flow fan, a molding die for use in production of the fan, and a fluid feeder provided with the centrifugal fan.

BACKGROUND ART

As for a conventional fan, for example, Japanese Patent Laying-Open No. 2008-241188 discloses a cross-flow blower aimed at reducing separation of the flow-in air while preventing a surging phenomenon or a reverse intake phenomenon by making the distribution of flow rate uniform in the unit even when resistance is adhered on the upstream side of the blower (PTL 1). The cross-flow blower disclosed in PTL 1 has a plurality of first blades each having an outer peripheral thickness greater than an inner peripheral thickness and a plurality of second blades each having an inner peripheral thickness greater than an outer peripheral thickness. The first blades and the second blades are disposed in order in the circumferential direction. When two first blades are in succession in the circumferential direction, the second blades are arranged on opposite sides of those first blades. When two second blades are in succession in the circumferential direction, the first blades are arranged on opposite sides of those second blades.

Japanese Patent Laying-Open No. 2006-170043 discloses a cross-flow fan aimed at reducing NZ noises while preventing reduction of air-blowing capacity and noise resulting from fluid oscillation (PTL 2). In the cross-flow fan disclosed in PTL 2, two or more kinds of blades having different shapes are arranged at random with a constant installation angle and installation pitch.

CITATION LIST

Patent Literature

PTL 1: Japanese Patent Laying-Open No. 2008-241188
PTL 2: Japanese Patent Laying-Open No. 2006-170043

SUMMARY OF INVENTION

Technical Problem

In recent years, for conservation of global environment, further energy savings in home electric equipment are desired. For example, it is known that the efficiency of electric equipment such as an air conditioner and an air purifier greatly depends on the efficiency of a blower included therein. It is also known that reducing the weight of a fan blade provided as a rotating body in a blower reduces power consumption of a motor for rotatably driving the fan blade and improves the efficiency of the blower or a fluid feeder.

However, an aerofoil employed as the shape in cross section of a fan blade is essentially assumed to be applied to the wing of an air plane and is mainly found in the field of aeronautical engineering. Therefore, an aerofoil fan blade is mainly optimized in a high Reynolds number region and is not always appropriate as the cross section of a fan blade used in a low Reynolds number region for an air conditioner, an air purifier, etc. for home use.

When an aerofoil or double arc is employed as the cross-sectional shape of a fan blade, a thick portion exists in a range of 30 to 50% from the front edge of the fan blade. This increases the weight of the fan blade, which becomes a cause of increased friction loss during rotation. However, simply reducing the weight of a fan blade may reduce the strength of the fan blade and result in fracture or other poor quality.

For the reasons above, in order to improve the blowing capacity of the fan and to save energy in electric equipment such as an air conditioner and an air purifier for home use, an appropriate blade cross-sectional shape has been sought for a fan blade to be used in the low Reynolds number region. A blade cross-sectional shape with a high lift-drag ratio, a small thickness and weight, and a high strength has also been sought.

On the other hand, in a case where fan blades whose blade cross sections are in a single shape are disposed at regular pitches (intervals), the blade ends of the fan blades pass through at a constant cycle when the fan is rotated. In this case, pressure variations occur in constant cycles at an approach place where the fan blades approach a casing covering them. This causes narrow-band noise called a blade-passing sound (nZ sound: a sound having a frequency determined by a value obtained by multiplying a natural number n by the number of fan blades Z). In the case where the fan blades whose blade cross sections are in a single shape are disposed at regular pitches, almost the same air flow is generated between adjacent fan blades. In this case, turbulent noise resulting from the air flow between adjacent fan blades becomes uniform among a plurality of fan blades, causing narrow-band noise.

In order to solve this problem, a random-pitch fan may be adopted, in which a plurality of fan blades are disposed at random. However, when a random-pitch fan is adopted, the intervals between adjacent fan blades have to be determined so as to intentionally include a large interval and a small interval departing from the optimum value based on the requested blowing performance.

In this case, at a place where the interval between adjacent fan blades is relatively large, the air flow against the normal air flow on the blade surface may be partially formed so that the air flow between adjacent fan blades becomes unstable. As a result, low-frequency noise (abnormal sound) like a bubbling sound is produced to give users unpleasant harsh sound. Such abnormal sound is not so loud at low rotation speeds of the fan, but becomes louder at higher rotation speeds of the fan, and finally becomes so loud as to vibrate the casing of the fan as a whole.

On the other hand, at a place where the interval between adjacent fan blades is relatively small, the flow resistance of the air flow passing through on the blade surface of the fan blade increases. As a result, the blowing capacity of the fan may be deteriorated.

Next, the blowing capacity of the blower has to be improved in order to promote energy savings in electric equipment because the efficiency of electric equipment greatly depends on the efficiency of the blower included therein.

Examples of the fan for use in a blower include a cross-flow fan which forms a flat outlet flow parallel to the rotation axis of the fan, and a centrifugal fan which blows air radially from the rotational center of the fan. In order to achieve a suitable blowing capacity in the blower using such a fan, a scroll shape (spiral shape) molded on the outlet side of the fan casing should be adapted to the direction of the airflow output from the fan.

For example, in a case where the scroll shape formed in the fan casing expands radially outward with respect to the direction of the airflow, the airflow may not conform to the scroll shape on the path in the fan casing and may be separated from the surface of the fan casing formed in a scroll shape. On the other hand, in a case where the scroll shape formed in the fan casing narrows radially inward with respect to the direction of the airflow, the direction of the airflow is abruptly deflected by the surface of the fan casing formed in a scroll shape. In these cases, the blowing efficiency is reduced, and the blowing capacity of the blower cannot be improved.

On the other hand, electric equipment such as an air conditioner and an air purifier requires quietness in operation, and it is therefore necessary to reduce noise resulting from rotation of the fan.

However, in the case where fan blades whose blade cross sections are in a single shape are disposed at regular pitches (intervals), the blade ends of the fan blades pass through in constant cycles as the fan is rotated. In this case, pressure variations occur at a constant cycle in the inside of the fan casing. This causes narrow-band noise called a blade-passing sound (nZ sound: a sound having a frequency determined by a value obtained by multiplying a natural number n by the number of fan blades Z).

In a cross-flow fan or a centrifugal fan, as the fan blades are rotated, the air flows in between adjacent fan blades and flows on the blade surface. Then, the air flowing on the blade surface flows out from between adjacent fan blades to be output from the fan. In order to achieve a suitable blowing capacity in the blower using such a fan, the air flow between adjacent fan blades has to be stabilized.

On the other hand, electric equipment such as an air conditioner and an air purifier requires quietness in operation, and it is therefore necessary to reduce noise resulting from rotation of the fan.

However, in the case where fan blades whose blade cross sections are in a single shape are disposed at regular pitches (intervals), the blade ends of the fan blades pass through at a constant cycle as the fan is rotated. In this case, pressure variations occur in constant cycles in the inside of the fan casing. This causes narrow-band noise called a blade-passing sound (nZ, sound: a sound having a frequency determined by a value obtained by multiplying a natural number n by the number of fan blades Z).

An object of the present invention is therefore to solve the problem above and to provide a fan with excellent blowing capacity while preventing noise, a molding die for use in production of the fan, and a fluid feeder provided with the fan.

Solution to Problem

A fan according to an aspect of the present invention includes a plurality of blade portions arranged spaced apart from each other in a circumferential direction. Each blade portion has an inner edge portion disposed on an inner peripheral side thereof and an outer edge portion disposed on an outer peripheral side thereof. The blade portion extends between the inner edge portion and the outer edge portion. The blade surface includes a pressure surface disposed on a rotational direction side of the fan and a suction surface disposed on a back side of the pressure surface. As the fan is rotated, a fluid flow is produced on the blade surface to flow between the inner edge portion and the outer edge portion. When cut along a plane orthogonal to a rotation axis of the fan, the blade portion has a blade cross section having concave portions formed at the pressure surface and the suction surface. A plurality of blade portions include a first blade portion and a second blade portion having blade cross sections of different shapes.

According to such a configuration of the fan, during rotation of the fan, an air flow is produced to flow in from one of the inner edge portion and the outer edge portion, pass through on the blade surface, and flow out from the other of the inner edge portion and the outer edge portion. Here, a vortex of air flow (secondary flow) is generated in the concave portion, whereby the air flow (main flow) passing through on the blade surface flows along the outside of the vortex generated in the concave portion. Accordingly, the blade portion exhibits like a thick blade as if the thickness of the blade cross section is increased by the amount of formation of the vortex. As a result, the blowing capacity of the fan can be improved.

In the present invention, a plurality of blade portions include a first blade portion and a second blade portion having blade cross sections of different shapes. The static pressure distribution at the pressure surface and the suction surface of each blade portion is affected by the shape of the blade cross section. Therefore, in this configuration, the air flow between the adjacent blade portions and the air flow that flows in/out between the adjacent blade portions vary among the blade portions. Accordingly, noise can be reduced.

Preferably, the first blade portion and the second blade portion are different from each other in positions of the concave portions. According to such a configuration of the fan, the shape of the blade cross section can be varied by changing the positions of the concave portions.

Preferably, the first blade portion and the second blade portion are different from each other in number of the concave portions. According to such a configuration of the fan, the shape of the blade cross section can be varied by changing the number of the concave portions.

Preferably, the first blade portion and the second blade portion are different from each other in shape of the concave portions. According to such a configuration of the fan, the shape of the blade cross section can be varied by changing the shape of the concave portion.

Preferably, a plurality of blade portions are arranged such that an angle of a line connecting the rotation axis of the fan with the outer edge portion is equal between the adjacent blade portions.

According to such a configuration of the fan, although the outer edge portions of the blade portions pass through in constant cycles as the fan is rotated, the air flow that flows in/out between the adjacent blade portions is varied among blade portions, thereby preventing noise. In addition, because of reduction of noise, the interval between the adjacent blade portions can be set to an optimum value based on the blowing capacity required for the fan. Accordingly, the air flow between the blade portions can be stabilized, thereby preventing abnormal sound. An increase in ventilation resistance to the air flow between the blade portions can be prevented, thereby increasing the blowing capacity of the fan.

Preferably, a plurality of blade portions are arranged such that an angle of a line connecting the rotation axis of the fan with a centroid of the blade cross section of the blade portion is equal between the adjacent blade portions.

According to such a configuration of the fan, although turbulence noise caused by the air flow between the adjacent blade portions is uniform among a plurality of blade portions, the air flow between the adjacent blade portions is varied among the blade portions, thereby preventing noise. Because of reduction of noise, the interval between the adjacent blade portions can be set to an optimum value based on the blowing capacity required for the fan. Accordingly, the air flow between the blade portions can be stabilized, thereby preventing abnormal sound. An increase in ventilation resistance to the air flow between the blade portions can be prevented, thereby increasing the blowing capacity of the fan.

Preferably, plural kinds of the blade portions having blade cross sections of different shapes are arranged to be placed in an irregular order. According to such a configuration of the fan, the air flow between the adjacent blade portions and the air flow that flows in/out between the adjacent blade portions can be varied more effectively among a plurality of blade portions.

Preferably, the concave portion formed at the pressure surface forms a convex portion at the suction surface, and the concave portion formed at the suction surface forms a convex portion at the pressure surface. According to such a configuration of the fan, the shape of the blade cross section having the concave portions at the pressure surface and the suction surface can be obtained with a simple configuration.

Preferably, the blade portion has a blade cross section having a constant thickness between the inner edge portion and the outer edge portion. According to such a configuration of the fan, even when the blade portion having a blade cross section of a constant thickness is used, the blowing capacity of the fan can be improved.

Preferably, the blade portion has flection portions at which a center line of the blade cross section between the pressure surface and the suction surface is flexed at different points. The concave portions are formed of the flection portions. According to such a configuration of the fan, the strength of the blade portion can be increased by forming the flection portions.

An inside space is formed inside a plurality of blade portions arranged in the circumferential direction, and an outside space is formed outside thereof. Preferably, the fan described above is a centrifugal fan that outputs fluid from the inside space to the outside space. According to such a configuration of the fan, the blowing capacity of the centrifugal fan can be improved while noise can be prevented effectively.

An inside space is formed inside a plurality of blade portions arranged in the circumferential direction, and an outside space is formed outside thereof. Preferably, the fan described above is a cross-flow fan that takes in fluid to the inside space from the outside space on one side with respect to the rotation axis, as viewed from a direction of the rotation axis of the fan, and outputs the taken-in fluid to the outside space on the other side with respect to the rotation axis. According to such a configuration of the fan, the blowing capacity of the cross-flow fan can be improved while noise can be prevented effectively.

The fan described above is formed of resin. A molding die according to an aspect of the present invention is used to mold the fan. The molding die configured in this manner can produce a resin fan.

A fluid feeder according to an aspect of the present invention includes a blower configured with the fan described above and a driving motor coupled to the fan to rotate a plurality of blade portions. The fluid feeder configured in this manner can reduce power consumption of the driving motor while keeping the blowing capacity high.

A fan according to another aspect of the present invention includes a plurality of blade portions arranged spaced apart from each other in a circumferential direction. Each blade portion has a blade surface including a pressure surface disposed on a rotational direction side of the fan and a suction surface disposed on a back side of the pressure surface. When cut along a plane orthogonal to a rotation axis of the fan, the blade portion has an inner edge portion at which a center line between the pressure surface and the suction surface intersects an inner peripheral-side blade tip, and an outer edge portion at which the center line intersects an outer peripheral-side blade tip. As the fan is rotated, a fluid flow is produced on the blade surface to flow between the inner edge portion and the outer edge portion.

An angle between a straight line passing through a rotational center of the fan and the outer edge portion and a tangent of the center line at the outer edge portion is defined as an outer peripheral blade tip angle. An angle between a straight line passing through the rotational center of the fan and the inner edge portion and a tangent of the center line at the inner edge portion is defined as an inner peripheral blade tip angle. An angle between a chord line in contact with the inner peripheral-side and outer peripheral-side blade tips on the pressure surface side, and a straight line passing through the rotational center of the fan and a contact point of the chord line with the outer peripheral-side blade tip is defined as a discrepancy angle. In this case, a plurality of blade portions include a first blade portion and a second blade portion different from each other in at least one of the outer peripheral blade tip angle and the inner peripheral blade tip angle. A plurality of blade portions are provided such that the discrepancy angle of each blade portion is equal among a plurality of blade portions.

In such a configuration of the fan, the direction in which fluid passing through on the blade surface is output from the fan (hereinafter also referred to as a blowing direction of fluid) is mainly determined by the discrepancy angle of the blade portion. Therefore, a plurality of blade portions are provided such that the discrepancy angles of the blade portions are equal to each other, whereby the discrepancy angle can be set such that the blowing direction of fluid is optimized, and the blowing direction of fluid can be prevented from varying among a plurality of blade portions. Accordingly, the blowing capacity of the fan can be improved.

A plurality of blade portions include the first blade portion and the second blade portion different from each other in at least one of the outer peripheral blade tip angle and the inner peripheral blade tip angle. Accordingly, on at least one of the inner peripheral side and the outer peripheral side of the blade portion, the cycle of the blade tip passing through can be actively shifted between the first blade portion and the second blade portion. Thus, pressure variations caused by passage of the blade tips are brought into irregular cycles, thereby preventing noise resulting from pressure variations.

Preferably, the first blade portion and the second blade portion are equal in height of the blade portion with reference to the chord line. According to such a configuration of the fan, variations in interval between the adjacent blade portions due to a difference in height of the blade portions are not produced. Therefore, the interval between the adjacent fan blades can be optimized. Accordingly, the air flow between the blade portions can be stabilized thereby preventing abnormal sound. An increase in circulation resistance of fluid between the blade portions can be prevented thereby increasing the blowing capacity of the fan.

Preferably, the blade portion has flection portions at which the center line is flexed at different points between the inner edge portion and the outer edge portion. The first blade portion and the second blade portion are different from each other in flection angle at the flection portion. According to such a configuration of the fan, at least one of the outer peripheral blade tip angle and the inner peripheral blade tip angle is varied between the first blade portion and the second blade portion by changing the flection angle at the flection portion.

Preferably, plural kinds of the blade portions different from each other in at least one of the outer peripheral blade tip angle and the inner peripheral blade tip angle are arranged to be placed in an irregular order. According to such a configuration of the fan, the cycle of the blade tip passing through can be shifted among a plurality of blade portions more effectively. Accordingly, noise caused by rotation of the fan can be significantly reduced.

An inside space is formed inside a plurality of blade portions arranged in the circumferential direction, and an outside space is formed outside thereof. Preferably, the fan is a cross-flow fan that takes in fluid to the inside space from the outside space on one side with respect to the rotation axis, as viewed from a direction of the rotation axis of the fan, and outputs the taken-in fluid to the outside space on the other side with respect to the rotation axis. According to such a configuration of the fan, the blowing capacity of the cross-flow fan can be improved while noise can be prevented.

Preferably, a plurality of blade portions are arranged at irregular intervals. According to such a configuration of the fan, the cycle of the blade tip passing through can be shifted among a plurality of blade portions more effectively. Accordingly, noise caused by rotation of the fan can be significantly reduced.

An inside space is formed inside a plurality of blade portions arranged in the circumferential direction, and an outside space is formed outside thereof. Preferably, the fan described above is a centrifugal fan that outputs fluid from the inside space to the outside space. According to such a configuration of the fan, the blowing capacity of the centrifugal fan can be improved while noise can be prevented.

The fan described above is formed of resin. A molding die according to another aspect of the present invention is used to mold the fan. The molding die configured in this manner can produce a resin fan.

A fluid feeder according to another aspect of the present invention includes a blower configured with the fan described above and a driving motor coupled to the fan to rotate a plurality of blade portions. The fluid feeder configured in this manner can reduce power consumption of the driving motor while keeping the blowing capacity high.

A fan according to a further aspect of the present invention includes a plurality of blade portions arranged spaced apart from each other in a circumferential direction. Each blade portion has a blade surface including a pressure surface disposed on a rotational direction side of the fan and a suction surface disposed on a back side of the pressure surface. When cut along a plane orthogonal to a rotation axis of the fan, the blade portion has an inner edge portion at which a center line between the pressure surface and the suction surface intersects an inner peripheral-side blade tip, and an outer edge portion at which the center line intersects an outer peripheral-side blade tip. As the fan is rotated, a fluid flow is produced on the blade surface to flow between the inner edge portion and the outer edge portion.

An angle between a straight line passing through a rotational center of the fan and the outer edge portion and a tangent of the center line at the outer edge portion is defined as an outer peripheral blade tip angle. An angle between a straight line passing through the rotational center of the fan and the inner edge portion and a tangent of the center line at the inner edge portion is defined as an inner peripheral blade tip angle. In this case, a plurality of blade portions are provided such that the outer peripheral blade tip angle and the inner peripheral blade tip angle are each equal among a plurality of blade portions. A plurality of blade portions include a first blade portion and a second blade portion in which when they are rotated around the rotation axis of the fan and overlapped on one blade portion, one of the inner edge portion and the outer edge portion is disposed to be coincident with each other, and the other of the inner edge portion and the outer edge portion is disposed to be displaced from each other.

According to such a configuration of the fan, the first blade portion and the second blade portion are provided in such a manner that when a plurality of blade portions are rotated around the rotation axis of the fan and overlapped on one blade portion, the inner edge portions or the outer edge portions are disposed to be displaced from each other. Accordingly, the cycle of the blade tip passing through at the inner peripheral side or the outer peripheral side of the blade portion can be actively shifted between the first blade portion and the second blade portion. Thus, pressure variations caused by passage of the blade tips are brought into irregular cycles, thereby preventing noise resulting from pressure variations.

Because of the configuration in which the inner peripheral blade tip angle and the outer peripheral blade tip angle of each blade portion are each equal among the blade portions, the direction in which fluid flows in on the blade surface and the direction in which fluid flows out on the blade surface between the adjacent blade portions can be made uniform among a plurality of blade portions. Accordingly, although the inner edge portion or the outer edge portion is displaced between the first blade portion and the second blade portion, a change in direction of fluid flow between the adjacent blade portions can be reduced, thereby stabilizing the fluid flow. Accordingly, the blowing capacity of the fan can be improved.

Preferably, the blade portion has flection portions at which the center line is flexed at different points between the inner edge portion and the outer edge portion. The first blade portion and the second blade portion are different from each other in flection angle at the flection portion. According to such a configuration of the fan, the inner edge portion or the outer edge position is displaced between the first blade portion and the second blade portion by changing the flection angle at the flection portion.

Preferably, plural kinds of the blade portions are arranged to be placed in an irregular order, in which when plural kinds of the blade portions are rotated around the rotation axis of the fan and overlapped on one blade portion, one of the inner edge portion and the outer edge portion is disposed to be coincident with each other, and the other of the inner edge portion and the outer edge portion is disposed to be displaced from each other. According to such a configuration of the fan, the cycle of the blade tip passing through can be shifted among a plurality of blade portions more effectively. Accordingly, noise caused by rotation of the fan can be significantly reduced.

An inside space is formed inside a plurality of blade portions arranged in the circumferential direction, and an outside space is formed outside thereof. Preferably, the fan described above is a cross-flow fan that takes in fluid to the inside space from the outside space on one side with respect to the rotation axis, as viewed from a direction of the rotation axis of the fan, and outputs the taken-in fluid to the outside space on the other side with respect to the rotation axis. According to such a configuration of the fan, the blowing capacity of the cross-flow fan can be improved while noise can be prevented.

Preferably, a plurality of blade portions are arranged at irregular intervals. According to such a configuration of the fan, the cycle of the blade tip passing through can be shifted among a plurality of blade portions more effectively. Accordingly, noise caused by rotation of the fan can be significantly reduced.

An inside space is formed inside a plurality of blade portions arranged in the circumferential direction, and an outside space is formed outside thereof. Preferably, the fan described above is a centrifugal fan that outputs fluid from the inside space to the outside space. According to such a configuration of the fan, the blowing capacity of the centrifugal fan can be improved while noise can be prevented.

The fan described above is formed of resin. A molding die according to a further aspect of the present invention is used to mold the fan. The molding die configured in this manner can produce a resin fan.

A fluid feeder according to a further aspect of the present invention includes a blower configured with the fan described above and a driving motor coupled to the fan to rotate a plurality of blade portions. The fluid feeder configured in this manner can reduce power consumption of the driving motor while keeping the blowing capacity high.

Advantageous Effects of Invention

As described above, the present invention provides a fan with excellent blowing capacity while preventing noise, a molding die for use in production of the fan, and a fluid feeder provided with the fan.

DESCRIPTION OF EMBODIMENTS

Figure 1:
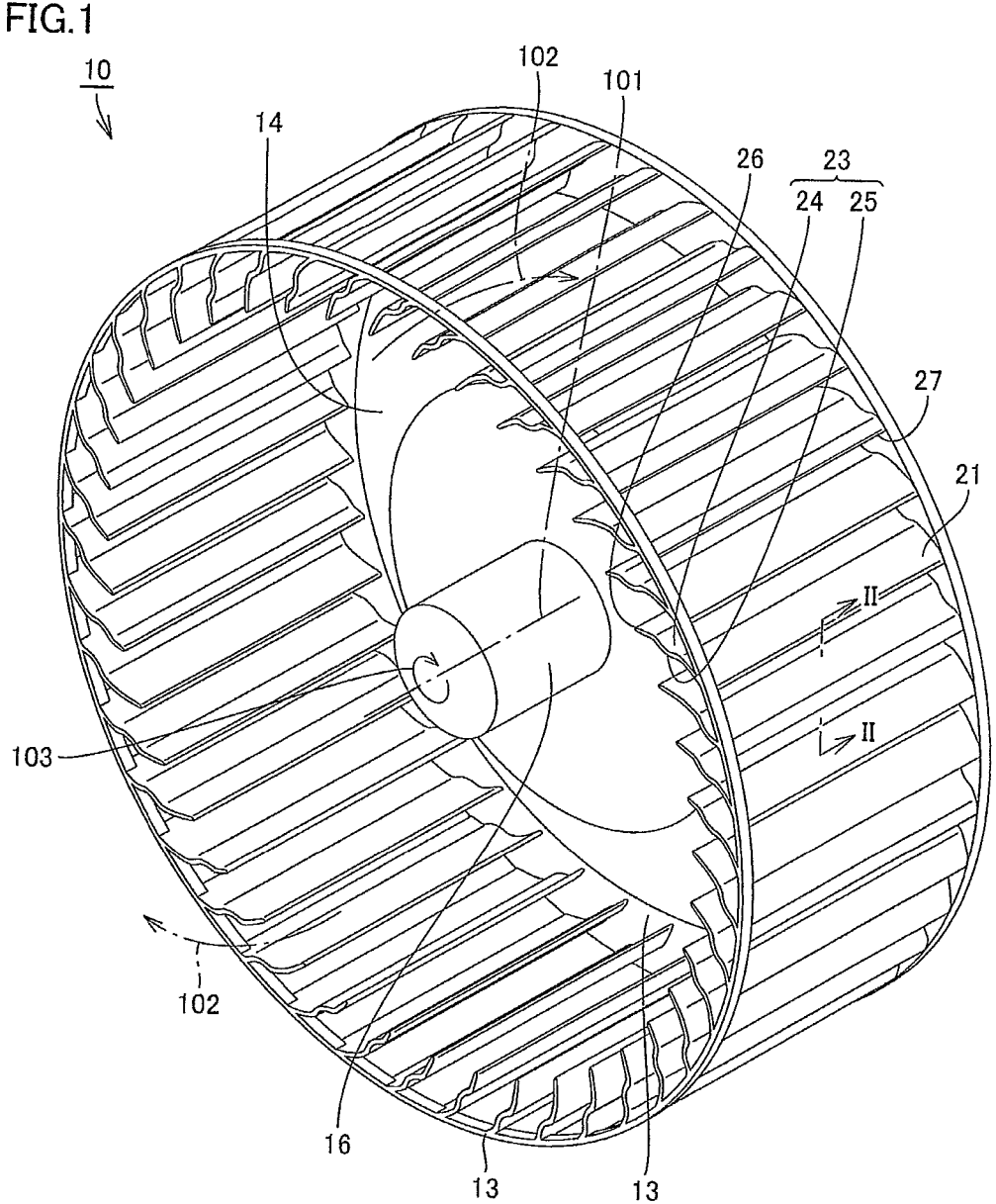
FIG. 1 is a perspective view showing a centrifugal fan according to a first embodiment of the present invention.

Embodiments of the present invention will be described with reference to the figures. In the following, the same or corresponding members in the figures are denoted with the same reference numerals.

First Embodiment

In the present embodiment, first of all, a structure of a centrifugal fan to which a fan according to the present invention is applied will be described. Next, a structure of a molding die for use in production of the centrifugal fan, and structures of a blower and an air purifier using the centrifugal fan will be described.

(Description of Structure of Centrifugal Fan)

Figure 2:
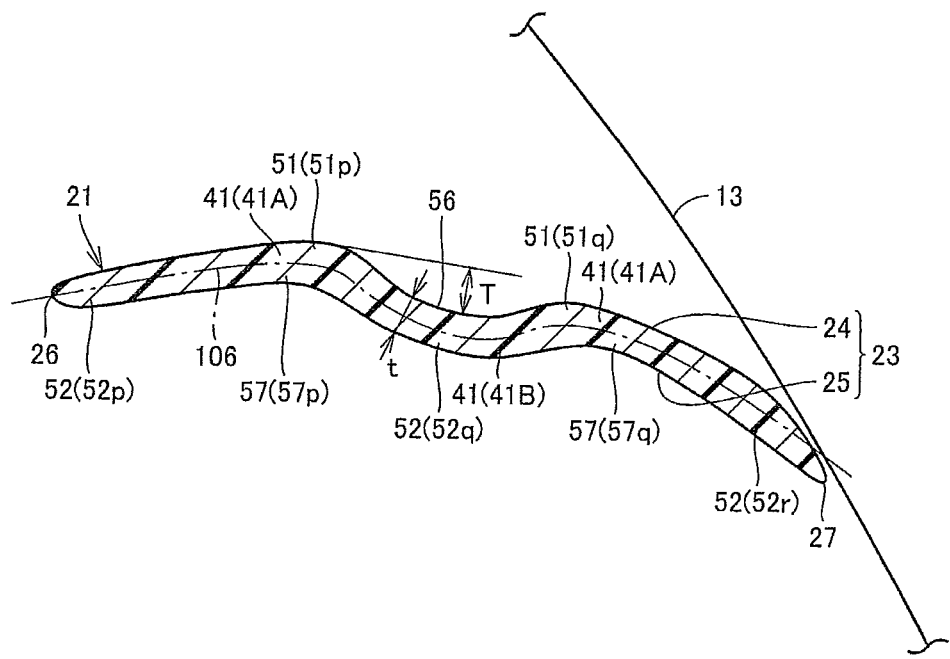
FIG. 2 is a cross-sectional view of the centrifugal fan taken along a line in FIG. 1.

FIG. 1 is a perspective view of a centrifugal fan in a first embodiment of the present invention. FIG. 2 is a cross-sectional view of the centrifugal fan taken along a line II-II in FIG. 1.

Referring to FIG. 1 and FIG. 2, a centrifugal fan 10 in the present embodiment has a plurality of fan blades 21. Centrifugal fan 10 has an approximately cylindrical appearance as a whole. A plurality of fan blades 21 are disposed on a circumferential surface of the approximately cylindrical shape. Centrifugal fan 10 is integrally formed from resin. Centrifugal fan 10 rotates in the direction shown by arrow 103 around an imaginary center axis 101 shown in FIG. 1.

Centrifugal fan 10 is a fan using a plurality of rotating fan blades 21 to output air taken in from the radially inner side to the radially outer side. Centrifugal fan 10 is a fan using a centrifugal force to output the air from the rotational center side of the fan to the radial direction thereof. Centrifugal fan 10 is a sirocco fan. Centrifugal fan 10 is used with rotation speeds in a low Reynolds number region applied to fans for home electric equipment, etc.

Centrifugal fan 10 further has peripheral frames 13 serving as supports. Peripheral frames 13 are formed to annually extend around center axis 101. Peripheral frames 13 are disposed spaced apart from each other in the axial direction of center axis 101. A boss portion 16 for coupling centrifugal fan 10 to a driving motor is integrally formed with one of peripheral frames 13 with a disk portion 14 interposed therebetween.

A plurality of fan blades 21 are arranged spaced apart from each other in the circumferential direction around center axis 101. A plurality of fan blades 21 are supported by peripheral frames 13 at opposite ends thereof in the axial direction of center axis 101. Fan blade 21 is provided to stand on one peripheral frame 13 and formed to extend along the axial direction of center axis 101 toward the other peripheral frame 13.

Fan blade 21 has an inner edge portion 26 and an outer edge portion 27. Inner edge portion 26 is disposed at an end portion on the inner peripheral side of fan blade 21. Outer edge portion 27 is disposed at an end portion on the outer peripheral side of fan blade 21. Fan blade 21 is formed to be inclined in the circumferential direction around center axis 101 from inner edge portion 26 toward outer edge portion 27. Fan blade 21 is formed to be inclined in the rotational direction of centrifugal fan 10 from inner edge portion 26 toward outer edge portion 27.

Fan blade 21 has a blade surface 23 including a pressure surface 25 and a suction surface 24. Pressure surface 25 is disposed on the rotational direction side of centrifugal fan 10. Suction surface 24 is disposed on the back side of pressure surface 25. During rotation of centrifugal fan 10, as an air flow is produced on blade surface 23, a pressure distribution is generated in such a manner that pressure is relatively large at pressure surface 25 and is relatively small at suction surface 24. Fan blade 21 has a shape generally curved between inner edge portion 26 and outer edge portion 27 so as to be concave on the pressure surface 25 side and be convex on the suction surface 24 side.

FIG. 2 shows a blade cross section of fan blade 21 cut along a plane orthogonal to center axis 101 serving as the rotation axis of centrifugal fan 10.

Fan blade 21 is formed to have a uniform blade cross section when cut anywhere in the axial direction of center axis 101. Fan blade 21 is formed to have a thin blade cross section between inner edge portion 26 and outer edge portion 27. Fan blade 21 is formed to have a generally constant thickness (the length between pressure surface 25 and suction surface 24) between inner edge portion 26 and outer edge portion 27.

Fan blade 21 has such a blade cross section in that a concave portion 57 is formed at pressure surface 25 of blade surface 23 and a concave portion 56 is formed at suction surface 24 of blade surface 23. A plurality of concave portions 56, 57 are formed at at least one of pressure surface 25 and suction surface 24.

In the present embodiment, a plurality of concave portions 57 (concave portions 57$p$, 57$q$) are formed at pressure surface 25. Convex portions 52 (convex portions 52$p$, 52$q$, 52$r$) are further formed at pressure surface 25. Convex portion 52 is formed to protrude toward the rotational direction of centrifugal fan 10. Concave portion 57 is formed by a valley portion between convex portions 52 disposed adjacent to each other. For example, concave portion 57$p$ is formed by a valley portion between convex portion 52$p$ and convex portion 52$q$. Concave portions 57 and convex portions 52 are formed to be alternate in the direction in which inner edge portion 26 is connected with outer edge portion 27. Concave portion 57 has an approximately U-shaped cross section.

A plurality of convex portions 51 (convex portions 51$p$, 51$q$) are further formed at suction surface 24. Convex portion 51 is formed to protrude toward the direction opposite to the rotational direction of cross-flow fan 100. Concave portion 56 is formed by a valley portion between convex portions 51 disposed adjacent to each other. For example, concave portion 56 is formed by a valley portion between convex portion 51$p$ and convex portion 51$q$. Concave portion 56 and convex portions 57 are formed to be alternately aligned in the direction in which inner edge portion 26 is connected with outer edge portion 27. Concave portion 56 has an approximately U-shaped cross-sectional shape.

Concave portion 57 and convex portion 51 are formed at front and back corresponding positions of pressure surface 25 and suction surface 24, respectively. Convex portion 52 and concave portion 56 are formed at front and back corresponding positions of pressure surface 25 and suction surface 24, respectively. In the present embodiment, concave portion 57 formed at pressure surface 25 forms convex portion 51 at suction surface 24, and concave portion 56 formed at suction surface 24 forms convex portion 52 at pressure surface 25. The concave portion and the convex portion formed at the front and the back correspondingly at pressure surface 25 and suction surface 24 have a shape equal to each other.

Concave portions 57, 56 are shaped like a groove extending along the axial direction of center axis 101. The groove portion formed of each concave portion 57, 56 is formed to continuously extend between one end and the other end of fan blade 21 in the axial direction of center axis 101. The groove portion formed of each concave portion 57, 56 is formed to linearly extend between one end and the other end of fan blade 21 in the axial direction of center axis 101.

In the present embodiment, the number of concave portions 57 formed at pressure surface 25 is greater than the number of concave portions 56 formed at suction surface 24.

FIG. 2 shows a center line 106 in the thickness direction (the direction in which pressure surface 25 is connected with suction surface 24) of the blade cross section of fan blade 21. Fan blade 21 has flection portions 41 at which center line 106 of the blade cross section of fan blade 21 is flexed at different points between inner edge portion 26 and outer edge portion 27. Concave portions 56, 57 are formed by flection portions 41.

In the present embodiment, fan blade 21 has flection portions 41 at three points between inner edge portion 26 and outer edge portion 27. Fan blade 21 has flection portions 41A arranged in the proximity of inner edge portion 26 and outer edge portion 27, respectively, and a flection portion 41B arranged at the blade midpoint between inner edge portion 26 and outer edge portion 27. Flection portion 41A forms concave portion 57 at pressure surface 25 and convex portion 51 at suction surface 24. Flection portion 41B forms convex portion 52 at pressure surface 25 and concave portion 56 at suction surface 24.

In such a configuration, concave portions 57 are formed in the proximity of inner edge portion 26 and outer edge portion 27, and concave portion 56 is formed at the blade midpoint between inner edge portion 26 and outer edge portion 27. Fan blade 21 has an approximately W-shaped blade cross-sectional shape.

Flection portions 41 are flexed such that the depth T of concave portions 56, 57 is greater than the thickness t of fan blade 21 at at least one point. Flection portions 41 are formed such that the bending direction is alternately opposite in the direction in which inner edge portion 26 is connected with outer edge portion 27. Flection portion 41 is formed to be bent so as to be rounded. Flection portion 41 may be formed to be bent to form a corner.

Figure 3:
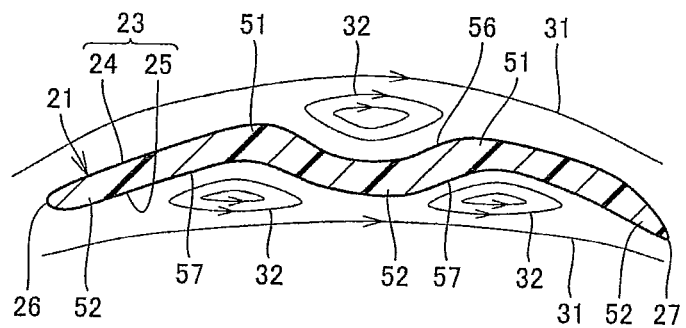
FIG. 3 is a diagram schematically showing a phenomenon that occurs on a blade surface of a fan blade in the centrifugal fan in FIG. 1.

FIG. 3 is a diagram schematically showing a phenomenon that occurs on the blade surface in the centrifugal fan in FIG. 1. Referring to FIG. 1 to FIG. 3, when centrifugal fan 10 is rotated, as shown by an arrow 102 in FIG. 1, an air flow is produced between adjacent fan blades 21 to flow in from inner edge portion 26, pass through on blade surface 23, and flow out from outer edge portion 27. Here, vortexes 32 (secondary flow) of air flow are generated in concave portions 56, 57 formed at blade surface 23, so that an air flow 31 (main flow) passing through on fan blade 23 flows along the outside of vortexes 32 produced in concave portions 56, 57.

Accordingly, although having a thin blade cross section, fan blade 21 exhibits a behavior like a thick blade as if the blade cross section is increased in thickness by the depth of concave portions 56, 57 at which vortexes 32 are formed. As a result, the lift produced in the proximity of inner edge portion 26 having concave portions 56, 57 can be significantly increased.

Furthermore, the flection structure of flection portions 41 can improve the strength of fan blade 21. As a result, the reliability in the strength of the fan can be improved although centrifugal fan 10 is a resin fan having a thin blade cross section. The improvement in strength can reduce the thickness of fan blade 21 accordingly. Therefore, the weight of centrifugal fan 10 can be reduced and the cost thereof can be reduced.

For the reasons above, centrifugal fan 10 having a blade cross section with a high lift-drag ratio, with a small thickness and weight, and with a high strength can be implemented.

Figure 4:
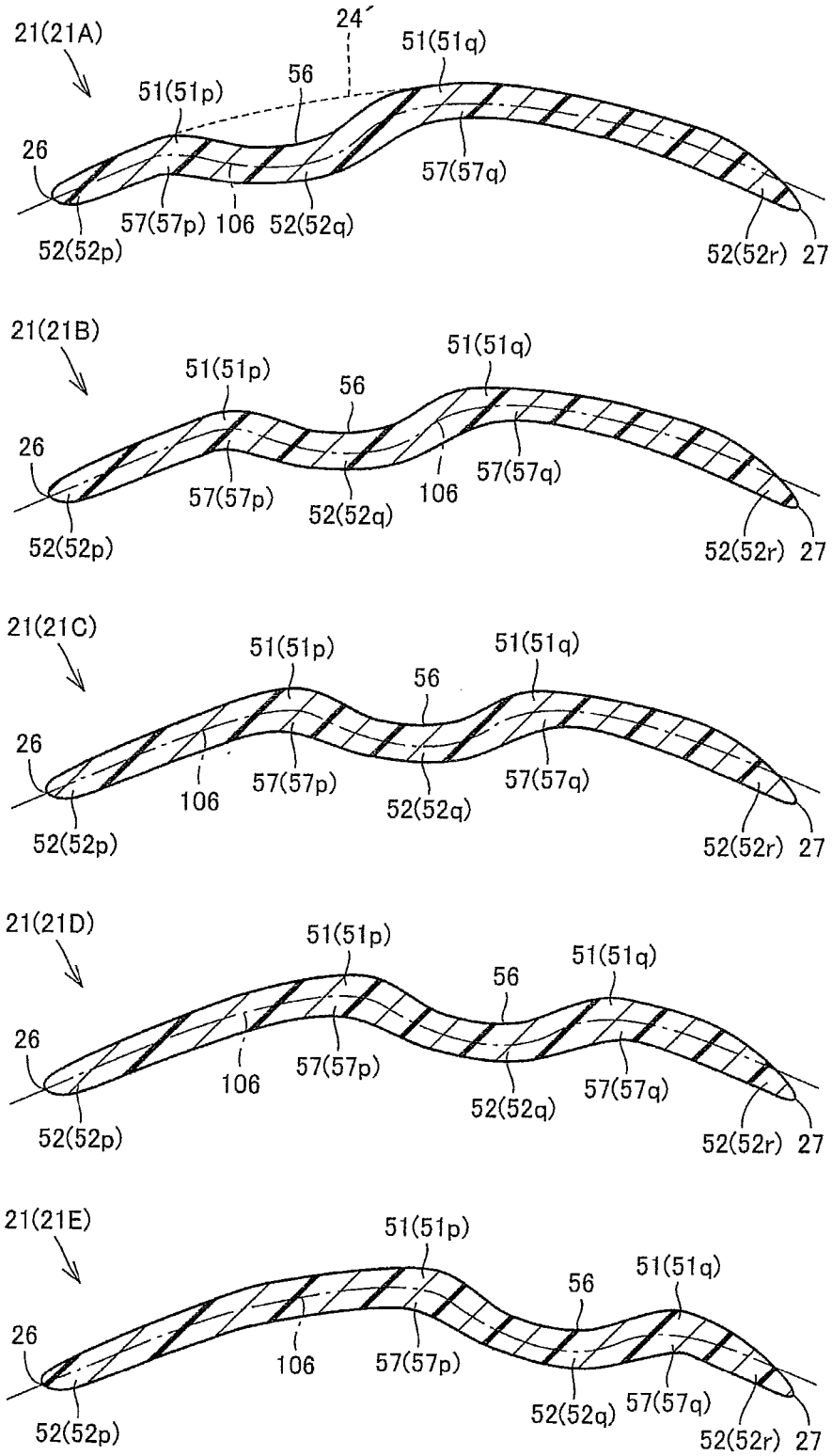
FIG. 4 is a cross-sectional view of the fan blade for use in the centrifugal fan in FIG. 1.

FIG. 4 is a cross-sectional view of the fan blade for use in the centrifugal fan in FIG. 1. The figure shows the cross section of the fan blade shown in FIG. 2. Referring to FIG. 3, in centrifugal fan 10 in the present embodiment, a plurality of fan blades 21 are comprised of plural kinds of fan blades 21A, 21B, 21C, 21D, and 21E. Fan blades 21A to 21E have blade cross sections having different shapes. A plurality of fan blades are provided for each of fan blades 21A to 21E.

The shapes of fan blades 21A to 21E will be described in more specific details. Fan blades 21A to 21E all have an approximately W-shape blade cross section but are different in positions where concave portions 56 and 57 are formed. Giving attention to the position where concave portion 56 is formed, concave portion 56 is formed at a position close to inner edge portion 26 in fan blade 21A, and then, concave portion 56 is formed further away from inner edge portion 26 and closer to outer edge portion 27 in order of fan blades 21B, 21C, and 21D. Then, in fan blade 21E, concave portion 56 is formed at a position close to outer edge portion 27. Concave portion 57$p$ and concave portion 57$q$ are also formed further away from inner edge portion 26 and closer to outer edge portion 27 in order from fan blade 21A to fan blades 21B, 21C, 21D, and 21E.

As representatively illustrated in fan blade 21A in FIG. 4, assuming that a suction surface 24' extends smoothly from the top of convex portion 52 toward the top of convex portion 51 above concave portion 56, preferably, fan blades 21A to 21E are formed such that the respective suction surfaces 24' of the fan blades have different profiles between inner edge portion 26 and outer edge portion 27 in the cross sections shown in FIG. 4.

Figure 5:
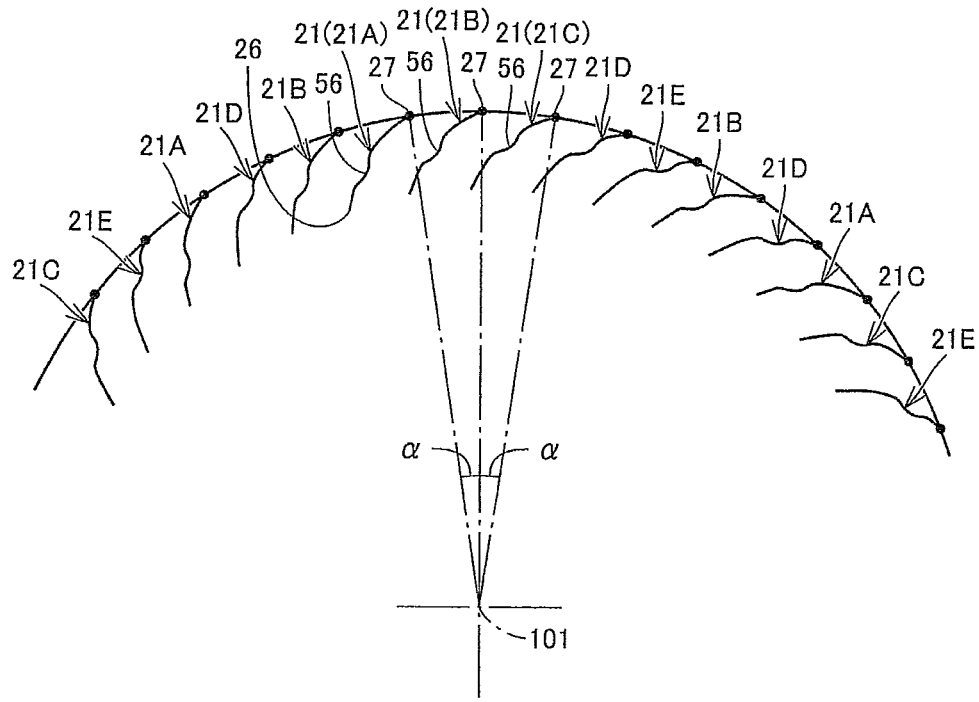
FIG. 5 is a diagram schematically illustrating an arrangement of fan blades in the centrifugal fan in FIG. 1.

FIG. 5 is a diagram schematically illustrating an arrangement of fan blades in the centrifugal fan in FIG. 1. Referring to FIG. 5, fan blades 21A, 21B, 21C, 21D, and 21E are arranged in an irregular (random) order in the circumferential direction around center axis 101. To be more specific, fan blades 21A to 21E are arranged so as not be repeatedly placed in a regular order (for example, fan blades 21A→21B→21C→21D→21E→21A→21B→21C→21D→21E→21A→21B . . . ).

In the example shown in FIG. 5, fan blades 21C, 21E, 21A, 21D, 21B, 21A, 21B, 21C, 21D, 21E, 21B, 21D, 21A, 21C, 21E are placed in order clockwise around center axis 101.

In the example above, five kinds of fan blades 21A to 21E make one set, and different sets of fan blades 21A to 21E placed in different orders are disposed in order. However, the configuration is not limited thereto. For example, a plurality of fan blades may be prepared for each of fan blades 21A to 21E, and fan blades selected therefrom as appropriate may be placed in order. As long as fan blades 21A to 21E are arranged without a regularity as a whole, fan blades of a particular kind may be placed in succession. The number of each of fan blades 21A to 21E for use in centrifugal fan 10 may not be completely equal. All of fan blades 21 for use in centrifugal fan 10 may have blade cross-sectional shapes different from each other. Preferably, at least three kinds, more preferably, at least four kinds of fan blades 21 are used.

In centrifugal fan 10 in the present embodiment, a plurality of fan blades 21 are arranged such that an angle α of a line connecting center axis 101 with outer edge portion 27 of each fan blade 21 is equal between adjacent fan blades 21. A plurality of fan blades 21 may be arranged such that the angle of α line connecting center axis 101 with inner edge portion 26 of each fan blade 21 is equal between adjacent fan blades 21.

Figure 6:
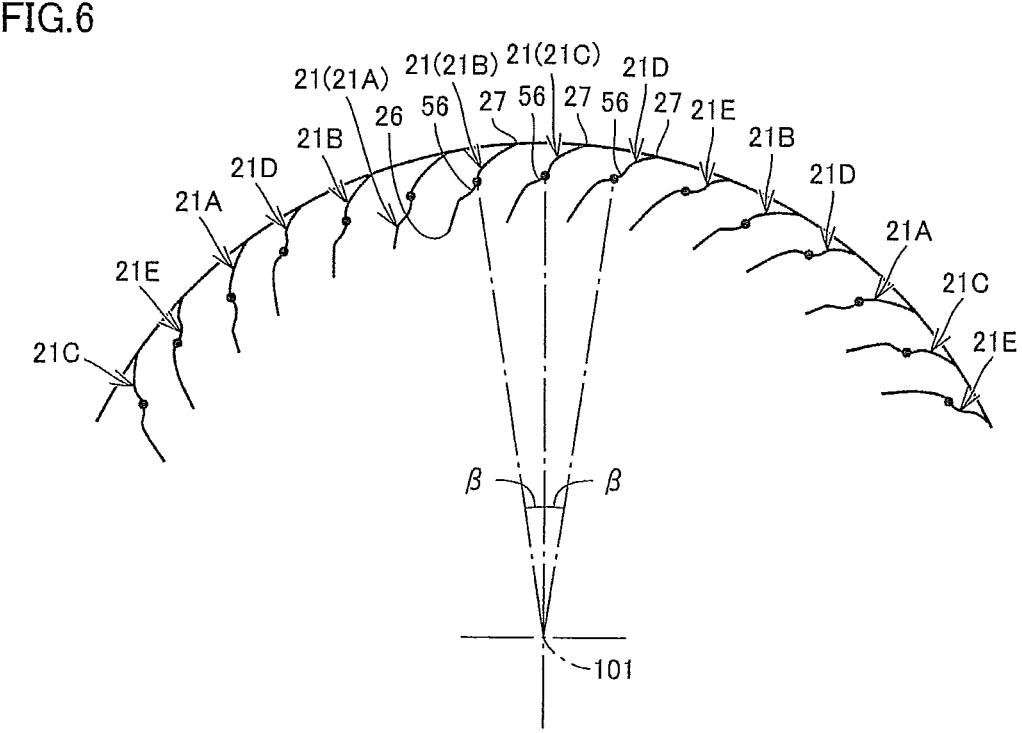
FIG. 6 is a diagram schematically illustrating a modification of the arrangement of fan blades shown in FIG. 5.

FIG. 6 is a diagram schematically illustrating a modification of the arrangement of the fan blades shown in FIG. 5. The arrangement in FIG. 6 is the same as that in FIG. 5 in that plural kinds of fan blades 21A, 21B, 21C, 21D, and 21E having blade cross sections of different shapes are placed in an irregular order. In this modification, a plurality of fan blades 21 are arranged such that an angle β of a line connecting center axis 101 with the centroid of the blade cross section of each fan blade 21 is equal between adjacent fan blades 21. The centroid of the blade cross section of fan blade 21 corresponds to the barycenter of the blade cross section and is obtained by dividing the first moment of area of the blade cross section by the sectional area of the entire blade cross section.

A plurality of fan blades 21 may be arranged so as to satisfy both the arrangement manner shown in FIG. 5 and the arrangement manner shown in FIG. 6.

Referring to FIG. 4 to FIG. 6, as described above, in centrifugal fan 10, the blade cross sections differ among a plurality of fan blades 21 because fan blades 21A, 21B, 21C, 21D, and 21E different in positions of concave portions 56 and 57 are used. Since the shape of blade cross section of fan blade 21 affects the static pressure distribution on pressure surface 25 and suction surface 24 during rotation of centrifugal fan 10, the air flow between adjacent fan blades 21 and the air flow that flows in/out between adjacent fan blades 21 through outer edge portion 27 and inner edge portion 26 vary among fan blades 21.

On the other hand, in the example shown in FIG. 5, a plurality of fan blades 21 are disposed such that the angle α of the line connecting center axis 101 with outer edge portion 27 of each fan blade 21 is equal between adjacent fan blades 21. Even in this case, the air flow that flows in/out between adjacent fan blades 21 varies among fan blades 21 to cause a disturbance in the air flow in the approach place where outer edge portion 27 of fan blade 21 approaches the fan casing. Accordingly, the timing of pressure variation when outer edge portion 27 of fan blade 21 passes through the approach place can be brought out of constant cycles. As a result, the narrow-band noise resulting from the blade-passing sound (nZ sound) can be reduced to the permissible level.

In the example shown in FIG. 6, a plurality of fan blades 21 are disposed such that the angle β of the line connecting center axis 101 with the centroid of blade cross section of each fan blade 21 is equal between adjacent fan blades 21. Even in this case, the air flow between adjacent fan blades 21 differs among fan blades 21 thereby reducing the narrow-band noise resulting from the air flow between fan blades 21 to the permissible level.

Because of the reduction of narrow-band noise as described above, in both examples shown in FIG. 5 and FIG. 6, the interval between adjacent fan blades 21 can be set to an optimum value based on the blowing capacity required for centrifugal fan 10. Accordingly, a phenomenon such as a backflow partially produced in the air flow between adjacent fan blades 21 can be prevented, thereby stabilizing the air flow between fan blades 21. As a result, low-frequency noise (abnormal sound) can be prevented while the blowing capacity is increased. Furthermore, a phenomenon such as a significant increase of ventilation resistance to the air flow among fan blades 21 can be prevented, thereby increasing the blowing capacity.

Centrifugal fan 10 is applied to equipment having a large pressure loss of airflow exerted on the fan, when compared with a cross-flow fan described later. In this case, a backflow of airflow between adjacent fan blades 21 is more likely to be produced. Therefore, the structure of the present invention capable of preventing such a phenomenon is applied more effectively to centrifugal fan 10.

The structure of centrifugal fan 10 according to the first embodiment of the present invention described above is summarized as follows. Centrifugal fan 10 in the present embodiment includes fan blades 21 serving as a plurality of blade portions arranged spaced apart from each other in the circumferential direction. Fan blade 21 has inner edge portion 26 disposed on the inner peripheral side and outer edge portion 27 disposed on the outer peripheral side. Fan blade 21 has blade surface 23 extending between inner edge portion 26 and outer edge portion 27. Blade surface 23 includes pressure surface 25 disposed on the rotational direction side of the fan and suction surface 24 disposed on the back side of pressure surface 25. As the fan is rotated, an airflow is produced on blade surface 23 as a fluid flow flowing between inner edge portion 26 and outer edge portion 27. When cut along the plane orthogonal to center axis 101 serving as the rotation axis of the fan, fan blade 21 has a blade cross section having concave portions 56 and 57 formed at pressure surface 25 and suction surface 24. A plurality of fan blades 21 include fan blades 21A to 21E having blade cross sections of different shapes.

(Description of Structures of Molding Die, Blower, and Air Purifier)

Figure 7:
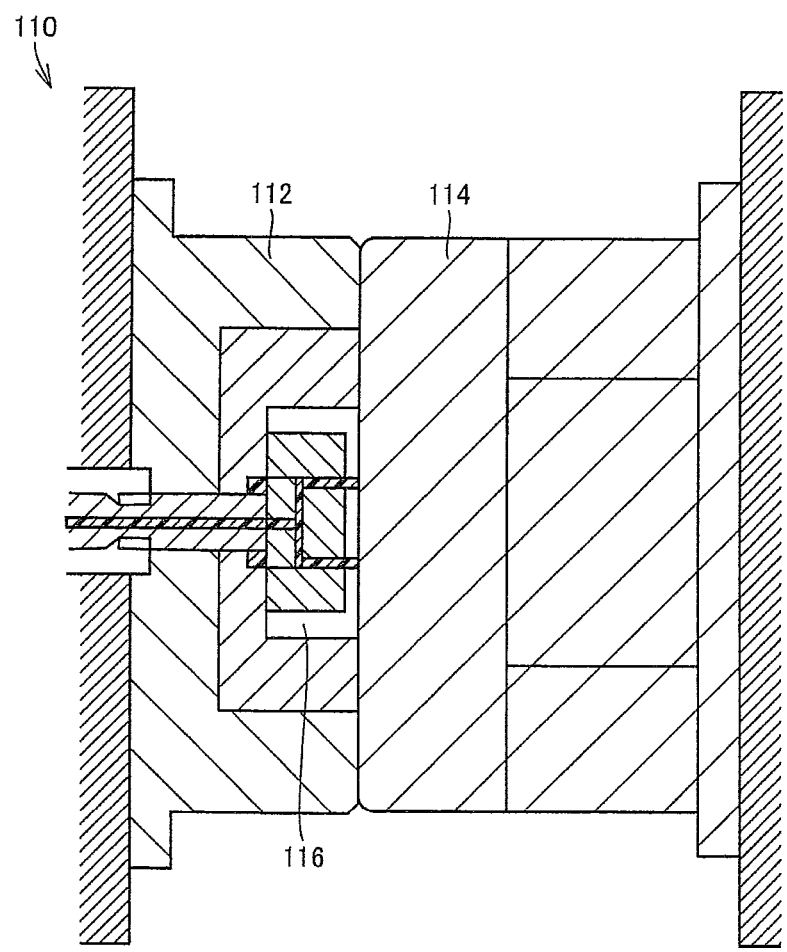
FIG. 7 is a cross-sectional view of a molding die for use in production of the centrifugal fan in FIG. 1.

FIG. 7 is a cross-sectional view of a molding die for use in production of the centrifugal fan in FIG. 1. Referring to FIG. 7, a molding die 110 has a stationary die 114 and a movable die 112. Stationary die 114 and movable die 112 define a cavity 116 which has approximately the same shape as centrifugal fan 10 and into which flowable resin is injected.

Molding die 110 may be provided with a not-shown heater for increasing the flowability of resin injected into cavity 116. The installation of such a heater is particularly effective, for example, when synthetic resin with an increased strength, such as glass-fiber-filled AS resin (acrylonitrile-styrene copolymer), is used.

Cross-flow fan 100 in a third embodiment described later is also produced with a molding die having a similar structure as molding die 110 in FIG. 7.

Figure 8:
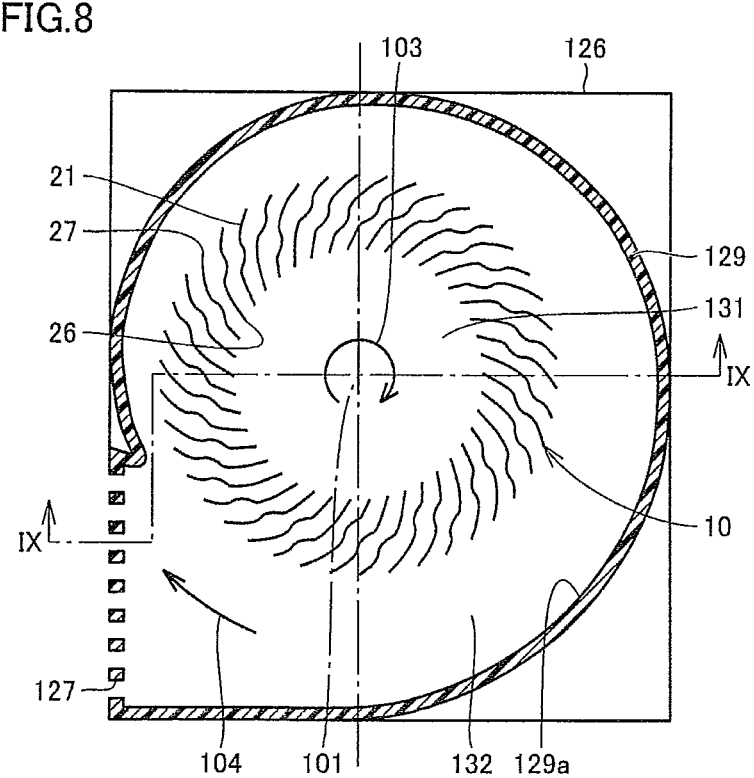
FIG. 8 is a cross-sectional view of a blower using the centrifugal fan in FIG. 1.
Figure 9:
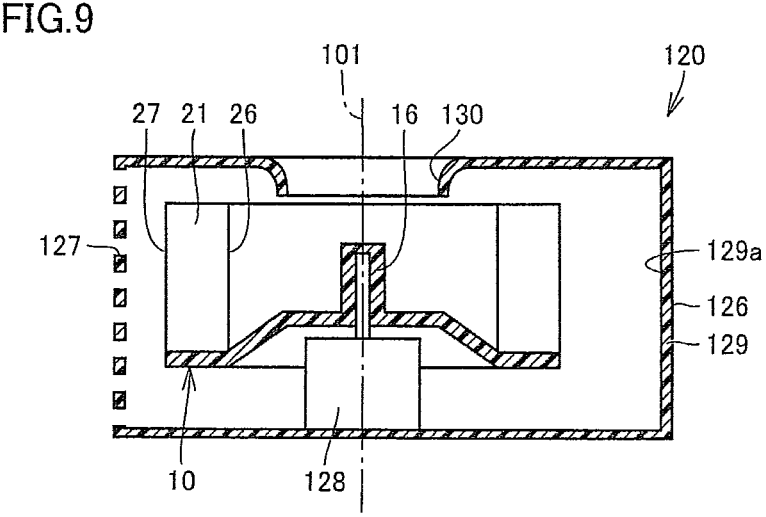
FIG. 9 is a cross-sectional view of the blower taken along a line IX-IX in FIG. 8.

FIG. 8 is a cross-sectional view of a blower using the centrifugal fan in FIG. 1. FIG. 9 is a cross-sectional view of the blower taken along a line IX-IX in FIG. 8. Referring to FIG. 8 and FIG. 9, a blower 120 has a driving motor 128, centrifugal fan 10, and a casing 129 inside an outer casing 126.

The output shaft of driving motor 128 is coupled to boss portion 16 molded integrally with centrifugal fan 10. Casing 129 has a guide wall 129a. Guide wall 129a is formed by an approximately ¾ arc disposed on the periphery of centrifugal fan 10. Guide wall 129a guides an airflow generated by rotation of fan blades 21 to the rotational direction of fan blades 21 while increasing the speed of the airflow.

Casing 129 has an intake portion 130 and an outlet portion 127. Intake portion 130 is formed to be positioned on an extension of center axis 101. Outlet portion 127 is formed to be open to one side of the tangent direction of guide wall 129a from part of guide wall 129a. Outlet portion 127 is shaped like a prismatic cylinder protruding from part of guide wall 129a to one side of the tangent direction of guide wall 129a.

Driven by driving motor 128, centrifugal fan 10 rotates in the direction shown by arrow 103. Here, air is taken in from intake portion 130 to the inside of casing 129 and is output from a radially inside space 131 to a radially outside space 132 of centrifugal fan 10. The air output to radially outside space 132 circumferentially flows in the direction shown by arrow 104 and is blown to the outside through outlet portion 127.

Figure 10:
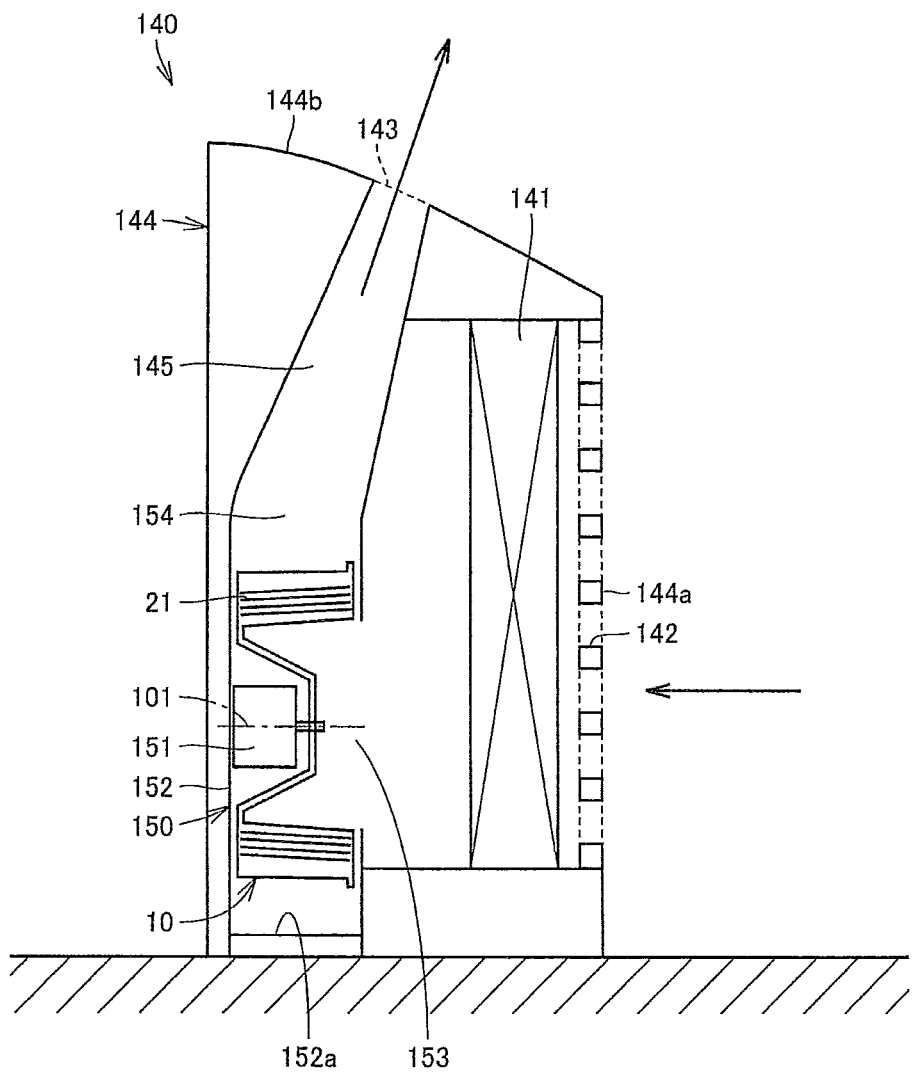
FIG. 10 is a cross-sectional view of an air purifier using the centrifugal fan in FIG. 1.

FIG. 10 is a cross-sectional view of an air purifier using the centrifugal fan in FIG. 1. Referring to FIG. 10, an air purifier 140 has a housing 144, a blower 150, a duct 145, and an HEPA (High Efficiency Particulate Air Filter) filter 141.

Housing 144 has a rear wall 144a and a top wall 144b. Housing 144 has an intake port 142 for sucking the air in the room in which air purifier 140 is installed. Intake port 142 is formed at rear wall 144a. Housing 144 further has an outlet port 143 discharging the purified air to the inside of the room. Outlet port 143 is formed at top wall 144b. Air purifier 140 is generally installed against a wall such that rear wall 144a is opposed to a wall in the room.

Filter 141 is disposed to face intake port 142 in the inside of housing 144. The air introduced to the inside of housing 144 through intake port 142 passes through filter 141. The foreign matters in the air are thus removed.

Blower 150 is provided to suck the room air to the inside of housing 144 and to output the air purified by filter 141 to the room through outlet port 143. Blower 150 has centrifugal fan 10, a casing 152, and a driving motor 151. Casing 152 has a guide wall 152a. Casing 152 has an intake portion 153 and an outlet portion 154.

Duct 145 is provided above blower 150 and is provided as an air channel for guiding the purified air from casing 152 to outlet port 143. Duct 145 has a prismatic cylindrical shape with its lower end connecting to outlet portion 154 and with its upper end open. Duct 145 is formed to guide the purified air blown from outlet portion 154 to a laminar flow toward outlet port 143.

In air purifier 140 having such a configuration, blower 150 is driven to rotate fan blades 21 to cause the room air to be taken in from intake port 142 to the inside of housing 144. Here, an airflow is generated between intake port 142 and outlet port 143, and foreign matters such as dust included in the intake air are removed by filter 141.

The purified air obtained by passage through filter 141 is taken in to the inside of casing 152. Here, the purified air taken in to the inside of casing 152 forms a laminar flow through guide wall 152a around fan blades 21. The air in the form of a laminar flow is guided to outlet portion 154 along guide wall 152a and blown from outlet portion 154 to the inside of duct 145. The air is discharged from outlet port 143 toward the external space.

Although an air purifier has been described by way of example in this embodiment, the centrifugal fan in the present invention is also applicable to a fluid feeding device such as, for example, an air conditioner, a humidifier, a cooling device, and a ventilating device.

In centrifugal fan 10 according to the first embodiment of the present invention as described above, because of concave portions 56 and 57 formed in fan blades 21, the lift caused by rotation of fan blades 21 can be greatly increased in the low Reynolds number region applied to fans in home electric equipment. The use of fan blades 21A to 21E having blade cross sections of different shapes can reduce the narrow-band noise produced by rotation of the fan. Therefore, the blowing capacity of centrifugal fan 10 can be increased while noise is prevented.

In air purifier 140 according to the present embodiment, the use of centrifugal fan 10 having an excellent blowing capacity reduces power consumption of driving motor 151 and provides air purifier 140 that can contribute to energy savings. The use of centrifugal fan 10 with reduced noise also provides a quiet air purifier 140.

Second Embodiment

In the present embodiment, variations of plural kinds of fan blades shown in FIG. 4 will be described.

Figure 11:
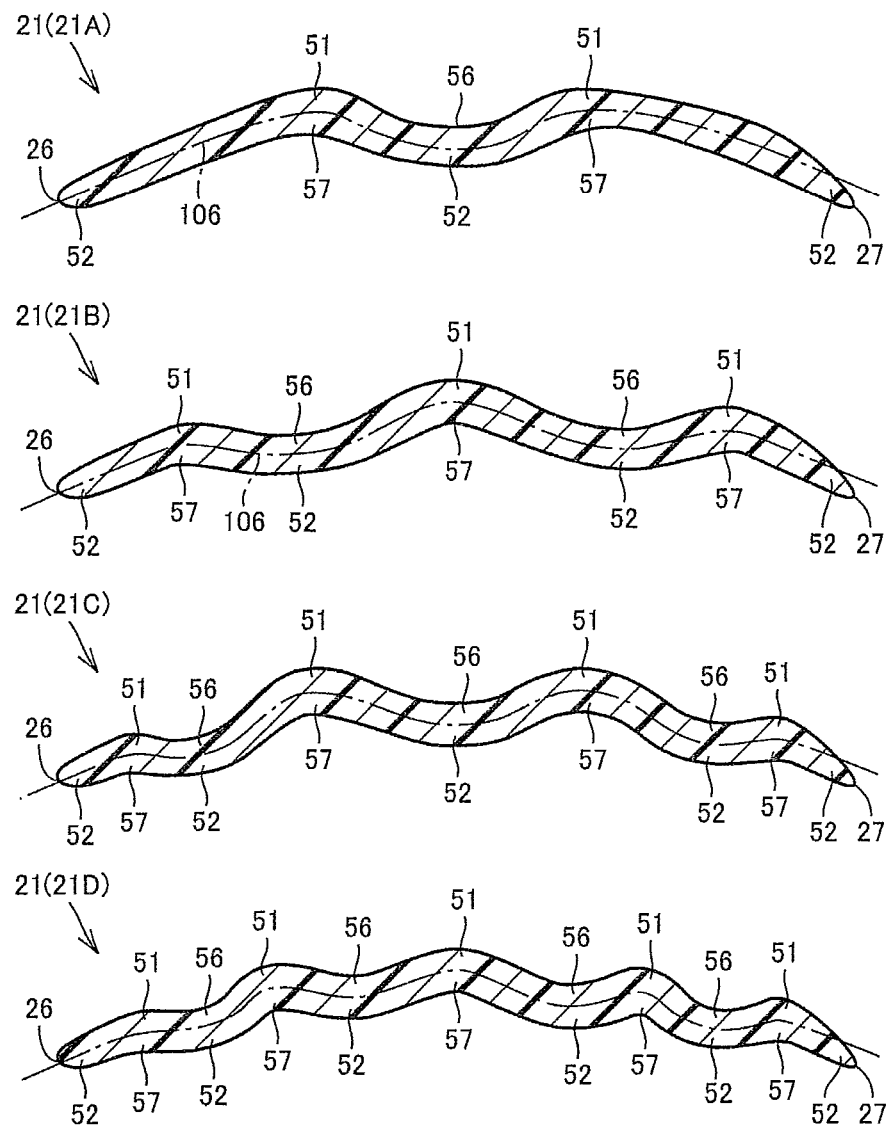
FIG. 11 is a cross-sectional view showing a first modification of plural kinds of fan blades in FIG. 4.

FIG. 11 is a cross-sectional view showing a first modification of plural kinds of fan blades in FIG. 4. Referring to FIG. 11, in this modification, a plurality of fan blades 21 are comprised of plural kinds of fan blades 21A, 21B, 21C, and 21D having blade cross sections of different shapes.

The shapes of fan blades 21A to 21D will be described in more specific details. Fan blades 21A to 21D are different from each other in number of concave portions 56, 57. Fan blade 21A has one concave portion 56 and two concave portions 57. Fan blade 21B has two concave portions 56 and three concave portions 57. Fan blade 21C has three concave portions 56 and four concave portions 57. Fan blade 21D has four concave portions 56 and five concave portions 57.

Figure 12:
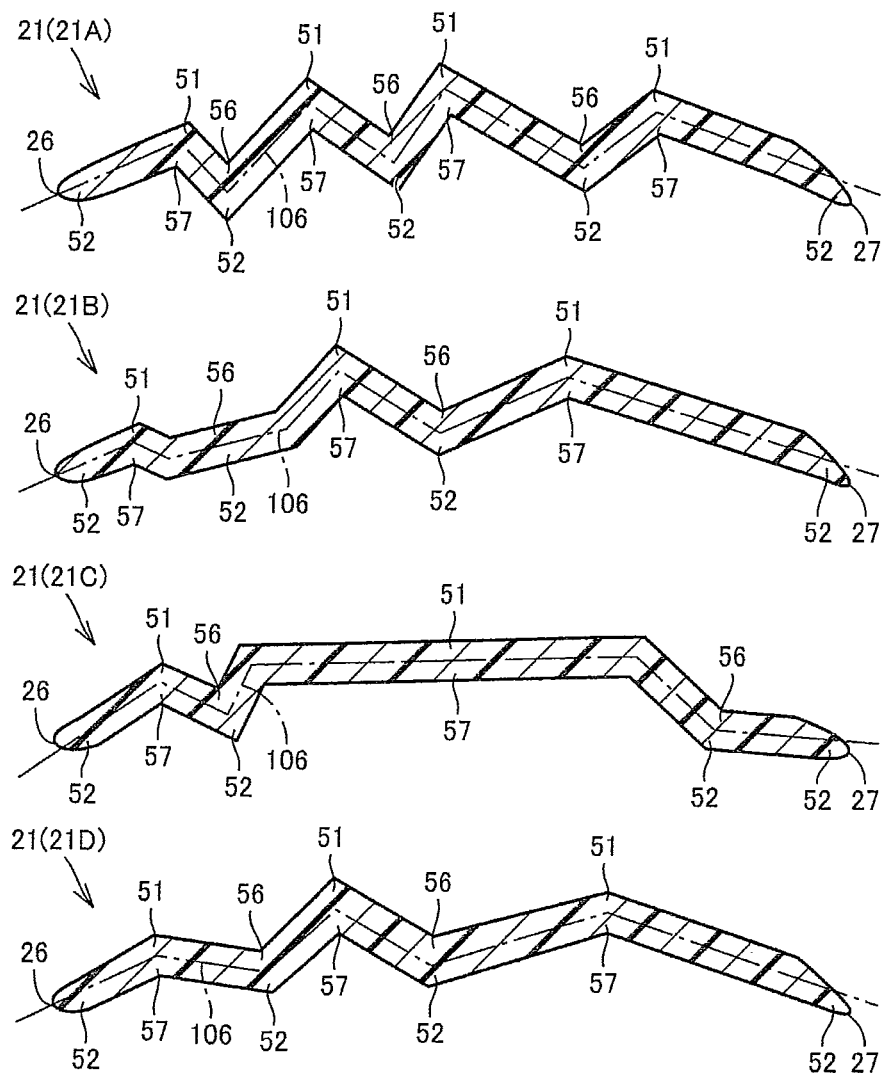
FIG. 12 is a cross-sectional view showing a second modification of plural kinds of fan blades in FIG. 4.

FIG. 12 is a cross-sectional view showing a second modification of plural kinds of fan blades in FIG. 4. Referring to FIG. 12, in this modification, a plurality of fan blades 21 are comprised of plural kinds of fan blades 21A, 21B, 21C, and 21D having blade cross sections of different shapes. Each fan blade of fan blades 21A to 21D is formed to be bent to form a corner at different points between inner edge portion 26 and outer edge portion 27. The corner portion may be slightly rounded in consideration of a process of removing fan blade 21 from a die for resin molding.

The shapes of fan blades 21A to 21D will be described in more specific details. Fan blades 21A to 21D are different from each other in position and number of concave portions 56 and 57 and in shape of concave portions 56 and 57. Fan blade 21A has three concave portions 56 and four concave portions 57. Fan blades 21B to 21D each have two concave portions 56 and three concave portions 57. Basically, concave portions 56 and 57 formed in fan blades 21A to 21D each have a triangular shape, two sides of which define a concave shape. However, one concave portion 56 formed in fan blade 21B and one concave portion 57 formed in fan blade 21C each have a rectangular shape, three sides of which define a concave shape.

As shown in FIG. 11 and FIG. 12, the position, number, and shape of concave portions 56 and 57 are varied to readily provide plural kinds of fan blades 21 having different shapes.

The centrifugal fan in the second embodiment of the present invention configured in this manner achieves the effects as described in the first embodiment similarly.

Third Embodiment

In the present embodiment, a structure of a cross-flow fan to which a fan in the present invention is applied will be described. Next, a structure of an air conditioner using the cross-flow fan will be described. The cross-flow fan in the present embodiment partially has a structure similar to that of centrifugal fan 10 in the first embodiment. In the following, a description of the overlapping structure will not be repeated.

(Description of Structure of Cross-Flow Fan)

Figure 13:
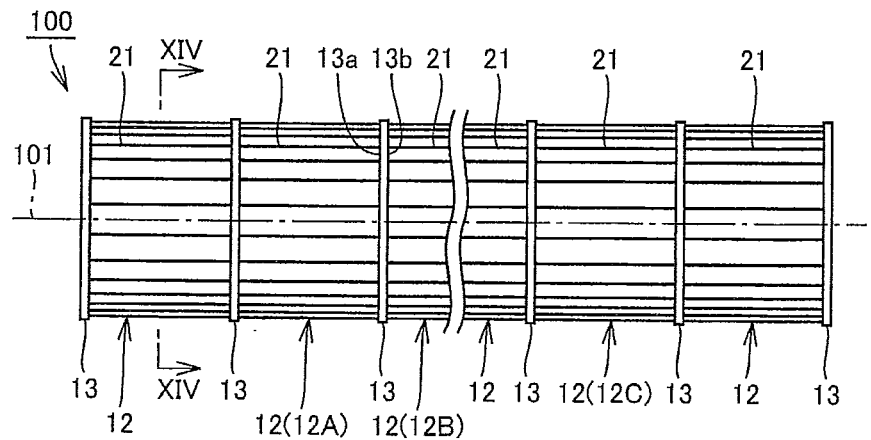
FIG. 13 is a side view of a cross-flow fan according to a third embodiment of the present invention.
Figure 14:
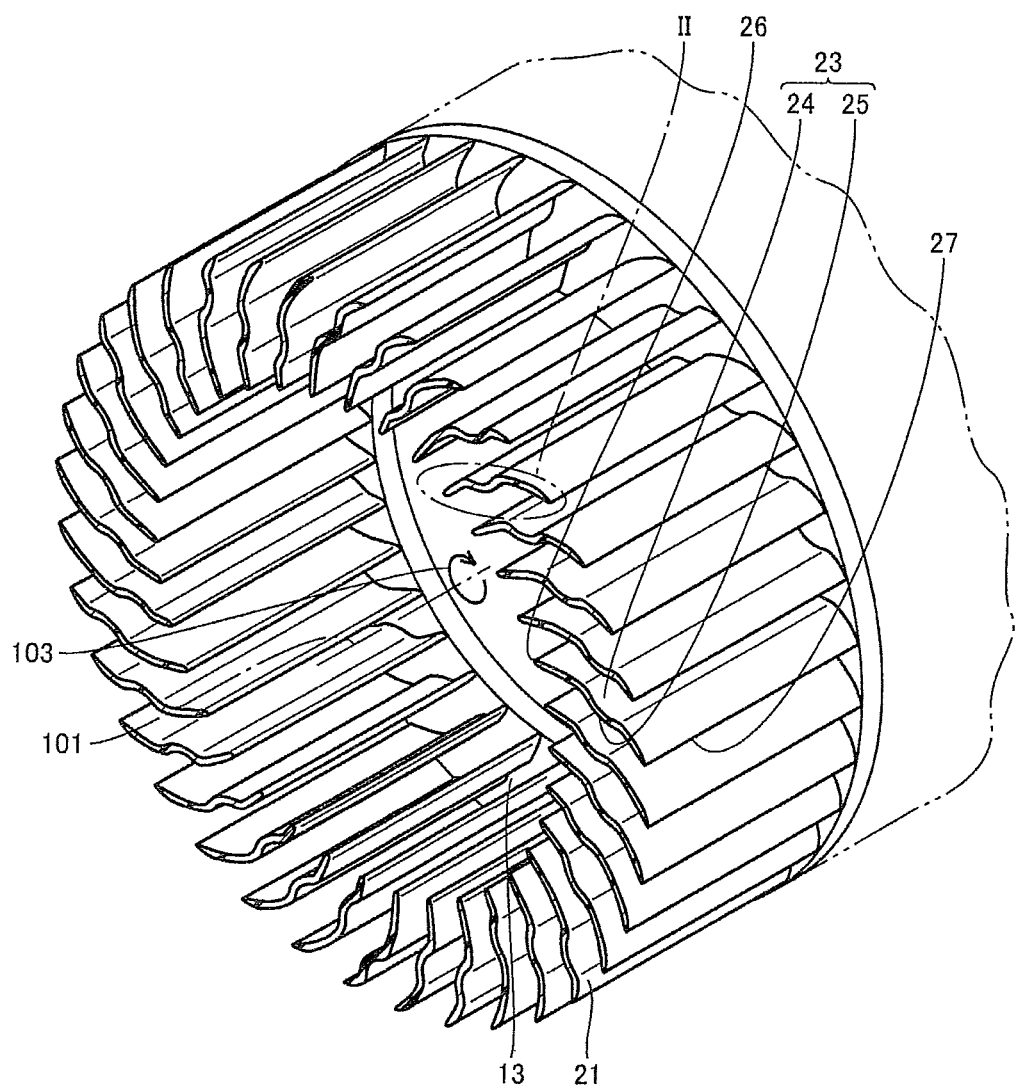
FIG. 14 is a cross-sectional perspective view of the cross-flow fan taken along a line XIV-XIV in FIG. 13.

FIG. 13 is a side view of a cross-flow fan in a third embodiment of the present invention. FIG. 14 is a cross-sectional perspective view of the cross-flow fan taken along a line XIV-XIV in FIG. 13.

Referring to FIG. 13 and FIG. 14, a cross-flow fan 100 in the present embodiment has a plurality of fan blades 21. Cross-flow fan 100 has an approximately cylindrical appearance as a whole. A plurality of fan blades 21 are disposed on a circumferential surface of the approximately cylindrical shape. Cross-flow fan 100 is integrally formed from resin. Cross-flow fan 100 rotates in the direction shown by arrow 103 around an imaginary center axis 101 shown in the figures.

Cross-flow fan 100 is a fan using a plurality of rotating fan blades 21 to output air in a direction orthogonal to center axis 101 serving as the rotation axis. As viewed from the axial direction of center axis 101, cross-flow fan 100 takes in air from an outside space on one side with respect to center axis 101 to an inside space of the fan and outputs the intake air to the outside space on the other side with respect to center axis 101. Cross-flow fan 100 forms an air flow that flows in the direction crossing center axis 101 in a flat plane orthogonal to center axis 101. Cross-flow fan 100 forms an outlet flow in the form of a flat plane parallel to center axis 101.

Cross-flow fan 100 is used with rotation speeds in the low Reynolds number region applied to fans for home electric equipment, etc.

Cross-flow fan 100 is configured such that a plurality of impellers 12 aligned in the axial direction of center axis 101 are combined. In each impeller 12, a plurality of fan blades 21 are provided to be circumferentially spaced apart from each other around center axis 101.

Cross-flow fan 100 further has a peripheral frame 13 serving as a support. Peripheral frame 13 has a ring shape annularly extending around center axis 101. Peripheral frame 13 has an end surface 13a and an end surface 13b. End surface 13a is formed to face one direction along the axial direction of center axis 101. End surface 13b is disposed on the back side of end surface 13a and is formed to face the other direction along the axial direction of center axis 101.

Peripheral frame 13 is provided to be interposed between impellers 12 adjacent to each other in the axial direction of center axis 101.

Giving attention to impeller 12A and impeller 12B in FIG. 13 disposed adjacent to each other, a plurality of fan blades 21 provided in impeller 12A are provided to stand on end surface 13a and are formed to extend like plates along the axial direction of center axis 101. A plurality of fan blades 21 provided in impeller 12B are provided to stand on end surface 13b and are formed to extend like plates along the axial direction of center axis 101.

A plurality of fan blades 21 have a structure similar to that of fan blades 21 described in the first embodiment (concave portions 56 and 57 are formed; plural kinds of fan blades 21A to 21E have blade cross sections of different shapes; and fan blades 21A to 21E are arranged in an irregular order).

Cross-flow fan 100 in the present embodiment, however, differs from centrifugal fan 10 in the first embodiment in that a plurality of fan blades 21 are arranged at random pitches. The random pitches are realized by disposing a plurality of fan blades 21 at irregular intervals according to random-number normal distribution. A plurality of impellers 12 are configured such that the arrangement of fan blades 21 is the same. In other words, the intervals at which a plurality of fan blades 21 are arranged and the order in which fan blades 21 are arranged at such intervals in each impeller 12 are equal among impellers 12.

A plurality of impellers 12 are stacked such that a displacement angle $\theta$ is formed between adjacent impellers 12 as viewed from the axial direction of center axis 101. For example, attention is given to impeller 12A, impeller 12B, and impeller 12C in FIG. 13 disposed adjacent to each other in the order of appearance. Impeller 12B is stacked on impeller 12A so as to be displaced about center axis 101 by displacement angle $\theta$ from the position where all of fan blades 21 in impellers 12A and 12B overlap in the axial direction of center axis 101. Impeller 12C is stacked on impeller 12B so as to be displaced about center axis 101 by displacement angle $\theta$ (2$\theta$ when viewed from impeller 12A) from the position where all of fan blades 21 in impellers 12B and 12C overlap in the axial direction of center axis 101.

The reason for providing displacement angle $\theta$ is as follows. The positions of fan blades 21 in different impellers 12 are intentionally displaced in the axial direction of center axis 101, so that the blade passing sounds (nZ sounds) generated in impellers 12 can counteract each other to be weakened.

(Description of Structure of Air Conditioner)

Figure 15:
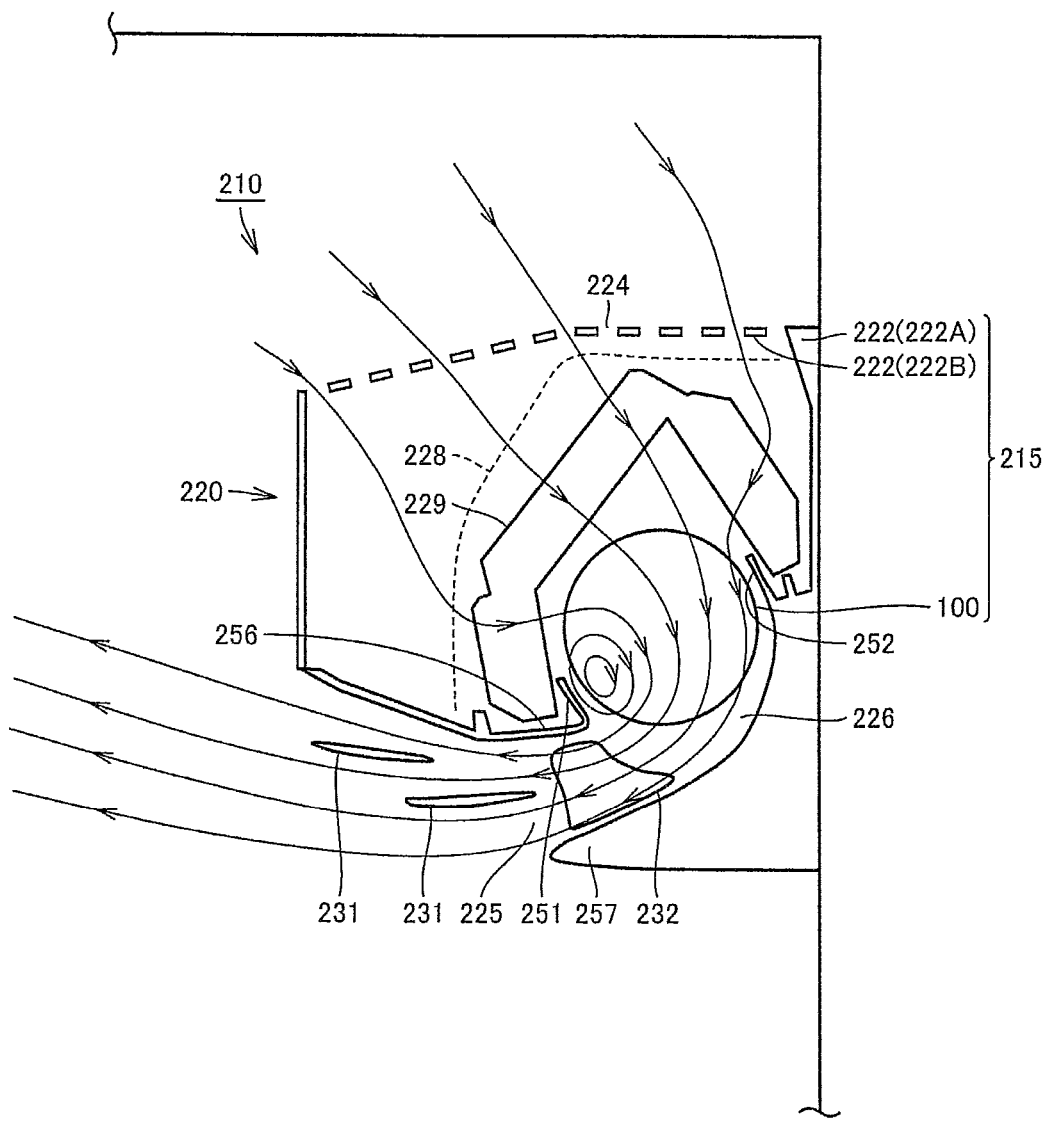
FIG. 15 is a cross-sectional view of an air conditioner using the cross-flow fan shown in FIG. 13.

FIG. 15 is a cross-sectional view of an air conditioner using the cross-flow fan shown in FIG. 13. Referring to FIG. 15, an air conditioner 210 is configured with an indoor unit 220 installed in a room and provided with an indoor heat exchanger 229 and a not-shown outdoor unit installed in the outside of the room and provided with an outdoor heat exchanger and a compressor. Indoor unit 220 and the outdoor unit are connected by piping for circulating refrigerant gas between indoor heat exchanger 229 and the outdoor heat exchanger.

Indoor unit 220 has a blower 215. Blower 215 is configured to include cross-flow fan 100, a not-shown driving motor for rotating cross-flow fan 100, and a casing 222 for producing a prescribed airflow with rotation of cross-flow fan 100.

Casing 222 has a cabinet 222A and a front panel 222B. Cabinet 222A is supported on a wall surface in the room. Front panel 222B is removably attached to cabinet 222A. An outlet port 225 is formed in a gap between a lower end portion of front panel 222B and a lower end portion of cabinet 222A. Outlet port 225 is formed in an approximately rectangular shape extending in the width direction of indoor unit 220 and is provided to be directed forward and downward. On the top surface of front panel 222B, a grid-like intake port 224 is formed.

At a position opposing front panel 222B, an air filter 228 is provided for collecting and removing dust included in the intake air from intake port 224. A not-shown air filter cleaner is provided in a space formed between front panel 222B and air filter 228. The air filter cleaner automatically removes dust accumulated in air filter 228.

In the inside of casing 222, an air flow channel 226 is formed, through which air is circulated from intake port 224 toward outlet port 225. Outlet port 225 is provided with a vertical louver 232 that can change the blowing angle in the left and right directions and a plurality of horizontal louvers 231 that can change the blowing angle in the up and down directions to a forward-upward direction, a horizontal direction, a forward-downward direction, and an immediately downward direction.

Indoor heat exchanger 229 is arranged between cross-flow fan 100 and air filter 228 on a path of air flow channel 226. Indoor heat exchanger 229 has not-shown serpentine refrigerant pipes arranged side by side in a plurality of layers in the up and down directions and in a plurality of columns in the front and back directions. Indoor heat exchanger 229 is connected to the compressor of the outdoor unit installed in the outdoor, and the compressor is driven to operate a refrigeration cycle. Through the operation of the refrigeration cycle, indoor heat exchanger 229 is cooled to a temperature lower than the ambient temperature during cooling operation, and indoor heat exchanger 229 is heated to a temperature higher than the ambient temperature during heating operation.

Figure 16:
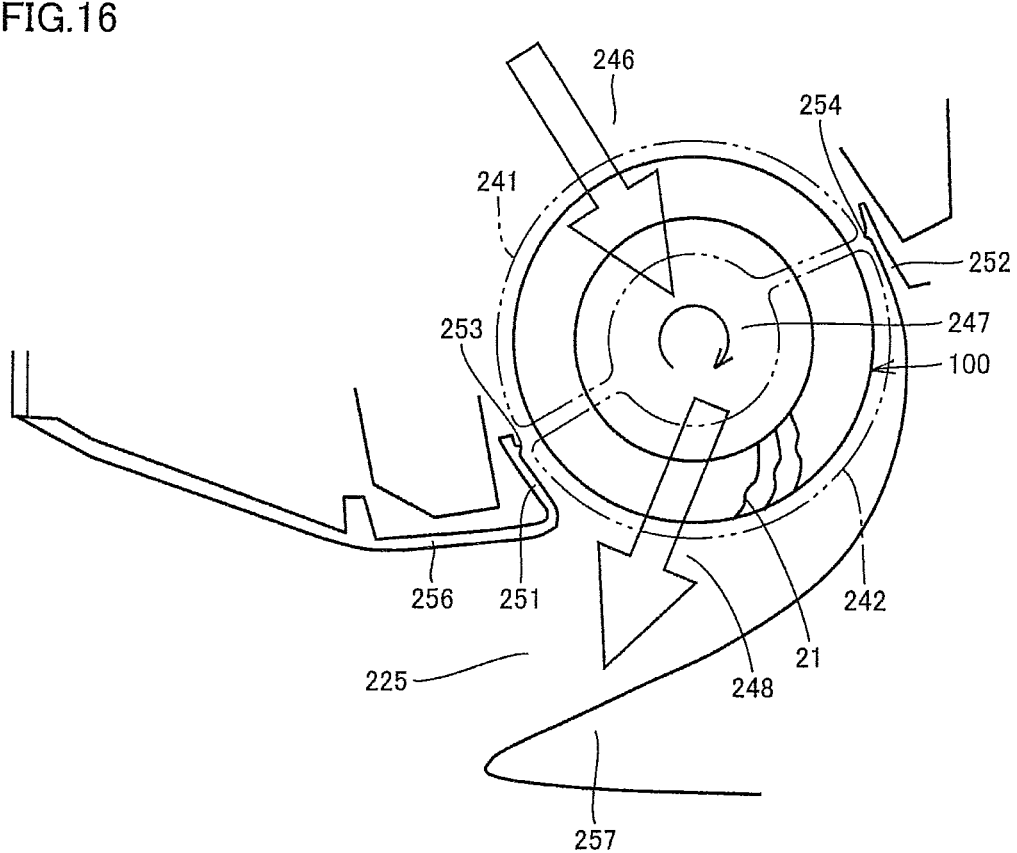
FIG. 16 is an enlarged cross-sectional view showing the proximity of an outlet port of the air conditioner in FIG. 15.

FIG. 16 is an enlarged cross-sectional view showing the proximity of the outlet port of the air conditioner in FIG. 15. Referring to FIG. 15 and FIG. 16, casing 222 has a front wall portion 251 and a rear wall portion 252. Front wall portion 251 and rear wall portion 252 are disposed to face each other at a distance from each other.

On a path of air flow channel 226, cross-flow fan 100 is disposed to be positioned between front wall portion 251 and rear wall portion 252. A protrusion portion 253 is formed at front wall portion 251 to protrude toward the radially outer surface of cross-flow fan 100 so as to decrease the gap between cross-flow fan 100 and front wall portion 251. A protrusion portion 254 is formed at rear wall portion 252 to protrude toward the radially outer surface of cross-flow fan 100 so as to decrease the gap between cross-flow fan 100 and rear wall portion 252.

Casing 222 has an upper guide portion 256 and a lower guide portion 257. Air flow channel 226 is defined by upper guide portion 256 and lower guide portion 257 on the downstream side of air flow from cross-flow fan 100.

Upper guide portion 256 and lower guide portion 257 are continuous from front wall portion 251 and rear wall portion 252, respectively, and extend toward outlet port 225. Upper guide portion 256 and lower guide portion 257 are formed to curve the air output by cross-flow fan 100 with upper guide portion 256 on the inner peripheral side and with lower guide portion 257 on the outer peripheral side, and to guide the air forward and downward. Upper guide portion 256 and lower guide portion 257 are formed such that the cross section of air flow channel 226 increases from cross-flow fan 100 toward outlet port 225.

In the present embodiment, front wall portion 251 and upper guide portion 256 are integrally formed with front panel 222B. Rear wall portion 252 and lower guide portion 257 are integrally formed with cabinet 222A.

In the first embodiment, a phenomenon caused by a disturbance in the airflow in the place where outer edge portion 27 of fan blade 21 approaches the fan casing has been described. In air conditioner 210, the approach place corresponds to a space where front wall portion 251 of casing 222 faces fan blade 21.

Figure 17:
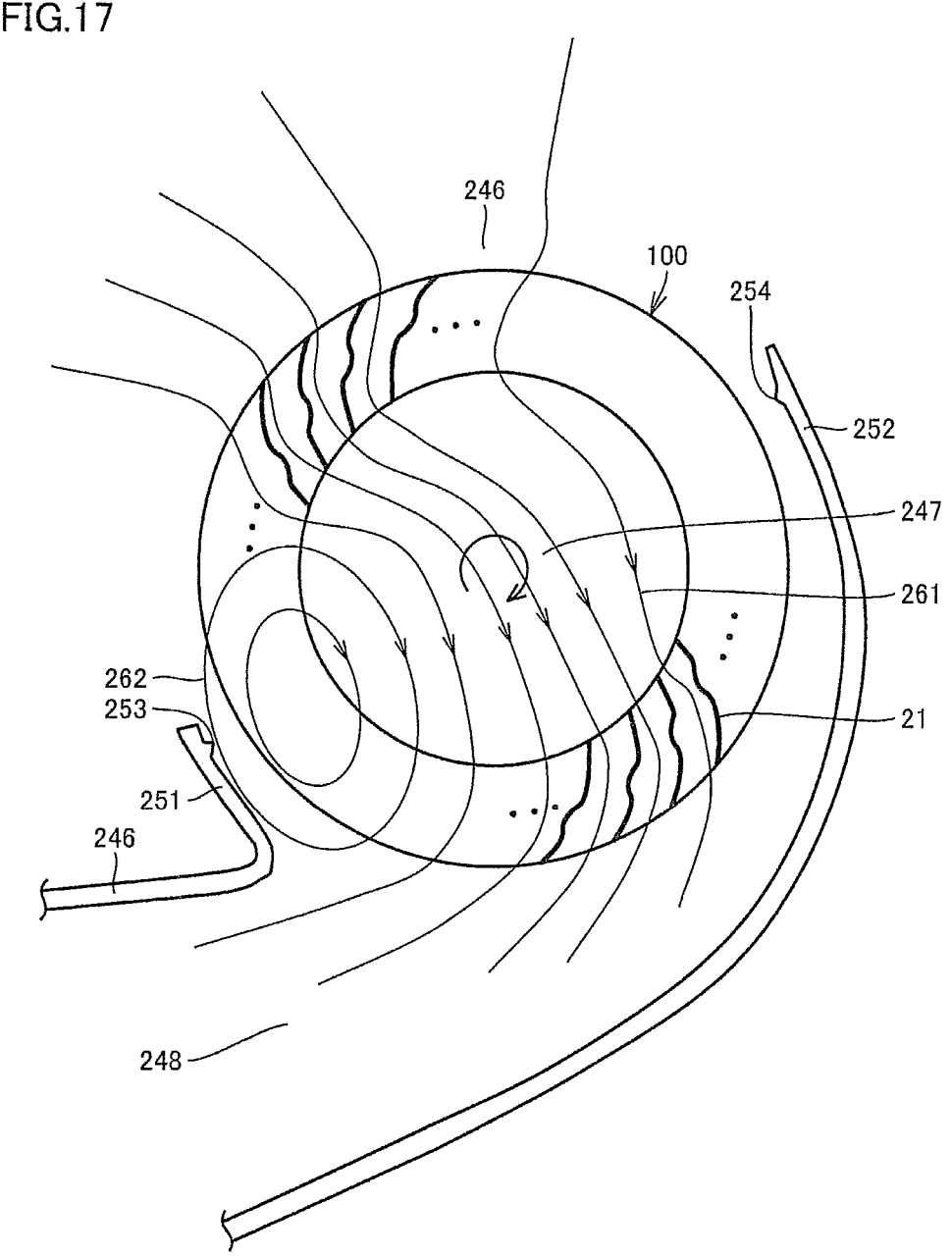
FIG. 17 is a cross-sectional view of an air flow produced in the proximity of the outlet port of the air conditioner in FIG. 15.

FIG. 17 is a cross-sectional view of an air flow produced in the proximity of the outlet port of the air conditioner in FIG. 15. Referring to FIG. 15 to FIG. 17, on the path on air flow channel 226, an upstream outside space 246 is formed to be positioned upstream of air flow from cross-flow fan 100, an inside space 247 is formed to be positioned in the inside of cross-flow fan 100 (the inner peripheral side of a plurality of fan blades 21 circumferentially arranged), and a downstream outside space 248 is formed to be positioned downstream of air flow from cross-flow fan 100.

During rotation of cross-flow fan 100, at an upstream region 241 of air flow channel 226 with respect to protrusion portions 253, 254 as a boundary, an air flow 261 is formed to pass through on blade surface 23 of fan blade 21 from upstream outside space 246 toward inside space 247. At a downstream region 242 of air flow channel 226 with respect to protrusion portions 253, 254 as a boundary, air flow 261 is formed to pass through on blade surface 23 of fan blade 21 from inside space 247 toward downstream outside space 248. Here, at a position adjacent to front wall portion 251, a forced vortex 262 of air flow is formed.

Figure 18:
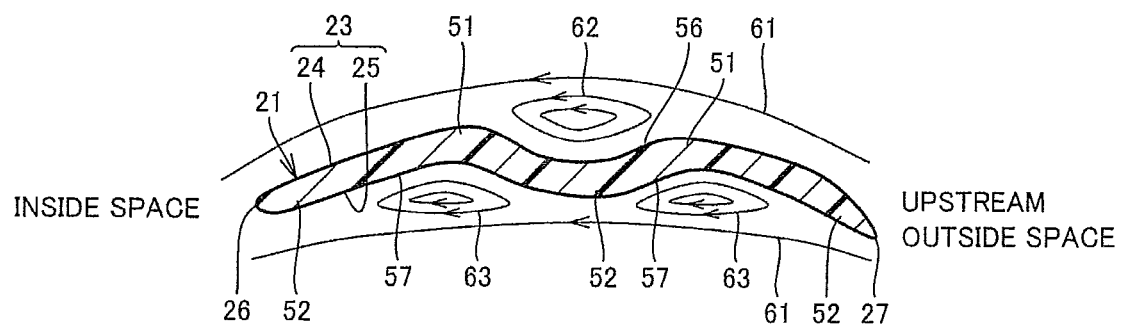
FIG. 18 is a cross-sectional view illustrating a phenomenon that occurs on the blade surface of the fan blade in an upstream region shown in FIG. 16.

FIG. 18 is a cross-sectional view illustrating a phenomenon that occurs on the blade surface of the fan blade in the upstream region shown in FIG. 16.

Referring to FIG. 18, when an air flow directed from upstream outside space 246 toward inside space 247 is formed at upstream region 241 in FIG. 16, an air flow is produced on blade surface 23 of fan blade 21 to flow in from outer edge portion 27, pass through on blade surface 23, and flow out from inner edge portion 26. Here, a clockwise vortex 63 of air flow (secondary flow) is formed in concave portion 57 formed at pressure surface 25, and a counterclockwise vortex 62 of air flow is generated in concave portion 56 formed at suction surface 24. Accordingly, an air flow 61 (main flow) passing through on blade surface 23 flows along the outside of vortexes 63, 62 produced in concave portions 57, 56.

Figure 19:
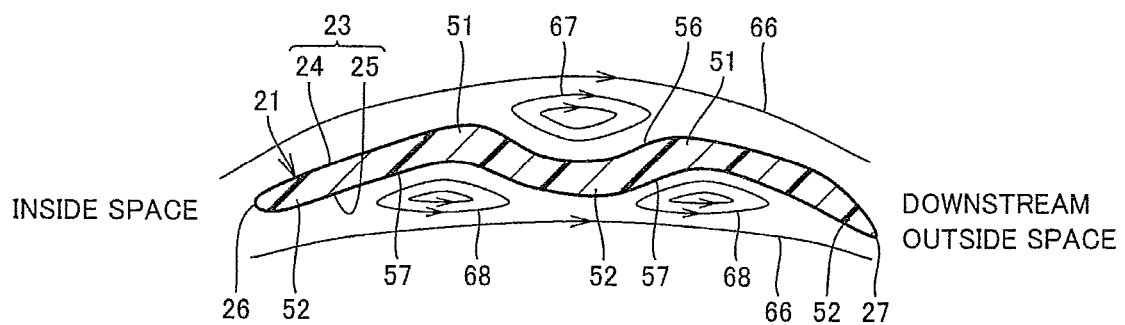
FIG. 19 is a cross-sectional view illustrating a phenomenon that occurs on the blade surface of the fan blade in a downstream region shown in FIG. 16.

FIG. 19 is a cross-sectional view illustrating a phenomenon that occurs on the blade surface of the fan blade in the downstream region shown in FIG. 16.

Referring to FIG. 19, when an air flow directed from inside space 247 toward downstream outside space 248 is formed in downstream region 242 in FIG. 16, an air flow is produced on blade surface 23 of fan blade 21 to flow in from inner edge portion 26, pass through on blade surface 23, and flow out from outer edge portion 27. Here, a counterclockwise vortex 68 of air flow (secondary flow) is formed in concave portion 57 formed at pressure surface 25, and a clockwise vortex 67 of air flow is generated in concave portion 56 formed at suction surface 24. Accordingly, an air flow 66 (main flow) passing through on blade surface 23 flows along the outside of vortexes 68, 67 produced in concave portions 57, 56.

In other words, in cross-flow fan 100, when fan blade 21 moves from upstream region 241 to downstream region 242, the direction of air flow on blade surface 23 is reversed, and the rotational directions of the vortexes produced in concave portions 57, 56 are also reversed accordingly.

In cross-flow fan 100 in the present embodiment, fan blade 21 exhibits a behavior like a thick blade as if the blade cross section is increased in thickness because of vortexes (secondary flows) formed in concave portions 57, 56. As a result, the lift produced at fan blade 21 can be significantly increased.

In cross-flow fan 100, fan blades 21A, 21B, 21C, 21D, and 21E in FIG. 4 different in position of concave portions 56 and 57 are used. Because of this configuration, the narrow-band noise resulting from blade passing sound (nZ sound) and the narrow-band noise resulting from the air flow between fan blades 21 can be reduced. Because of the reduction of narrow-band noise in this manner, the interval between adjacent fan blades 21 can be set to an optimum value based on the blowing capacity required for cross-flow fan 100. In other words, when a plurality of fan blades 21 are arranged at random pitches, variations of the random pitches can minimized.

As shown in FIG. 13, cross-flow fan 100 is configured to include a plurality of impellers 12 aligned in the axial direction of center axis 101. Therefore, when compared with the centrifugal fan previously described, in cross-flow fan 100, a pressure loss of an air flow applied to the fan of each impeller 12 is reduced, so that a back flow of air flow is hardly produced between adjacent fan blades 21. Therefore, in the present embodiment, noise (abnormal sound) at low frequencies resulting from a back flow of air flow can be prevented even in a configuration in which a plurality of fan blades 21 are arranged at random pitches.

Cross-flow fan 100 may also be configured such that a plurality of fan blades 21 are arranged at regular pitches as shown in FIG. 5 and FIG. 6. Although an air conditioner has been described by way of example in this embodiment, the cross-flow fan in the present invention is also applicable to a fluid feeding device such as, for example, an air purifier, a humidifier, a cooling device, and a ventilating device.

Cross-flow fan 100 and air conditioner 210 in the third embodiment of the present invention configured in this manner can achieve the effects described in the first embodiment similarly.

The structures of the fans described in the first to third embodiments as described above may be combined as appropriate to configure a new fan. For example, cross-flow fan 100 in the third embodiment may be configured using the fan blades described in the second embodiment.

Fourth Embodiment

In the present embodiment, first of all, a structure of a cross-flow fan to which a fan in the present invention is applied will be described. Next, structures of an air conditioner using the cross-flow fan and a molding die for use in production of the cross-flow fan will be described.

(Description of Structure of Cross-Flow Fan)

Figure 20:
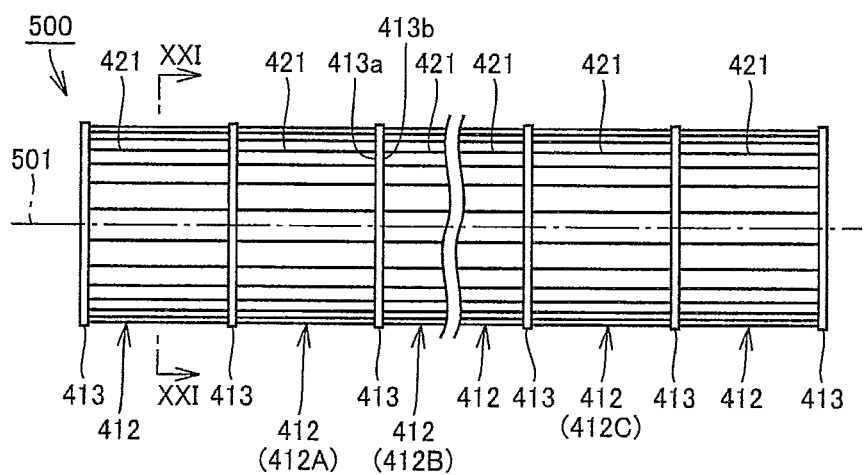
FIG. 20 is a side view of a cross-flow fan according to a fourth embodiment of the present invention.
Figure 21:
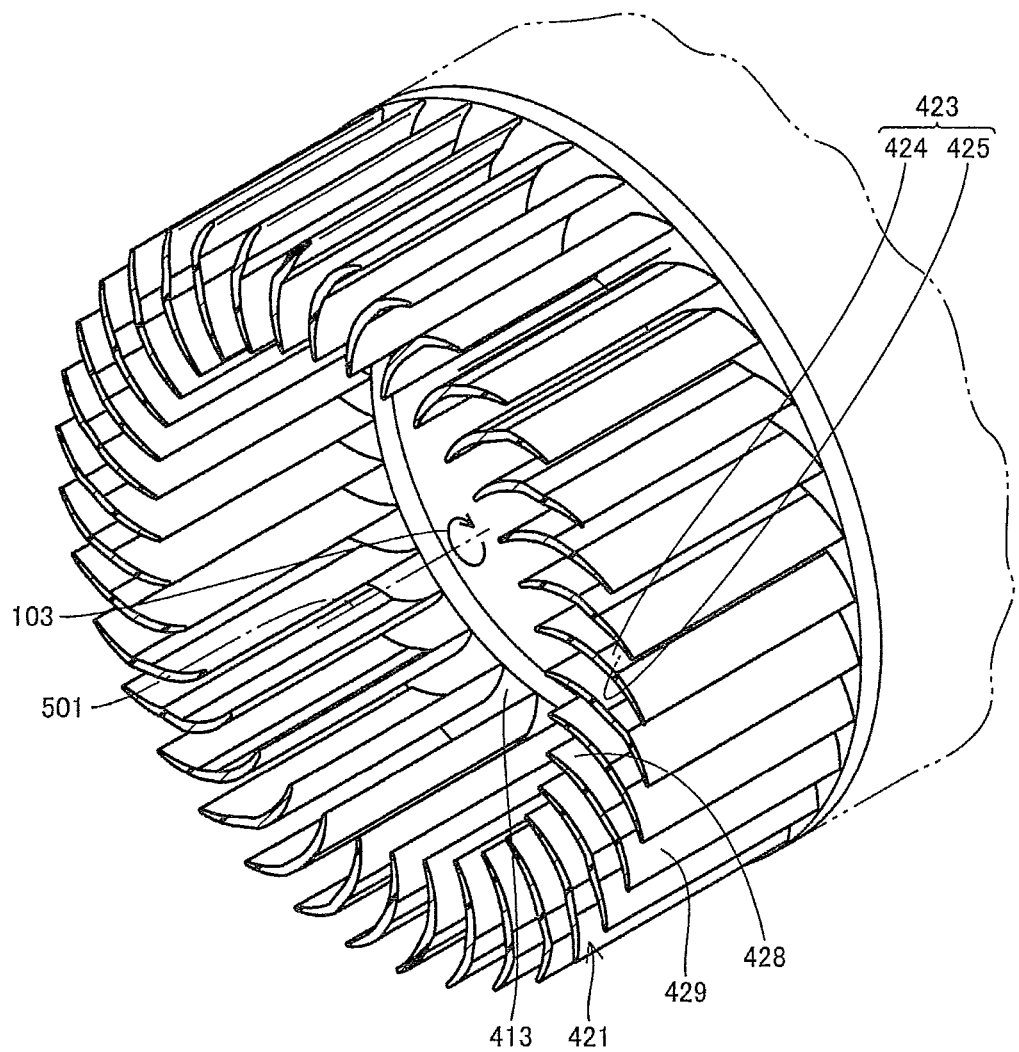
FIG. 21 is a cross-sectional perspective view of the cross-flow fan taken along a line XXI-XXI in FIG. 20.

FIG. 20 is a side view of a cross-flow fan in a fourth embodiment of the present invention. FIG. 21 is a cross-sectional perspective view of the cross-flow fan taken along a line XXI-XXI in FIG. 20.

Referring to FIG. 20 and FIG. 21, a cross-flow fan 500 in the present embodiment has a plurality of fan blades 421. Cross-flow fan 500 has an approximately cylindrical appearance as a whole. A plurality of fan blades 421 are disposed on a circumferential surface of the approximately cylindrical shape. Cross-flow fan 500 is integrally formed from resin. Cross-flow fan 500 rotates in the direction shown by arrow 103 around an imaginary center axis 501 shown in the figures.

Cross-flow fan 500 is a fan using a plurality of rotating fan blades 421 to flow air in a direction orthogonal to center axis 501 serving as the rotation axis. As viewed from the axial direction of center axis 501, cross-flow fan 500 takes in air from an outside space on one side with respect to center axis 501 to an inside space of the fan and outputs the intake air to the outside space on the other side with respect to center axis 501. Cross-flow fan 500 forms an air flow that flows in the direction crossing center axis 501 in a flat plane orthogonal to center axis 501. Cross-flow fan 500 forms an outlet flow in the form of a flat plane parallel to center axis 501.

Cross-flow fan 500 is used with rotation speeds in the low Reynolds number region applied to fans for home electric equipment, etc.

Cross-flow fan 500 is configured such that a plurality of impellers 412 aligned in the axial direction of center axis 501 are combined. In each impeller 412, a plurality of fan blades 421 are provided to be circumferentially spaced apart from each other around center axis 501.

Cross-flow fan 500 further has a peripheral frame 413 serving as a support. Peripheral frame 413 has a ring shape annularly extending around center axis 501. Peripheral frame 413 has an end surface 413a and an end surface 413b. End surface 413a is formed to face one direction along the axial direction of center axis 501. End surface 413b is disposed on the back side of end surface 413a and is formed to face the other direction along the axial direction of center axis 501.

Peripheral frame 413 is provided to be interposed between impellers 412 adjacent to each other in the axial direction of center axis 501.

Giving attention to impeller 412A and impeller 412B in FIG. 20 disposed adjacent to each other, a plurality of fan blades 421 provided in impeller 412A are provided to stand on end surface 413a and are formed to extend like plates along the axial direction of center axis 501. A plurality of fan blades 421 provided in impeller 412B are provided to stand on end surface 413b and are formed to extend like plates along the axial direction of center axis 501.

FIG. 21 shows a blade cross section of fan blade 421 cut along a plane orthogonal to center axis 501 serving as a rotation axis of cross-flow fan 500.

Fan blade 421 has an inner peripheral blade tip portion 428 and an outer peripheral blade tip portion 429. Inner peripheral blade tip portion 428 is disposed at an end portion on the inner peripheral side of fan blade 421. Outer peripheral blade tip portion 429 is disposed at an end portion on the outer peripheral side of fan blade 421. Fan blade 421 is formed to be inclined in the circumferential direction around center axis 501 from inner peripheral blade tip portion 428 toward outer peripheral blade tip portion 429. Fan blade 421 is formed to be inclined in the rotational direction of cross-flow fan 500 from inner peripheral blade tip portion 428 toward outer peripheral blade tip portion 429.

Fan blade 421 has a blade surface 423 including a pressure surface 425 and a suction surface 424. Pressure surface 425 is disposed on the rotational direction side of cross-flow fan 500, and suction surface 424 is disposed on the back side of pressure surface 425. During rotation of cross-flow fan 500, as an air flow is produced on the blade surface 423, a pressure distribution is generated in such a manner that pressure is relatively large at pressure surface 425 and is relatively small at suction surface 424. Fan blade 421 has a bent shape as a whole between inner peripheral blade tip portion 428 and outer peripheral blade tip portion 429 so that fan blade 421 is concave on the pressure surface 425 side and convex on the suction surface 424 side.

Fan blade 421 is formed to have a uniform blade cross section when cut anywhere in the axial direction of center axis 501. Fan blade 421 is formed to have a thin blade cross section between inner peripheral blade tip portion 428 and outer peripheral blade tip portion 429. Fan blade 421 is formed to have an almost constant thickness (the length between pressure surface 425 and suction surface 424) between inner peripheral blade tip portion 428 and outer peripheral blade tip portion 429.

In cross-flow fan 500 in the present embodiment, the shape and arrangement of each fan blade 421 is determined so that an "outer peripheral blade tip angle," an "inner peripheral blade tip angle" and a "discrepancy angle" satisfy a predetermined relationship among a plurality of fan blades 421. First, the meaning of the terms "outer peripheral blade tip angle," "inner peripheral blade tip angle" and "discrepancy angle" used to describe the structure of cross-flow fan 500 will be described.

Figure 22:
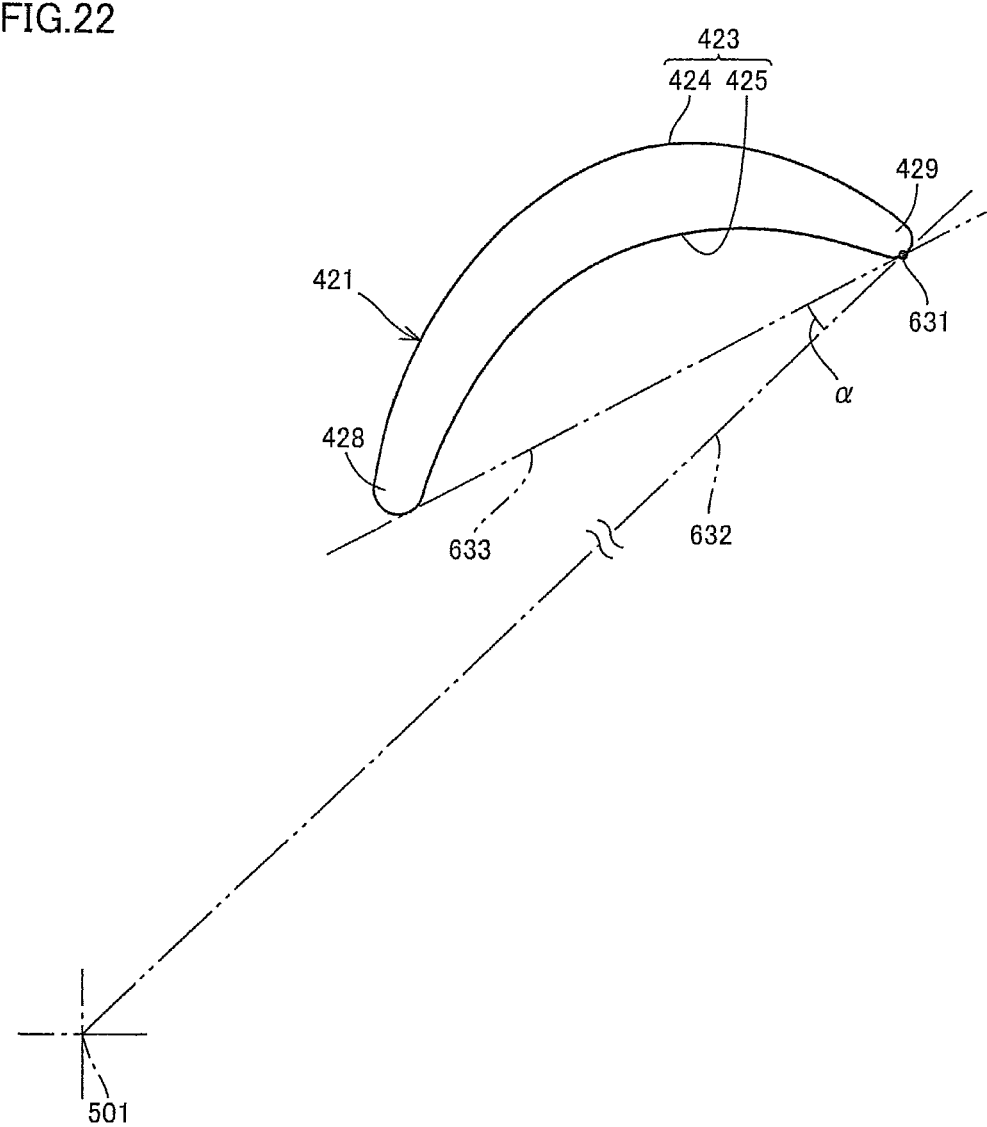
FIG. 22 is a diagram showing a "discrepancy angle."

FIG. 22 is a diagram showing the "discrepancy angle." FIG. 22 illustrates a chord line 633 in contact with inner peripheral blade tip portion 428 and outer peripheral blade tip portion 429. Chord line 633 is in contact with blade surface 423 from the pressure surface 425 side at inner peripheral blade tip portion 428 and at outer peripheral blade tip portion 429. Chord line 633 is a straight line. The point at which chord line 633 and outer peripheral blade tip portion 429 intersect is shown as a contact point 631. The figure also shows a straight line 632 passing through center axis 501 serving as the rotational center of cross-flow fan 500 and contact point 631.

In this case, the angle α between chord line 633 and straight line 632 is the discrepancy angle. The discrepancy angle is an angle of inclination of chord line 633 with reference to straight line 632 passing through center axis 501 and contact point 631. The discrepancy angle α in the figure is smaller than 90°.

Figure 23:
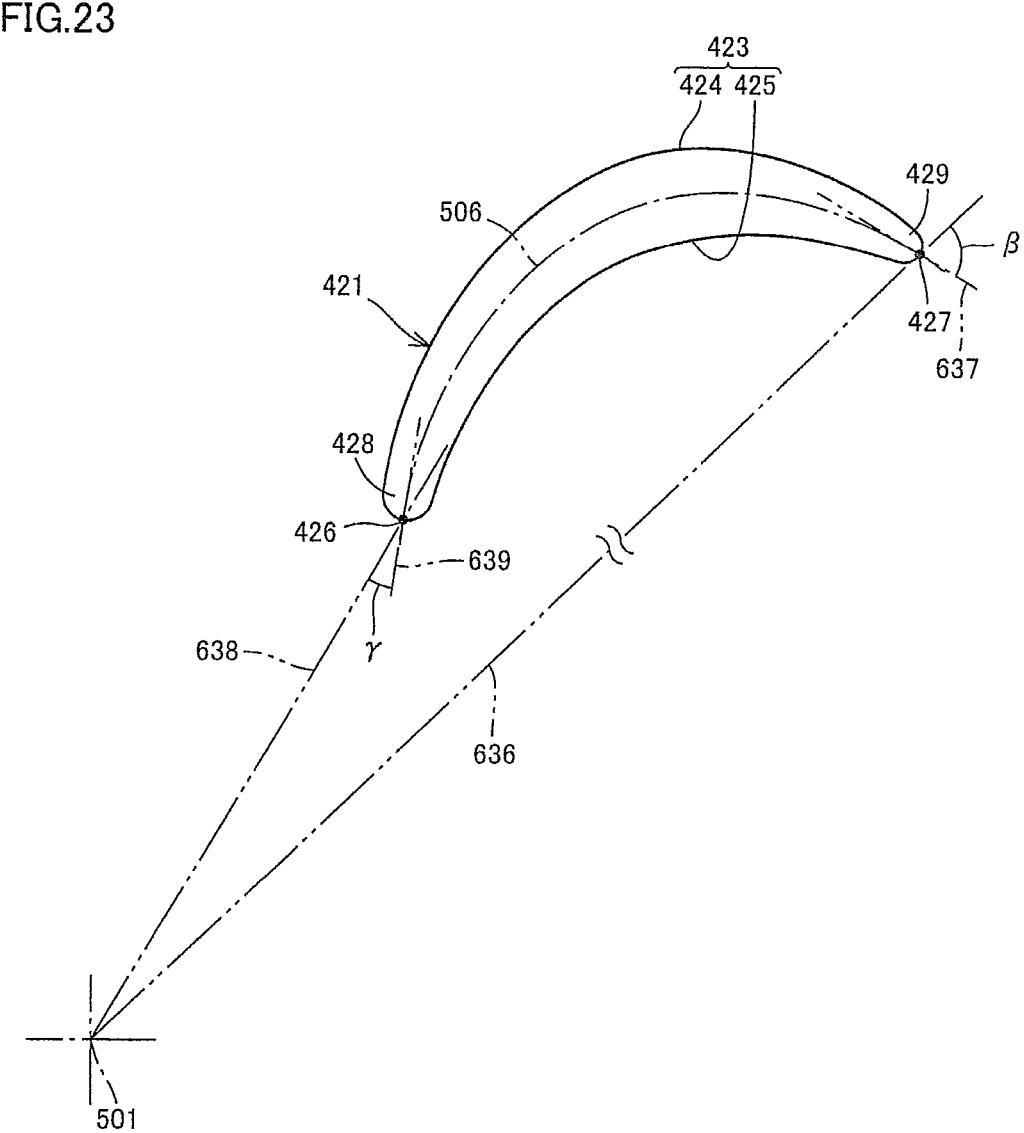
FIG. 23 is a diagram showing an "outer peripheral blade tip angle" and an "inner peripheral blade tip angle."

FIG. 23 is a diagram showing the "outer peripheral blade tip angle" and the "inner peripheral blade tip angle." FIG. 23 illustrates a center line 506 in the thickness direction (the direction connecting pressure surface 425 and suction surface 424) of the blade cross section of fan blade 421. Center line 506 extends in the blade cross section so as to divide the blade cross section of fan blade 421 into the pressure surface 425 side and the suction surface 424 side. Fan blade 421 has an outer edge portion 427 at a position where center line 506 intersects outer peripheral blade tip portion 429, and an inner edge portion 426 at a position where center line 506 intersects inner peripheral blade tip portion 428. Center line 506 continuously extends between outer edge portion 427 and inner edge portion 426.

The figure also shows a tangent 637 on outer edge portion 427 with respect to center line 506, and a tangent 639 on inner edge portion 426 with respect to center line 506. In the example in the figure, center line 506 is curved at outer edge portion 427 and inner edge portion 426. However, in the case where it extends in a straight line, tangent 637 and tangent 639 overlap with center line 506 at outer edge portion 427 and inner edge portion 426, respectively.

The figure also shows a straight line 636 passing through center axis 501 serving as the rotational center of cross-flow fan 500 and outer edge portion 427, and a straight line 638 passing through center axis 501 serving as the rotational center of cross-flow fan 500 and inner edge portion 426.

In this case, the angle β between straight line 636 and tangent 637 is the outer peripheral blade tip angle, and the angle γ between straight line 638 and tangent 639 is the inner peripheral blade tip angle. The outer peripheral blade tip angle means the angle of outer peripheral blade tip portion 429 at outer edge portion 427 with reference to straight line 636 passing through center axis 501 and outer edge portion 427. The inner peripheral blade tip angle means the angle of inner peripheral blade tip portion 428 at inner edge portion 426 with reference to straight line 638 passing through center axis 501 and inner edge portion 426. The outer peripheral blade tip angle β and the inner peripheral blade tip angle γ shown in the figure are smaller than 90°.

Figure 24:
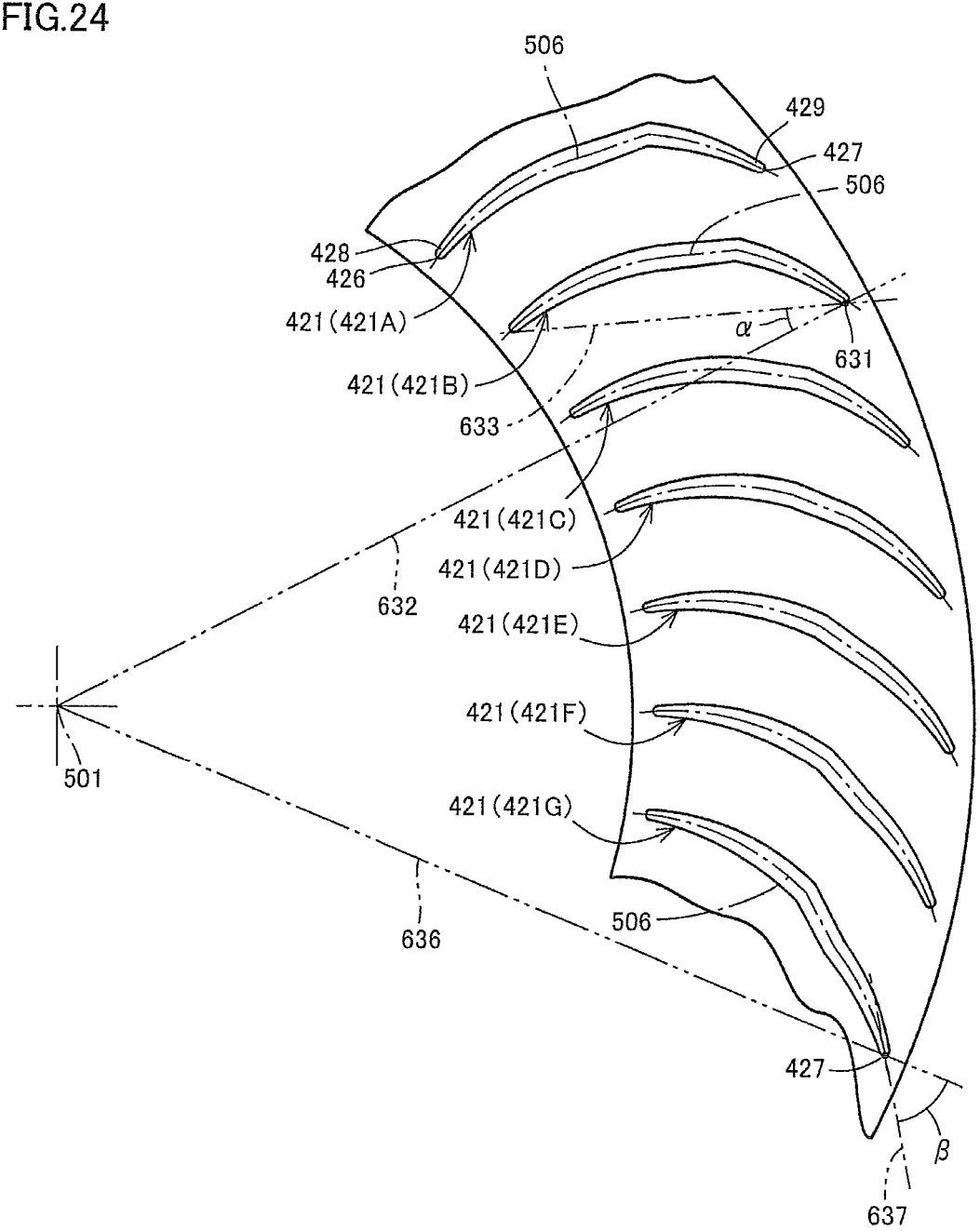
FIG. 24 is a cross-sectional view showing a shape and arrangement of fan blades in the cross-flow fan in FIG. 20.

FIG. 24 is a cross-sectional view showing a shape and arrangement of fan blades in the cross-flow fan in FIG. 20. Referring to FIG. 24, in cross-flow fan 500 in the present embodiment, a plurality of fan blades 421 are comprised of plural kinds of fan blades 421A, 421B, 421C, 421D, 421E, 421F, and 421G. Fan blades 421A to 421G have blade cross sections of different shapes. A plurality of fan blades are provided for each of fan blades 421A to 421G.

Figure 25:
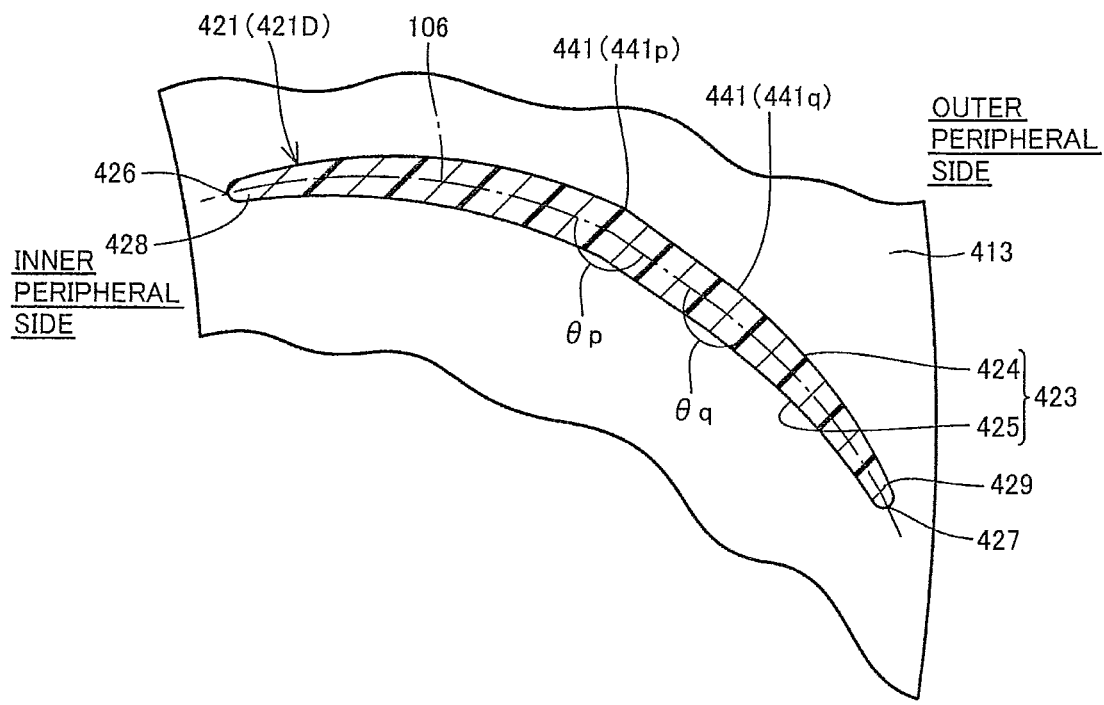
FIG. 25 is an enlarged cross-sectional view showing a blade cross section of the fan blade.
Figure 26:
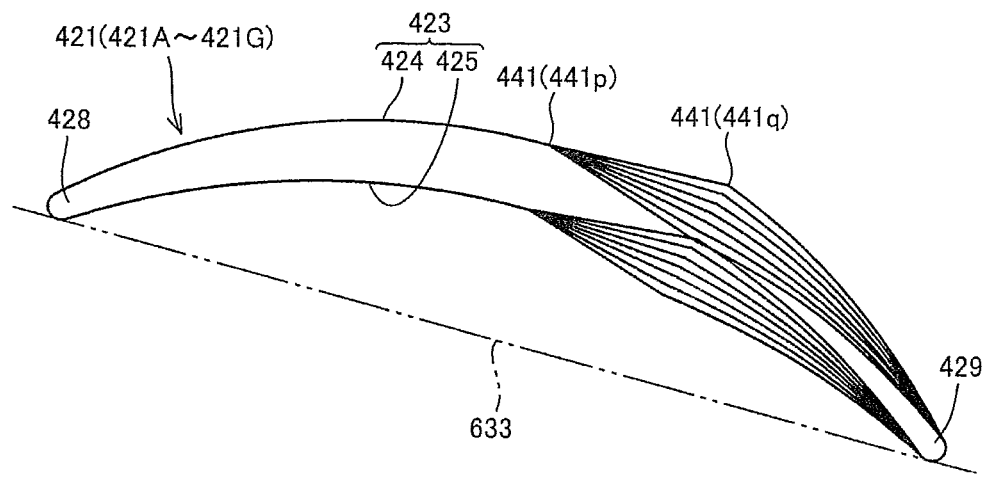
FIG. 26 is a diagram showing that plural kinds of fan blades in FIG. 24 are overlapped with each other.

FIG. 25 is an enlarged cross-sectional view showing a blade cross section of the fan blade. In the figure, a blade cross section of fan blade 421D in FIG. 24 is representatively illustrated. FIG. 26 is a diagram showing that plural kinds of fan blades in FIG. 24 are overlapped with each other.

Referring to FIG. 24 to FIG. 26, a plurality of fan blades 421 are provided such that the discrepancy angle α of each fan blade 421 is equal among fan blades 421. In other words, the angle at which fan blade 421 extending from inner peripheral blade tip portion 428 to outer peripheral blade tip portion 429 is inclined in the circumferential direction around center axis 501 is equal among fan blades 421.

As far as the range shown in FIG. 24 is concerned, the discrepancy angles α of fan blades 421A to 421G are equal to each other. Therefore, as shown in FIG. 26, when fan blades 421A to 421G are rotated in the circumferential direction around center axis 501 and overlapped on any one of the fan blades, chord lines 633 of fan blades 421A to 421G overlie one another.

A plurality of fan blades 421 include fan blades 421A to 421G in which at least one of the outer peripheral blade tip angle and the inner peripheral blade tip angle of each fan blade 421 is different from each other. In the present embodiment, fan blades 421A to 421G are provided such that the outer peripheral blade tip angle β of each fan blade is different among fan blades 421A to 421G. Therefore, as shown in FIG. 26, when fan blades 421A to 421G are rotated in the circumferential direction around center axis 501 and overlapped on any one of the fan blades, outer peripheral blade tip portions 429 of fan blades 421A to 421G do not overlie one another.

Fan blade 421 has flection portions 441 at which center line 506 of the blade cross section of fan blade 421 is flexed at different points between inner edge portion 426 and outer edge portion 427. In the present embodiment, fan blade 421 has flection portions 441 at two points between inner edge portion 426 and outer edge portion 427. Fan blade 421 has a flection portion 441q at a position adjacent to outer edge portion 427 and a flection portion 441p at the blade midpoint between inner edge portion 426 and outer edge portion 427. At flection portion 441q, center line 506 is bent by a flection angle θq. At flection portion 441p, center line 506 is bent by a flection angle θp.

Fan blades 421A to 421G are formed such that the flection angle θq is different among the fan blades. More specifically, in fan blade 421A, flection portion 441q is convex on the suction surface 424 side and is concave on the pressure surface 425 side (θq<180°). The flection angle θq gradually increases in fan blades 421B, 421C, 421D, 42W, 421F, and 421G in this order. In fan blade 421G, flection portion 441q is convex on the pressure surface 425 side and is concave on the suction surface 424 side (θq>180°). The inclination of outer peripheral blade tip portion 429 changes with changing flection angle θq at flection portion 441q, so that the outer peripheral blade tip angle differs among fan blades 421A to 421G.

The flection angle θp also changes with changing flection angle θq. As shown in FIG. 26, the flection angle θp changes such that the blade cross sections of fan blades 421A to 421G are kept overlapped on the side of inner peripheral blade tip portion 428.

The flection structure of flection portions 441 can improve the strength of fan blade 421. As a result, the reliability of the strength of the fan can be improved although cross-flow fan 500 is a resin fan having a thin blade cross section. The improvement in strength can reduce the thickness of fan blade 421 accordingly. Therefore, the weight of cross-flow fan 500 can be reduced and the cost thereof also can be reduced.

In the present embodiment, flection portion 441 is formed to be bent to form a corner. However, flection portion 441 may be formed to be bent so as to be rounded.

Figure 27:
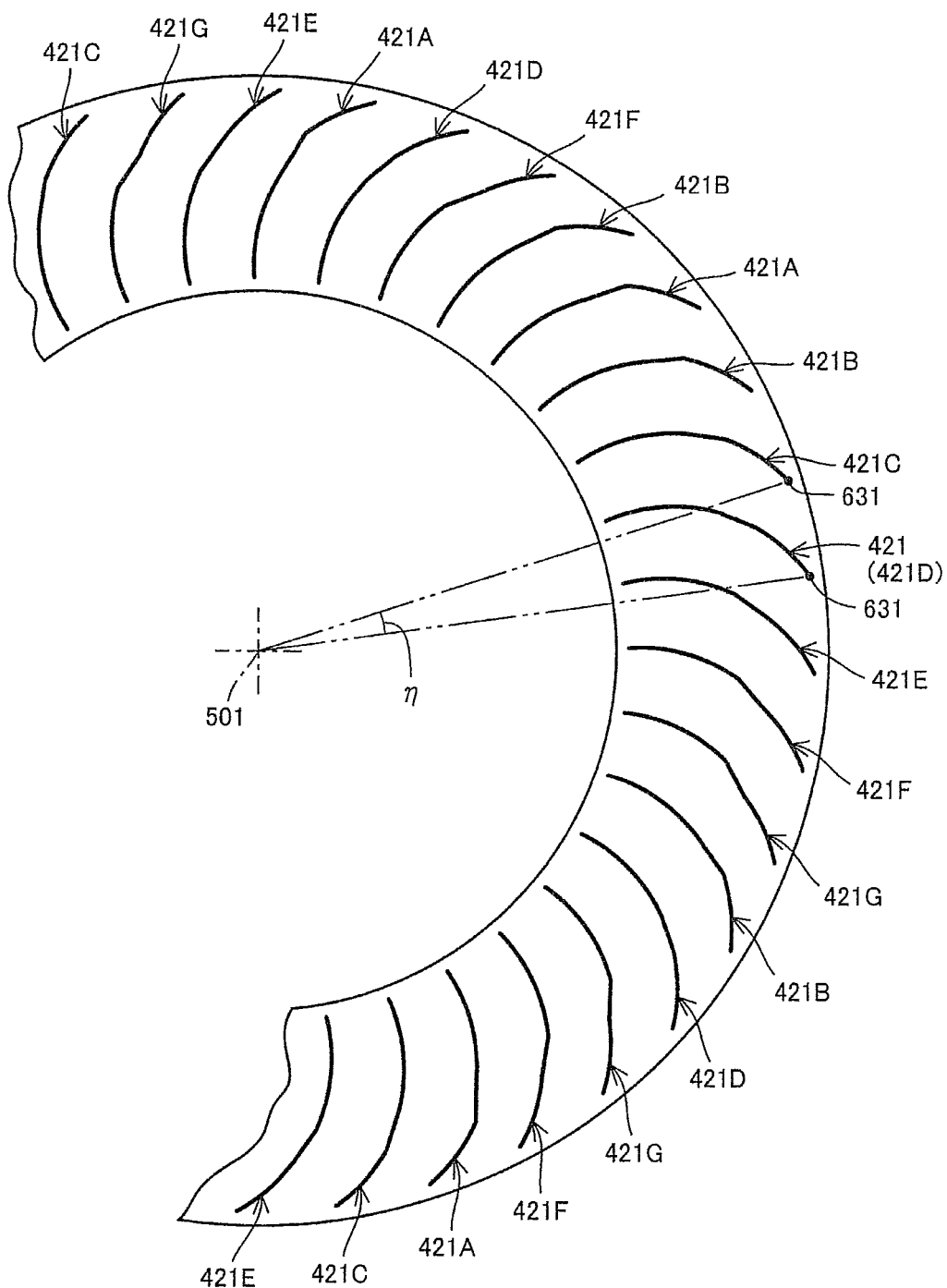
FIG. 27 is a diagram schematically showing an arrangement of fan blades in the cross-flow fan in FIG. 20.

FIG. 27 is a diagram schematically showing an arrangement of fan blades in the cross-flow fan in FIG. 20. Referring to FIG. 27, fan blades 421A, 421B, 421C, 421D, 421E, 421F, and 421G are arranged so as to be placed in an irregular (random) order in the circumferential direction around center axis 501. More specifically, fan blades 421A to 421E are arranged so as not be repeatedly placed in a regular order (for example, fan blades 421A→421B→421C→421D→421E→421F→421G→421A→421B→421C→421D→421E→421F→421G→421A→421B . . . ).

In the example shown in FIG. 27, fan blades 421C, 421G, 421E, 421A, 421D, 421F, 421B, 421A, 421B, 421C, 421D, 421E, 421F, 421G, 421B, 421D, 421G, 421F, 421A, 421C, 421E are placed in order clockwise around center axis 501.

In the example above, seven kinds of fan blades 421A to 421G make one set, and plural sets of fan blades 421A to 421G placed in different orders are disposed in order. However, the configuration is not limited thereto. For example, a plurality of fan blades may be prepared for each of fan blade 421A to 421G, and fan blades selected therefrom as appropriate may be placed in order. As long as fan blades 421A to 421G are arranged without a regularity as a whole, fan blades of a particular kind may be placed in succession. The number of each of fan blades 421A to 421G for use in cross-flow fan 500 may not be completely equal. All of fan blades 421 for use in cross-flow fan 500 may have blade cross-sectional shapes different from each other. Preferably, at least three kinds, more preferably, at least four kinds of fan blades 421 are used.

Referring to FIG. 20 and FIG. 27, a plurality of fan blades 421 are arranged such that the pitch between adjacent fan blades 421 (in FIG. 27, the angle η of a straight line passing through center axis 501 and contact point 631 between adjacent fan blades 421) is random. The random pitches are realized by disposing a plurality of fan blades 421 at irregular intervals according to random-number normal distribution.

A plurality of impellers 412 are configured such that the arrangement of fan blades 421 is the same. In other words, the intervals at which a plurality of fan blades 421 are arranged and the order in which fan blades 421 are arranged at such intervals in each impeller 412 are the same among impellers 412.

A plurality of fan blades 421 may be arranged at regular pitches rather than at random pitches.

A plurality of impellers 412 are stacked such that a displacement angle T is formed between adjacent impellers 412 as viewed from the axial direction of center axis 501. For example, attention is given to impeller 412A, impeller 412B, and impeller 412C in FIG. 20 disposed adjacent to each other in the order of appearance. Impeller 412B is stacked on impeller 412A so as to be displaced about center axis 501 by displacement angle T from the position where all of fan blades 421 in impellers 412A and 412B overlap in the axial direction of center axis 501. Impeller 412C is stacked on impeller 412B so as to be displaced about center axis 501 by displacement angle T (2T when viewed from impeller 412A) from the position where all of fan blades 421 in impellers 412B and 412C overlap in the axial direction of center axis 501.

The structure of cross-flow fan 500 as a fan in the fourth embodiment of the present invention as described above is summarized as follows. Cross-flow fan 500 in the present embodiment has fan blades 421 as a plurality of blade portions arranged spaced apart from each other in the circumferential direction. Fan blade 421 has blade surface 423 including pressure surface 425 disposed on the rotational direction side of the fan and suction surface 424 disposed on the back side of pressure surface 425. When cut along the plane orthogonal to center axis 501 serving as the rotation axis of the fan, fan blade 421 has inner edge portion 426 at which center line 506 between pressure surface 425 and suction surface 424 intersects inner peripheral blade tip portion 428 that is a blade tip on the inner peripheral side, and outer edge portion 427 at which center line 506 intersects outer peripheral blade tip portion 429 that is a blade tip on the outer peripheral side. As the fan is rotated, an air flow as a fluid flow flowing between inner edge portion 426 and outer edge portion 427 is generated on blade surface 423.

The outer peripheral blade tip angle is defined as the angle between straight line 636 passing through center axis 501 as the rotational center of the fan and outer edge portion 427, and tangent 637 of center line 506 at outer edge portion 427. The inner peripheral blade tip angle is defined as the angle between straight line 638 passing through center axis 501 as the rotational center of the fan and inner edge portion 426, and tangent 639 of center line 506 at inner edge portion 426. The discrepancy angle is defined as the angle formed between chord line 633 in contact with inner peripheral blade tip portion 428 and outer peripheral blade tip portion 429 on the pressure surface 425 side, and straight line 632 passing through center axis 501 as the rotational center of the fan and contact point 631 of chord line 633 with outer peripheral blade tip portion 429.

In this case, a plurality of fan blades 421 include fan blades 421A to 421G as a first blade portion and a second blade portion whose outer peripheral blade tip angles, as at least one of the outer peripheral blade tip angle and the inner peripheral blade tip angle, are different from each other. A plurality of fan blades 421 are provided such that the discrepancy angles of fan blades 421 are equal to each other.

In the present embodiment, a plurality of fan blades 421 comprised of fan blades 421A to 421G whose outer peripheral blade tip angles are different from each other have been described. However, a plurality of fan blades 421 may be comprised of plural kinds of fan blades whose inner peripheral blade tip angles are different from each other, or may be comprised of plural kinds of fan blades whose outer peripheral blade tip angles and inner peripheral blade tip angles are both different from each other.

(Description of Structures of Air Conditioner and Molding Die)

Figure 28:
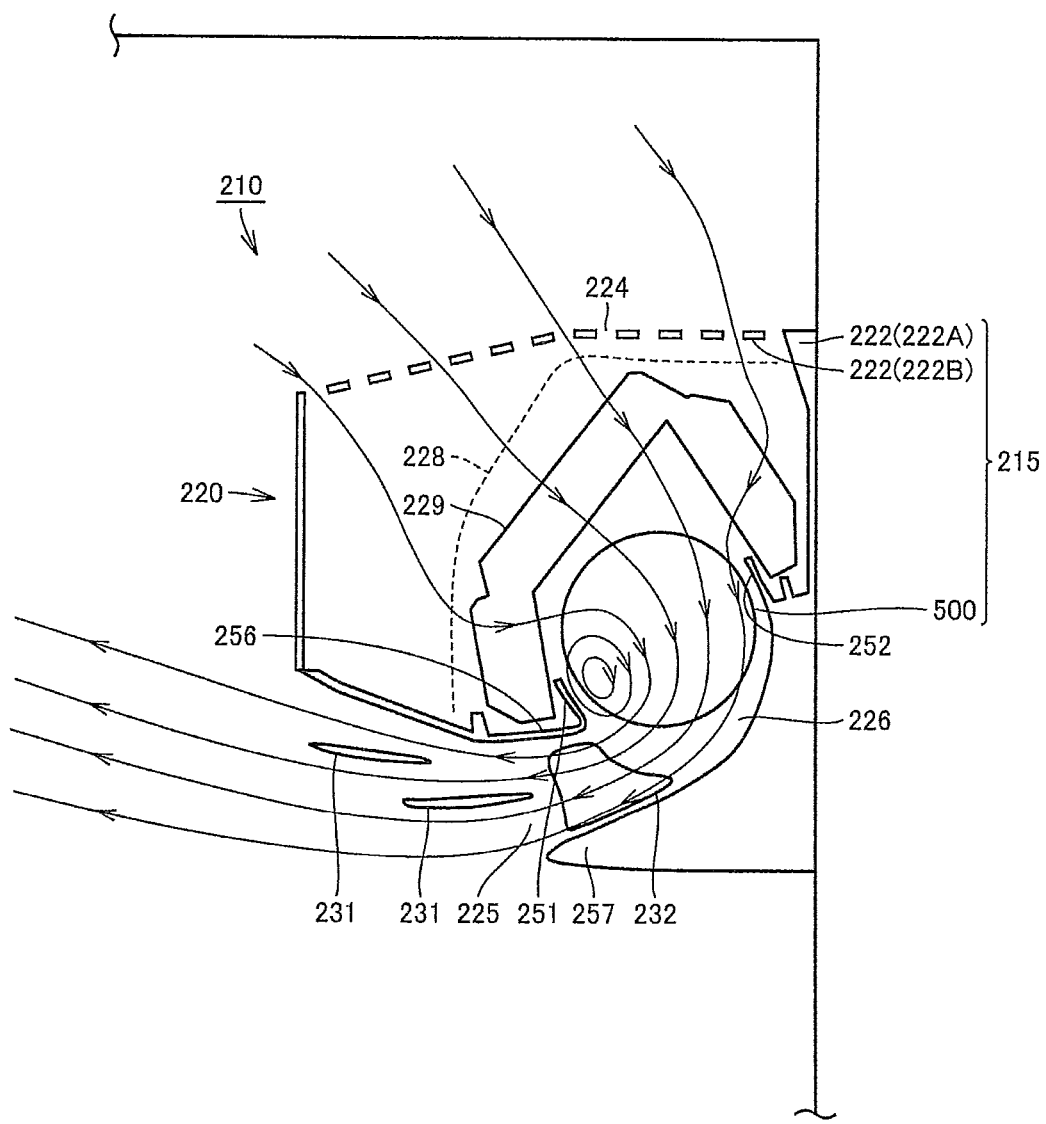
FIG. 28 is a cross-sectional view of an air conditioner using the cross-flow fan shown in FIG. 20.

FIG. 28 is a cross-sectional view of an air conditioner using the cross-flow fan in FIG. 20. Referring to FIG. 28, an air conditioner 210 is configured with an indoor unit 220 installed in a room and provided with an indoor heat exchanger 229 and a not-shown outdoor unit installed in the outside of the room and provided with an outdoor heat exchanger and a compressor. Indoor unit 220 and the outdoor unit are connected by piping for circulating refrigerant gas between indoor heat exchanger 229 and the outdoor heat exchanger.

Indoor unit 220 has a blower 215. Blower 215 is configured to include cross-flow fan 500, a not-shown driving motor for rotating cross-flow fan 500, and a casing 222 for producing a prescribed airflow with rotation of cross-flow fan 500.

Casing 222 has a cabinet 222A and a front panel 222B. Cabinet 222A is supported on a wall surface in the room. Front panel 222B is removably attached to cabinet 222A. An outlet port 225 is formed in a gap between a lower end portion of front panel 222B and a lower end portion of cabinet 222A. Outlet port 225 is formed in an approximately rectangular shape extending in the width direction of indoor unit 220 and is provided to be directed forward and downward. On the top surface of front panel 222B, a grid-like intake port 224 is formed.

At a position opposing front panel 222B, an air filter 228 is provided for collecting and removing dust included in the air taken in from intake port 224. A not-shown air filter cleaner is provided in a space formed between front panel 222B and air filter 228. The air filter cleaner automatically removes dust accumulated in air filter 228.

In the inside of casing 222, an air flow channel 226 is formed, through which air is circulated from intake port 224 toward outlet port 225. Outlet port 225 is provided with a vertical louver 232 that can change the blowing angle in the left and right directions and a plurality of horizontal louvers 231 that can change the blowing angle in the up and down directions to a forward-upward direction, a horizontal direction, a forward-downward direction, and an immediately downward direction.

Indoor heat exchanger 229 is disposed between cross-flow fan 500 and air filter 228 on a path of air flow channel 226. Indoor heat exchanger 229 has not-shown serpentine refrigerant pipes arranged side by side in a plurality of layers in the up and down directions and in a plurality of columns in the front and back directions. Indoor heat exchanger 229 is connected to the compressor of the outdoor unit installed in the outdoor, and the compressor is driven to operate a refrigeration cycle. Through the operation of the refrigeration cycle, indoor heat exchanger 229 is cooled to a temperature lower than the ambient temperature during cooling operation, and indoor heat exchanger 229 is heated to a temperature higher than the ambient temperature during heating operation.

Figure 29:
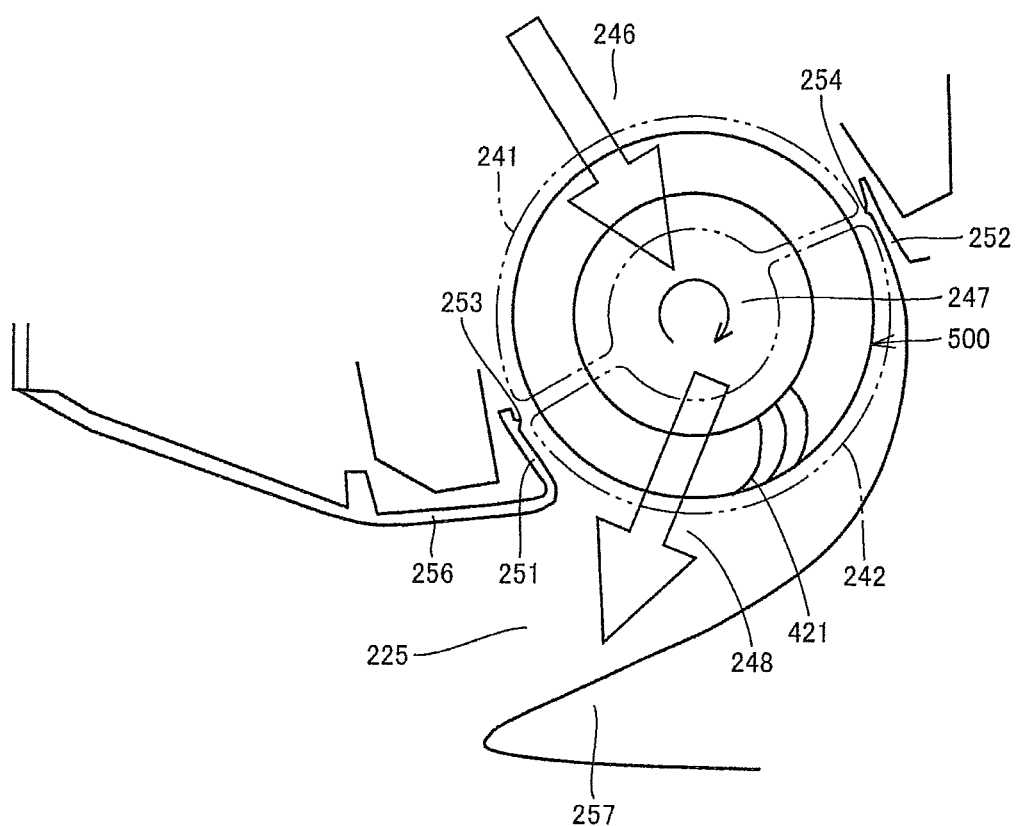
FIG. 29 is an enlarged cross-sectional view showing the proximity of an outlet port of the air conditioner in FIG. 28.

FIG. 29 is an enlarged cross-sectional view showing the proximity of the outlet port of the air conditioner in FIG. 28. Referring to FIG. 28 and FIG. 29, casing 222 has a front wall portion 251 and a rear wall portion 252. Front wall portion 251 and rear wall portion 252 are disposed to face each other at a distance from each other.

On a path of air flow channel 226, cross-flow fan 500 is disposed to be positioned between front wall portion 251 and rear wall portion 252. A protrusion portion 253 is formed at front wall portion 251 to protrude toward the radially outer surface of cross-flow fan 500 so as to decrease the gap between cross-flow fan 500 and front wall portion 251. A protrusion portion 254 is formed at rear wall portion 252 to protrude toward the radially outer surface of cross-flow fan 500 so as to decrease the gap between cross-flow fan 500 and rear wall portion 252.

Casing 222 has an upper guide portion 256 and a lower guide portion 257. Air flow channel 226 is defined by upper guide portion 256 and lower guide portion 257 on the downstream side of air flow from cross-flow fan 500.

Upper guide portion 256 and lower guide portion 257 are continuous from front wall portion 251 and rear wall portion 252, respectively, and extend toward outlet port 225. Upper guide portion 256 and lower guide portion 257 are formed to curve the air output by cross-flow fan 500 with upper guide portion 256 on the inner peripheral side and with lower guide portion 257 on the outer circumferential side, and to guide the air forward and downward. Upper guide portion 256 and lower guide portion 257 are formed such that the cross section of air flow channel 226 increases from cross-flow fan 500 toward outlet port 225.

In the present embodiment, front wall portion 251 and upper guide portion 256 are integrally formed with front panel 222B. Rear wall portion 252 and lower guide portion 257 are integrally formed with cabinet 222A.

Figure 30:
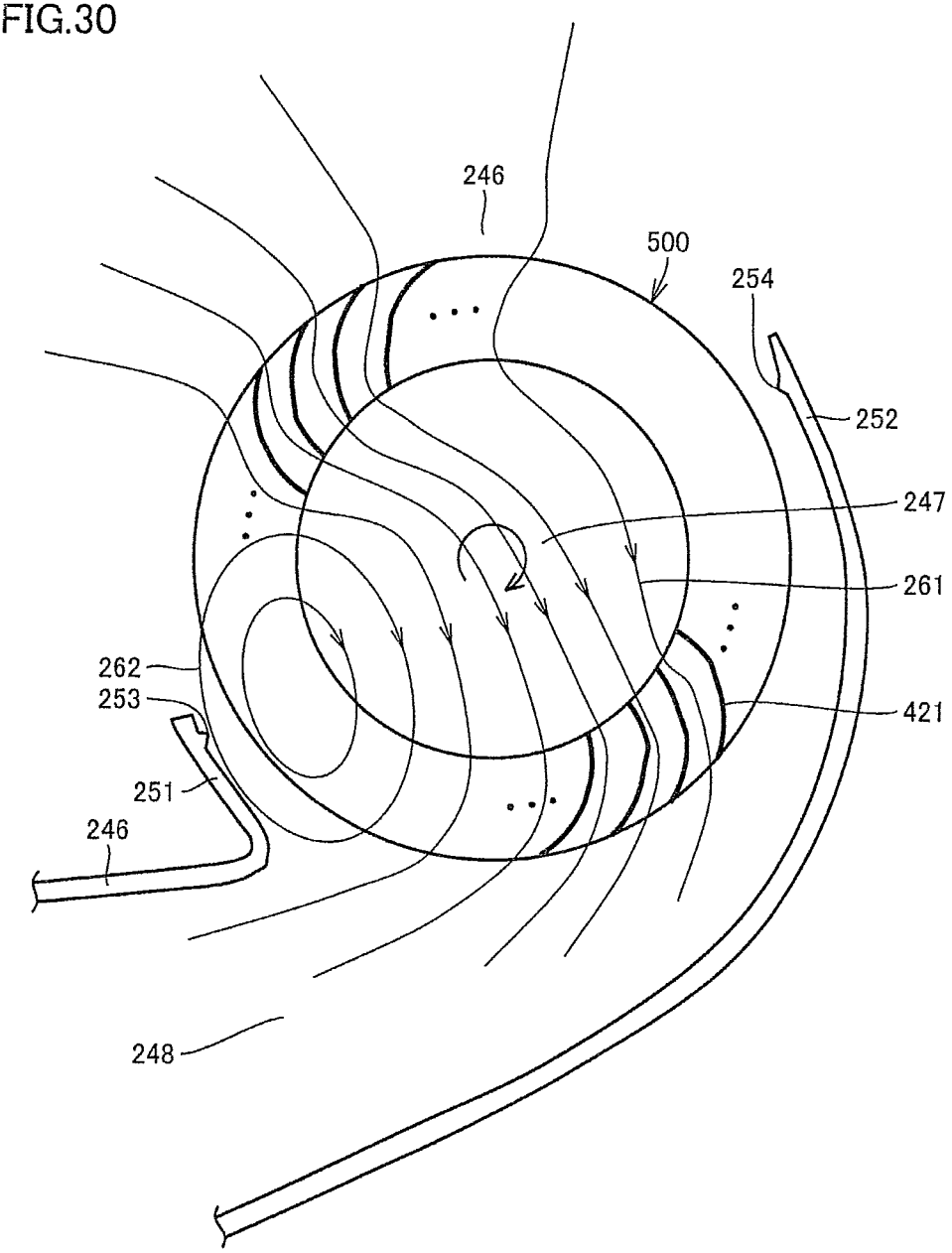
FIG. 30 is a cross-sectional view of an air flow produced in the proximity of the outlet port of the air conditioner in FIG. 28.

FIG. 30 is a cross-sectional view of an air flow produced in the proximity of the outlet port of the air conditioner in FIG. 28. Referring to FIG. 28 to FIG. 30, on the path on air flow channel 226, an upstream outside space 246 is formed to be positioned upstream of air flow from cross-flow fan 500, an inside space 247 is formed to be positioned in the inside of cross-flow fan 500 (the inner peripheral side of a plurality of fan blades 421 circumferentially arranged), and a downstream outside space 248 is formed to be positioned downstream of air flow from cross-flow fan 500.

During rotation of cross-flow fan 500, at an upstream region 241 of air flow channel 226 with respect to protrusion portions 253, 254 as a boundary, an air flow 261 is formed to pass through on blade surface 423 of fan blade 421 from upstream outside space 246 toward inside space 247. At a downstream region 242 of air flow channel 226 with respect to protrusion portions 253, 254 as a boundary, air flow 261 is formed to pass through on blade surface 423 of fan blade 421 from inside space 247 toward downstream outside space 248. Here, at a position adjacent to front wall portion 251, a forced vortex 262 of air flow is formed.

Although an air conditioner has been described in the present embodiment by way of example, the cross-flow fan in the present invention is also applicable to a fluid feeding device such as, for example, an air purifier, a humidifier, a cooling device, and a ventilating device.

Figure 31:
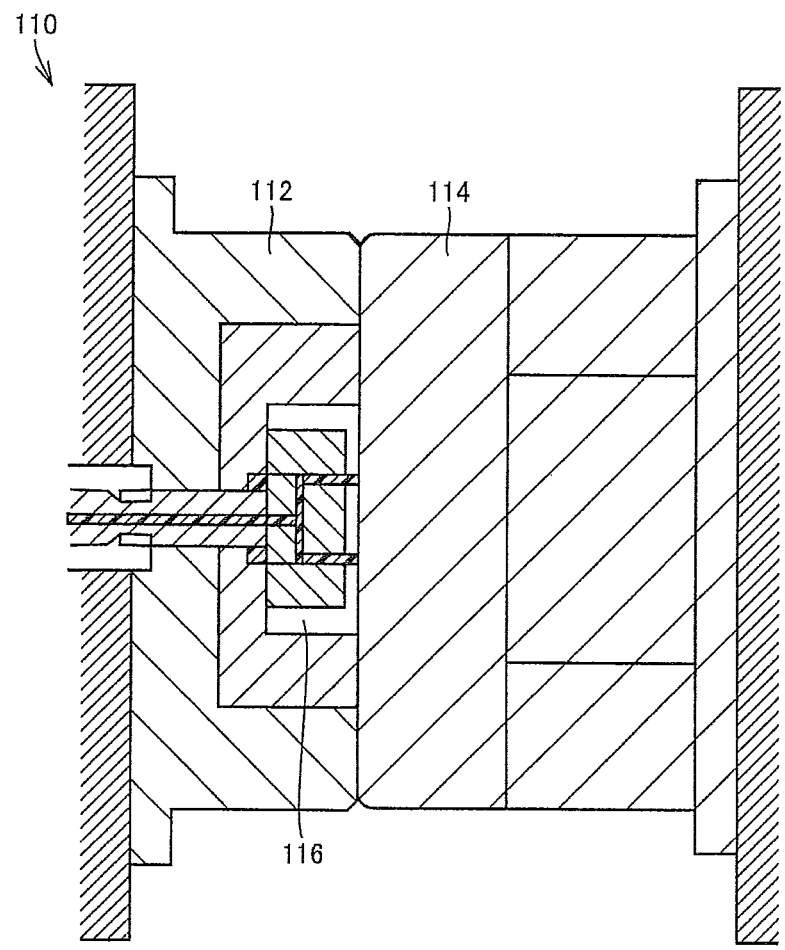
FIG. 31 is a cross-sectional view of a molding die for use in production of the centrifugal fan in FIG. 20.

FIG. 31 is a cross-sectional view of a molding die for use in production of the cross-flow fan in FIG. 20. Referring to FIG. 31, a molding die 110 has a stationary die 114 and a movable die 112. Stationary die 114 and movable die 112 define a cavity 116 which has approximately the same shape as cross-flow fan 500 and into which flowable resin is injected.

Molding die 110 may be provided with a not-shown heater for increasing the flowability of resin injected into cavity 116. The installation of such a heater is particularly effective, for example, when synthetic resin with an increased strength, such as glass-fiber-filled AS (acrylonitrile-styrene copolymer) resin, is used.

A centrifugal fan 410 in a sixth embodiment described later is also produced with a molding die having a similar structure as molding die 110 in FIG. 31.

(Detailed Description of Effects and Operation)

The operation and effects achieved by cross-flow fan 500 in the present embodiment will now be described assuming that cross flow-fan 500 is applied to an air conditioner.

Figure 32:
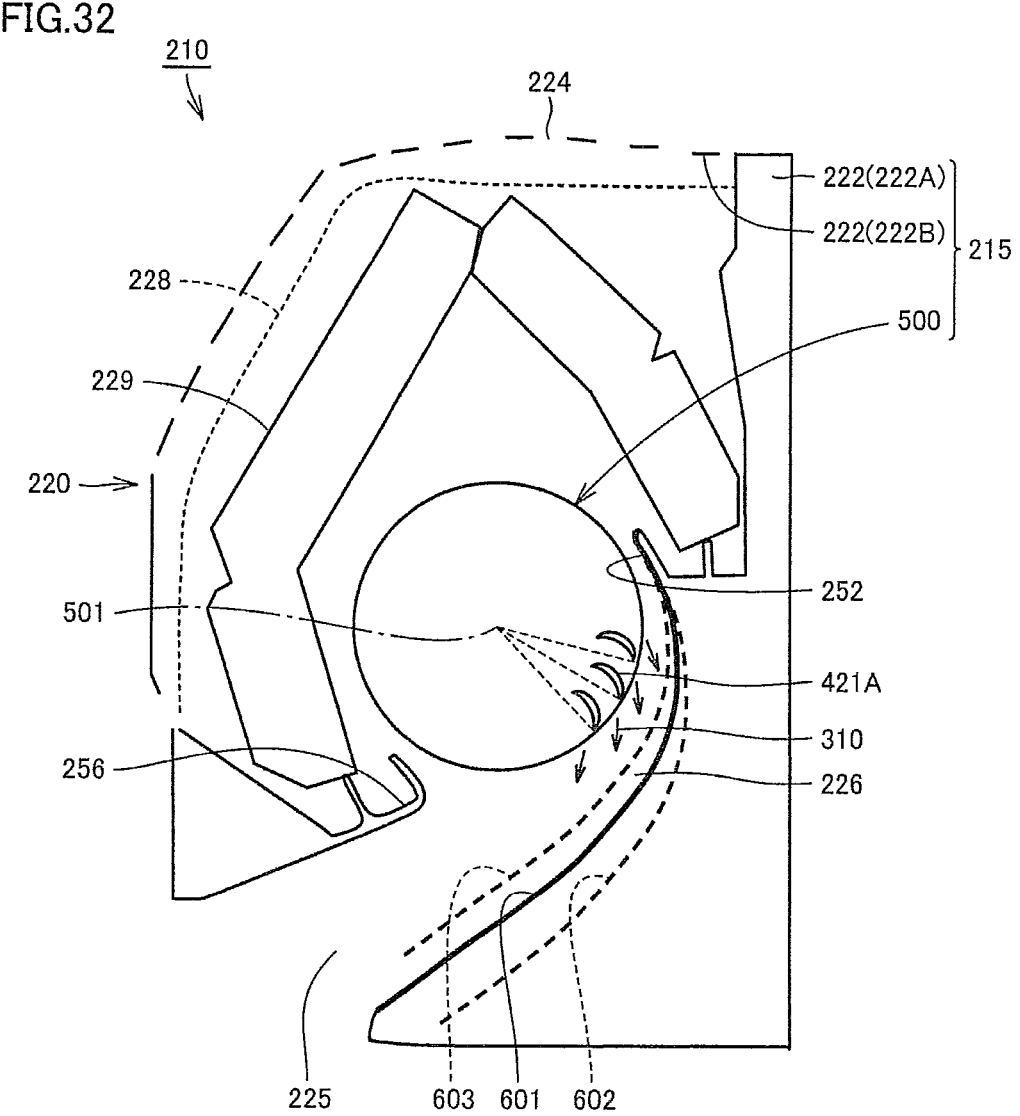
FIG. 32 is a diagram for explaining the operation and effects achieved by the cross-flow fan in FIG. 20.
Figure 33:
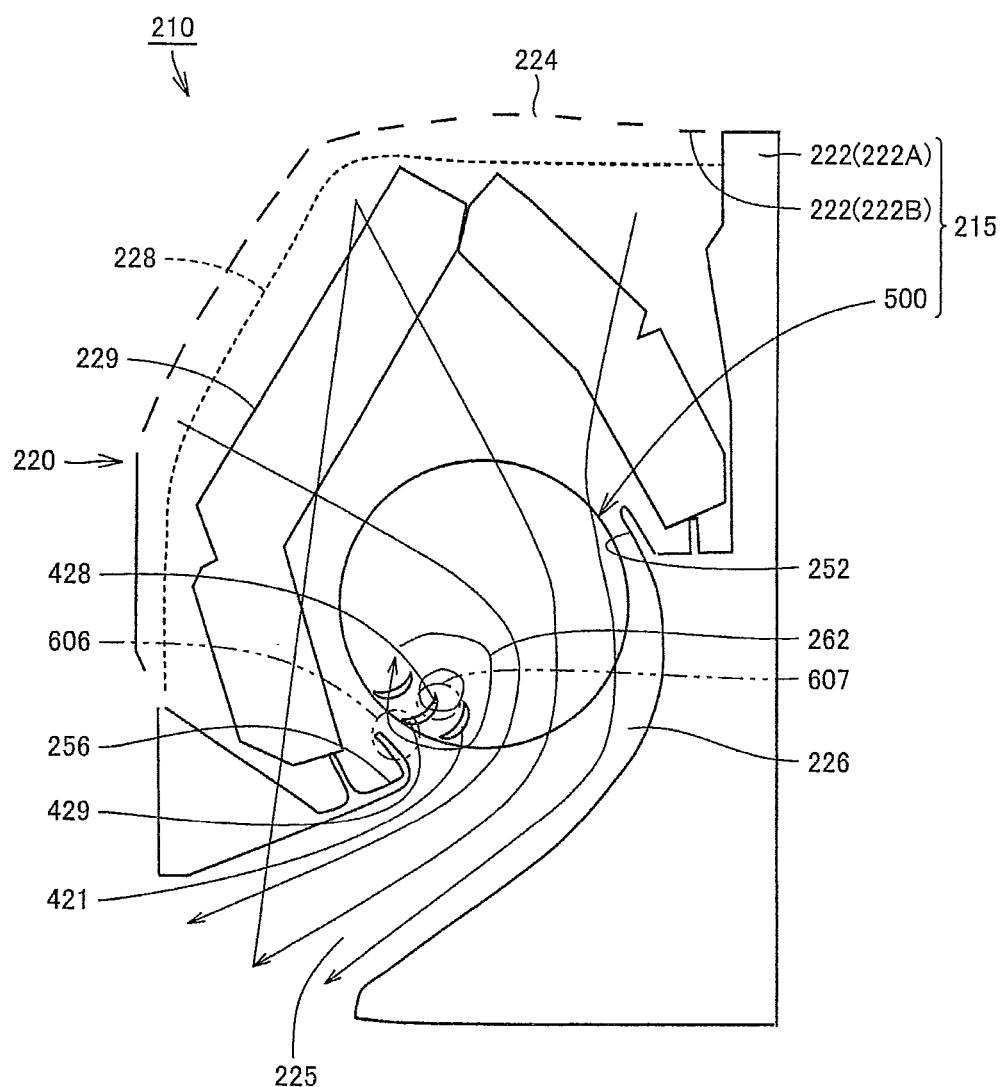
FIG. 33 is another diagram for explaining the operation and effects achieved by the cross-flow fan in FIG. 20.

FIG. 32 is a diagram for explaining the operation and effects achieved by the cross-flow fan in FIG. 20. FIG. 32 and FIG. 33, which will be described later, illustrate a cross section of an air conditioner corresponding to FIG. 28.

Referring to FIG. 32, in order to obtain a suitable blowing capacity in air conditioner 210, a scroll shape 601 (spiral shape) formed the outlet side of casing 222 should be adapted to the blowing direction of airflow output from cross-flow fan 500 as shown by arrow 310.

More specifically, in a case, as in a scroll shape 602 shown in the figure, where the scroll shape formed in casing 222 expands radially outward with respect to the blowing direction of airflow from cross-flow fan 500, the airflow may not conform to the scroll shape on the path toward outlet port 225 and may separate from the surface of casing 222 formed in a scroll shape. On the other hand, in a case, as in a scroll shape 603 shown in the figure, where the scroll shape formed in casing 222 narrows radially inward with respect to the blowing direction of airflow, the direction of airflow toward outlet port 225 is abruptly deflected by the surface of casing 222 formed in a scroll shape. In these cases, the blowing efficiency is reduced on air flow channel 226 in casing 222.

On the other hand, the parameter for mainly determining the direction in which the air flowing on blade surface 423 is output from the fan is the discrepancy angle of fan blade 421. In cross-flow fan 500 in the present embodiment, a plurality of fan blades 421 are provided such that the discrepancy angle of each fan blade 421 is equal among fan blades 421. Therefore, the discrepancy angles of all the fan blades 421 can be set to a value adapted to scroll shape 601 of casing 222. Accordingly, the air flow on air flow channel 226 becomes smooth, thereby improving the blowing capacity of blower 215 built in air conditioner 210.

FIG. 33 is another diagram for explaining the operation and effects achieved by the cross-flow fan in FIG. 20.

Referring to FIG. 33, first, a phenomenon that occurs on the side of outer peripheral blade tip portion 429 of fan blade 421 will be described. As cross-flow fan 500 is rotated, outer peripheral blade tip portions 429 of fan blades 421 pass through one by one to cause periodic pressure variations at an approach place 606 where fan blade 421 approaches casing 222 (a space where fan blade 421 faces front wall portion 251 of casing 222). The periodic pressure variations are a cause for narrow-band noise called a blade passing sound.

By contrast, in cross-flow fan 500 in the present embodiment, a plurality of fan blades 421 are comprised of plural kinds of fan blades 421A to 421G whose outer peripheral blade tip angles are different from each other. Accordingly, the inclination of outer peripheral blade tip portion 429 varies among fan blades 421, so that the direction of air flow flowing out through outer peripheral blade tip portion 429 from on blade surface 423 of fan blade 421 minutely varies among fan blades 421. Accordingly, at approach place 606 downstream from outer peripheral blade tip portion 429, the timing of pressure variation is changed. As a result, the cycles of pressure variations become less uniform, and the narrow-band noise can be reduced accordingly.

Next, a phenomenon that occurs on the side of inner peripheral blade tip portion 428 of fan blade 421 will be described. As described with reference to FIG. 30, on the side of inner peripheral blade tip portion 428, forced vortex 262 is produced with rotation of fan blade 421. At a center portion 607 of a region in which forced vortex 262 is produced, when inner peripheral blade tip portions 428 of fan blades 421 pass through one by one, periodic pressure variations are caused by interference of forced vortex 262 with inner peripheral blade tip portions 428. Accordingly, narrow-band noise is generated as is the case with the outer peripheral blade tip portions 429.

By contrast, in the case where a plurality of fan blades 421 are comprised of plural kinds of fan blades whose inner peripheral blade tip angles are different from each other, the inclination of inner peripheral blade tip portion 428 varies among fan blades 421, so that the direction of air flow flowing onto blade surface 423 through inner peripheral blade tip portion 428 of each fan blade 421 minutely varies among fan blades 421. Accordingly, at center portion 607 upstream from inner peripheral blade tip portion 29, the timing of pressure variation is changed. Thus, the narrow-band noise can be reduced as in the foregoing description.

On both the side of outer peripheral blade tip portion 429 and the side of inner peripheral blade tip portion 428, the noise generation mechanism is the same in that noise results from pressure variations caused by passage of blade tips. However, the center of forced vortex 262 is moved flexibly to some extent between forced vortex 262 and inner peripheral blade tip portion 428. Therefore, the pressure variations at center portion 607 become small and less affect narrow-band noise. By contrast, at approach place 606 between casing 222 and fan blade 421, the relative position therebetween does not change. Therefore, the pressure variations at approach place 606 become large and more affect narrow-band noise.

In cross-flow fan 500 in the fourth embodiment of the present invention configured in this manner, the blowing capacity of blower 215 using cross-flow fan 500 can be improved, while narrow-band noise caused by the rotation of fan blades 421 can be reduced. The use of cross-flow fan 500 in this manner reduces power consumption of the driving motor and provides air conditioner 210 that can contribute to energy savings. Furthermore, quiet air conditioner 210 is provided.

Fifth Embodiment

In the present embodiment, variations of plural kinds of fan blades 421 shown in FIG. 24 will be described.

Figure 34:
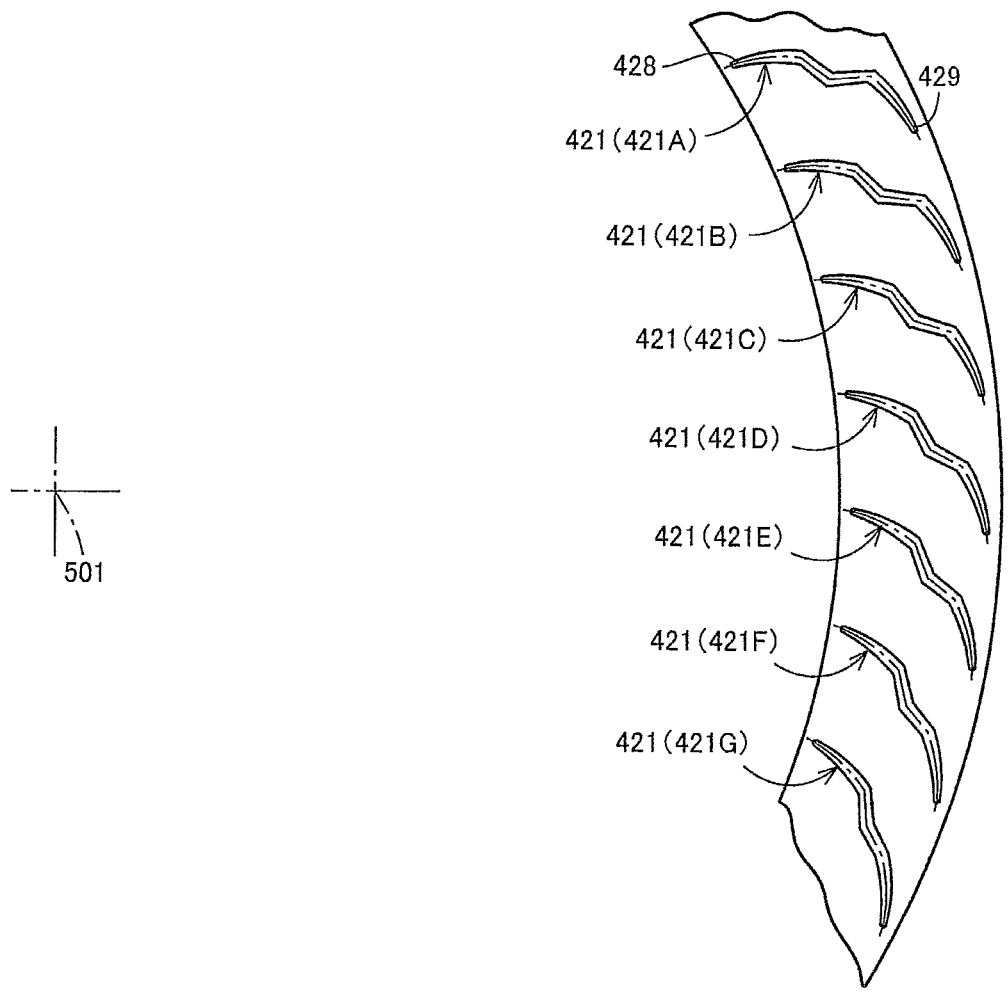
FIG. 34 is a cross-sectional view showing a first modification of plural kinds of fan blades in FIG. 24.
Figure 35:
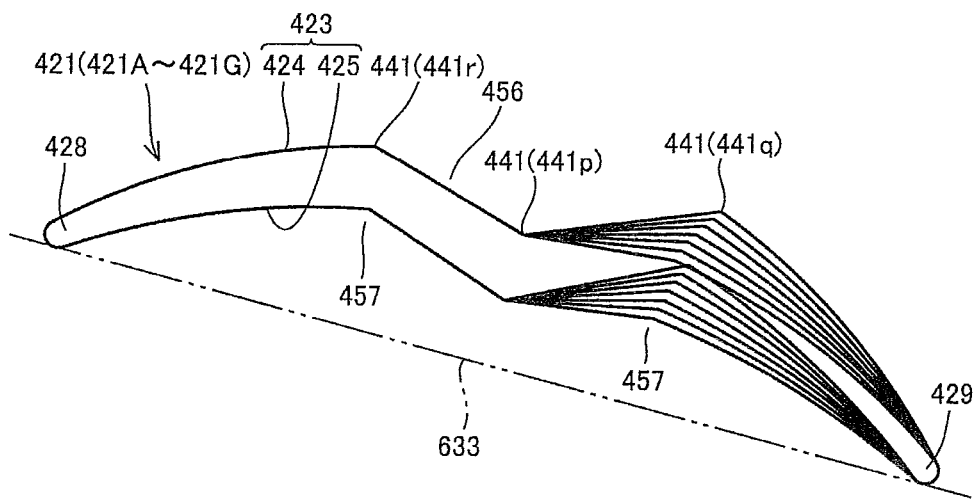
FIG. 35 is a diagram showing that plural kinds of fan blades in FIG. 34 are overlapped with each other.

FIG. 34 is a cross-sectional view showing a first modification of plural kinds of fan blades in FIG. 24. FIG. 35 is a diagram showing that plural kinds of fan blades in FIG. 34 are overlapped with each other.

Referring to FIG. 34 and FIG. 35, a plurality of fan blades 421 are comprised of plural kinds of fan blades 421A, 421B, 421C, 421D, 421E, 421F, and 421G. The configuration of this modification is similar to that of the fourth embodiment in that the discrepancy angle of each fan blade is equal among fan blades 421 and in that the outer peripheral blade tip angle of each fan blade 421 is different among fan blades 421A to 421G. However, the modification differs from the fourth embodiment in the structure of flection portion 441 that makes the outer peripheral blade tip angle different among fan blades 421A to 421G.

More specifically, fan blade 421 has flection portions 441 at three points between inner edge portion 426 and outer edge portion 427. Fan blade 421 has a flection portion $441q$ at a position adjacent to outer edge portion 427, a flection portion $441p$ at the blade midpoint between inner edge portion 426 and outer edge portion 427, and a flection portion $441r$ at a position adjacent to inner edge portion 426.

In a similar manner as in the fourth embodiment, fan blades 421A to 421G are formed such that the flection angle θq (see FIG. 25) of flection portion $441q$ differs among those fan blades, whereby the inclination of outer peripheral blade tip portion 429 varies. Here, the flection angle θq is smaller than 180° in all of fan blades 421A to 421G.

The flection angle θp (see FIG. 25) of flection portion $441p$ also changes with changing flection angle θq. The flection angle θp is greater than 180° in all of fan blades 421A to 421G. On the other hand, when the flection angle θr of flection portion $441r$ is defined in the same way as in θp and θq, the flection angle θr is the same among fan blades 421A to 421G. The flection angle θr is smaller than 180°.

In such a configuration, in this modification, fan blades 421A to 421G each have an approximately W-shaped blade cross-sectional shape. Fan blades 421A to 421G each have such a blade cross section in that a concave portion 457 is formed at pressure surface 425 of blade surface 423 and a concave portion 456 is formed at suction surface 424 of blade surface 423.

During rotation of cross-flow fan 500, the air flow passing through on blade surface 423 is produced between adjacent fan blades 421. Here, vortexes of air flow (secondary flows) are generated in concave portions 456 and 457 formed on blade surface 423, whereby the air flow (main flow) passing through on blade surface 423 flows along the outside of the vortexes produced in concave portions 456 and 457. Accordingly, although having a thin blade cross section, fan blade 421 exhibits a behavior like a thick blade as if the blade cross section is increased by the depth of concave portions 456 and 457 in which vortexes are formed. As a result, the lift produced in proximity to concave portions 456 and 457 can be significantly increased.

Figure 36:
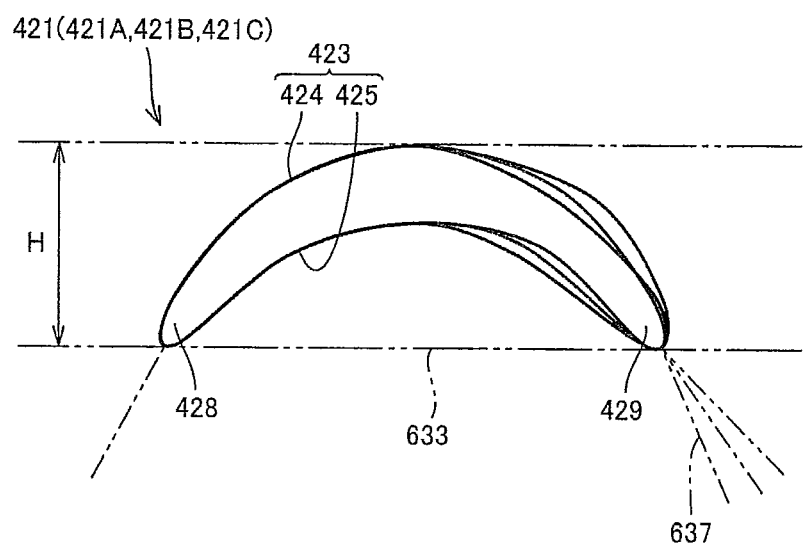
FIG. 36 is a cross-sectional view showing a second modification of plural kinds of fan blades in FIG. 24.

FIG. 36 is a cross-sectional view showing a second modification of plural kinds of fan blades in FIG. 24. Referring to FIG. 36, a plurality of fan blades 421 are comprised of plural kinds of fan blades 421A, 421B, and 421C. The figure illustrates a state in which fan blades 421A, 421B, and 421C are overlapped. The configuration of this modification is similar to that of the fourth embodiment in that the discrepancy angle of each fan blade 421 is equal among fan blades 421 and in that the outer peripheral blade tip angle of each fan blade is different among fan blades 421A to 421C.

In the present modification, plural kinds of fan blades 421A, 421B, and 421C are provided such that a height H of fan blade 421 with reference to chord line 633 is equal. The height H is the length between chord line 633 and the position of suction surface 424 most distant from chord line 633.

In such a configuration, variations in interval between adjacent fan blades 421 due to differences in height among fan blades 421A to 421C are not produced. Therefore, the interval between adjacent fan blades 421 can be optimized in accordance with the blowing performance required for the cross-flow fan. Accordingly, the air flow between fan blades 421 can be stabilized, thereby preventing abnormal sound. An increase in ventilation resistance to the air flow between fan blades 421 is prevented, thereby increasing the blowing capacity of the fan.

The cross-flow fan in the fifth embodiment of the present invention configured in this manner can achieve the effects described in the fourth embodiment similarly.

Sixth Embodiment

In the present embodiment, first of all, a structure of a centrifugal fan to which a fan according to the present invention is applied will be described. Next, structures of a blower and an air purifier using the centrifugal fan will be described. The centrifugal fan in the present embodiment partially has the same structure as cross-flow fan 500 in the fourth embodiment. In the following, a description of the overlapping structure will not be repeated.

(Description of Structure of Centrifugal Fan)

Figure 37:
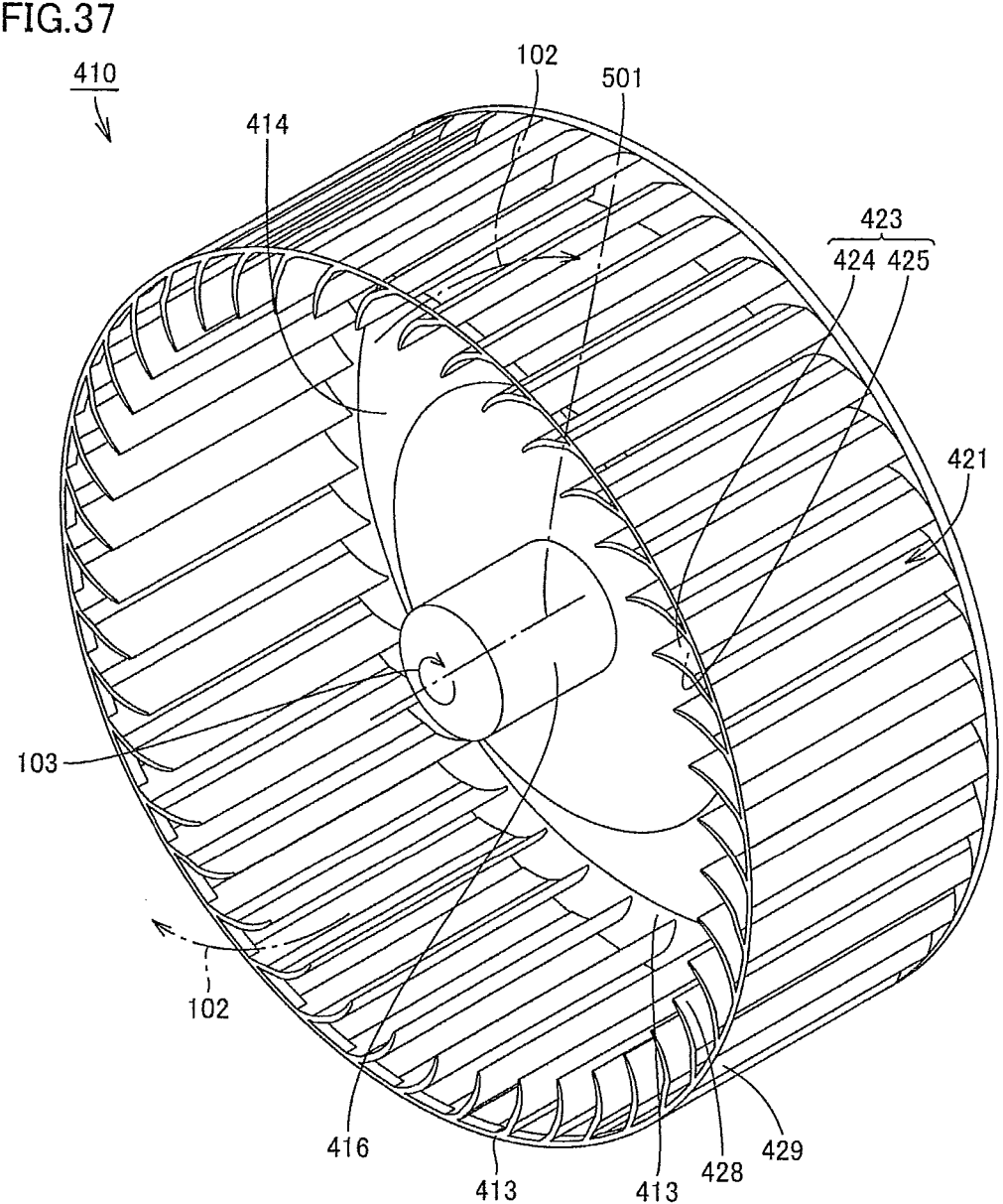
FIG. 37 is a perspective view of a centrifugal fan according to a sixth embodiment of the present invention.

FIG. 37 is a perspective view of a centrifugal fan in a sixth embodiment of the present invention. Referring to FIG. 37, a centrifugal fan 410 in the present embodiment has a plurality of fan blades 421. Centrifugal fan 410 has an approximately cylindrical appearance as a whole. A plurality of fan blades 421 are disposed on a circumferential surface of the approximately cylindrical shape. Centrifugal fan 410 is integrally formed from resin. Centrifugal fan 410 rotates in the direction shown by arrow 103 around an imaginary center axis 501 shown in FIG. 37.

Centrifugal fan 410 is a fan using a plurality of rotating fan blades 421 to output air taken in from the radially inner side to the radially outer side. Centrifugal fan 410 is a fan using a centrifugal force to output the air from the rotational center side of the fan to the radial direction thereof. Centrifugal fan 410 is a sirocco fan. Centrifugal fan 410 is used with rotation speeds in a low Reynolds number region applied to fans for home electric equipment, etc.

Centrifugal fan 410 further has a peripheral frames 413 serving as supports. Peripheral frames 413 are formed to annually extend around center axis 501. Peripheral frames 413 are disposed spaced apart from each other in the axial direction of center axis 501. A boss portion 416 for coupling centrifugal fan 410 to a driving motor is integrally formed with one of peripheral frames 413 with a disk portion 414 interposed therebetween.

A plurality of fan blades 421 are arranged spaced apart from each other in the circumferential direction around center axis 501. A plurality of fan blades 421 are supported by peripheral frames 413 at opposite ends thereof in the axial direction of center axis 501. Fan blade 421 is provided to stand on one peripheral frame 413 and formed to extend along the axial direction of center axis 501 toward the other peripheral frame 413.

A plurality of fan blades 421 are comprised of plural kinds of fan blades 421A to 421G shown in FIG. 24 and have a similar structure as that of fan blades 421 described in the fourth embodiment (a plurality of fan blades 421 are provided such that the discrepancy angles of fan blades 421 are equal to each other; a plurality of fan blades 421 are comprised of plural kinds of fan blades 421A to 421G whose outer peripheral blade tip angles are different from each other; and fan blades 421A to 421G are arranged in an irregular order).

However, centrifugal fan 410 in the present embodiment differs from cross-flow fan 500 in the fourth embodiment in that a plurality of fan blades 421 are arranged at regular intervals.

(Description of Structures of Blower and Air Purifier)

Figure 38:
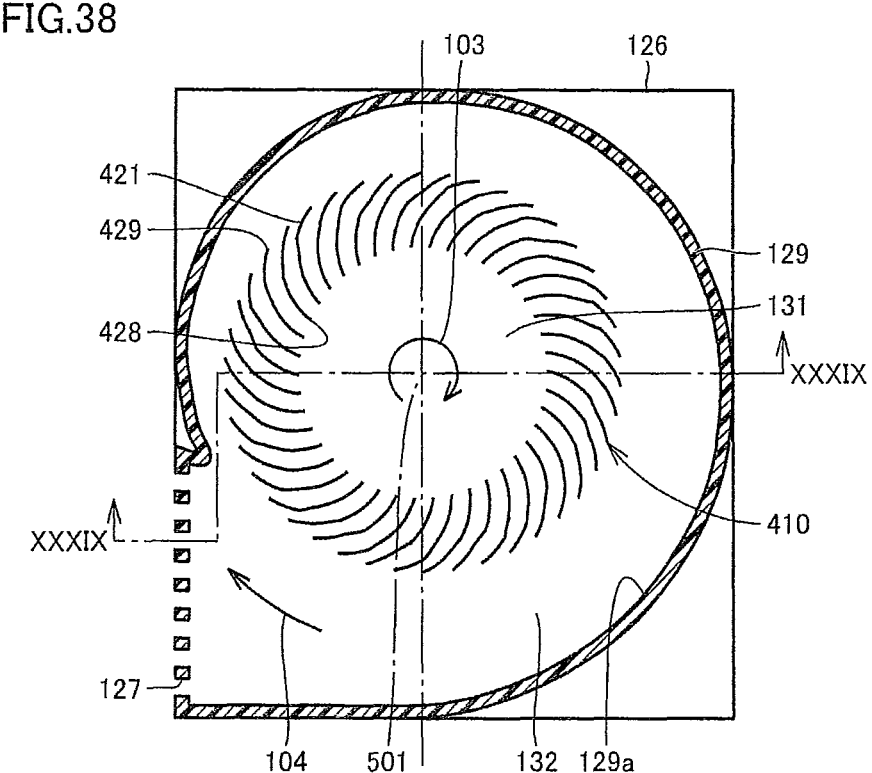
FIG. 38 is a cross-sectional view of a blower using the centrifugal fan in FIG. 37.
Figure 39:
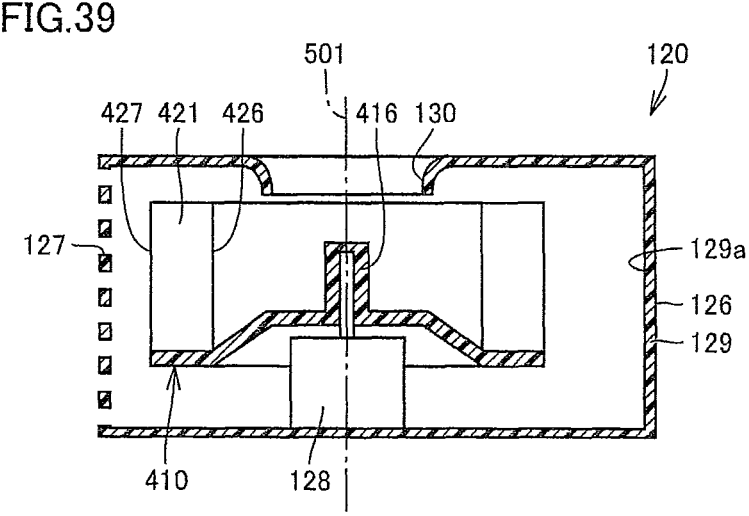
FIG. 39 is a cross-sectional view of the blower taken along a line XXXIX-XXXIX in FIG. 38.

FIG. 38 is a cross-sectional view of a blower using the centrifugal fan in FIG. 37. FIG. 39 is a cross-sectional view of the blower taken along a line XXXIX-XXXIX in FIG. 38. Referring to FIG. 38 and FIG. 39, a blower 120 has a driving motor 128, centrifugal fan 410, and a casing 129 inside an outer casing 126.

The output shaft of driving motor 128 is coupled to boss portion 416 molded integrally with centrifugal fan 410. Casing 129 has a guide wall 129a. Guide wall 129a is formed by an approximately ¾ arc disposed on the periphery of centrifugal fan 410. Guide wall 129a is formed to guide an airflow generated by rotation of fan blade 421 to the rotational direction of fan blade 421 while increasing the speed of the airflow.

Casing 129 has an intake portion 130 and an outlet portion 127. Intake portion 130 is formed to be positioned on an extension of center axis 501. Outlet portion 127 is formed to be open to one side of the tangent direction of guide wall 129a from part of guide wall 129a. Outlet portion 127 is shaped like a prismatic cylinder protruding from part of guide wall 129a to one side of the tangent direction of guide wall 129a.

Driven by driving motor 128, centrifugal fan 410 rotates in the direction shown by arrow 103. Here, air is taken in from intake portion 130 to the inside of casing 129 and is output from a radially inside space 131 to a radially outside space 132 of centrifugal fan 410. The air output to radially outside space 132 circumferentially flows in the direction shown by arrow 104 and is blown to the outside through outlet portion 127.

Figure 40:
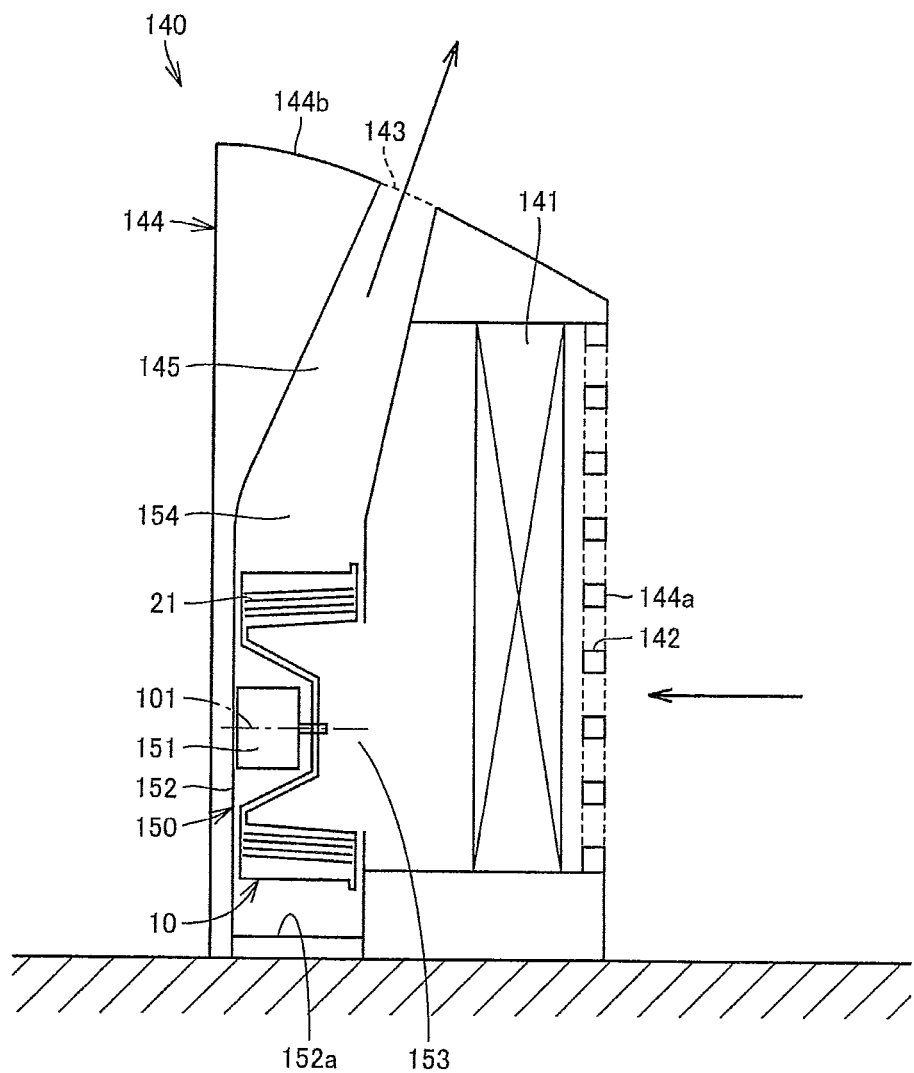
FIG. 40 is a cross-sectional view of an air purifier using the centrifugal fan in FIG. 37.

FIG. 40 is a cross-sectional view of an air purifier using the centrifugal fan in FIG. 37. Referring to FIG. 40, an air purifier 140 has a housing 144, a blower 150, a duct 145, and an HEPA (High Efficiency Particulate Air Filter) filter 141.

Housing 144 has a rear wall 144a and a top wall 144b. Housing 144 has an intake port 142 for sucking the air in the room in which air purifier 140 is installed. Intake port 142 is formed at rear wall 144a. Housing 144 further has an outlet port 143 discharging the purified air to the inside of the room. Outlet port 143 is formed at top wall 144b. Air purifier 140 is generally installed against a wall such that rear wall 144a is opposed to a wall in the room.

Filter 141 is disposed to face intake port 142 in the inside of housing 144. The air introduced to the inside of housing 144 through intake port 142 passes through filter 141. The foreign matters in the air are thus removed.

Blower 150 is provided to suck the room air to the inside of housing 144 and to output the air purified by filter 141 to the room through outlet port 143. Blower 150 has centrifugal fan 410, a casing 152, and a driving motor 151. Casing 152 has a guide wall 152a. Casing 152 has an intake portion 153 and an outlet portion 154.

Duct 145 is provided above blower 150 and is provided as an air channel for guiding the purified air from casing 152 to outlet port 143. Duct 145 has a prismatic cylindrical shape with its lower end connecting to outlet portion 154 and with its upper end open. Duct 145 is configured to guide the purified air blown from outlet portion 154 to a laminar flow toward outlet port 143.

In air purifier 140 having such a configuration, blower 150 is driven to rotate fan blades 421 to cause the room air to be taken in from intake port 142 to the inside of housing 144. Here, an airflow is generated between intake port 142 and outlet port 143, and foreign matters such as dust included in the intake air are removed by filter 141.

The purified air obtained by passage through filter 141 is taken in to the inside of casing 152. Here, the purified air taken in to the inside of casing 152 forms a laminar flow through guide wall 152*a* around fan blades 421. The air in the form of a laminar flow is guided to outlet portion 154 along guide wall 152*a* and blown from outlet portion 154 to the inside of duct 145. The air is discharged from outlet port 143 toward the external space.

Although an air purifier has been described by way of example in this embodiment, the centrifugal fan in the present invention is also applicable to a fluid feeding device such as, for example, an air conditioner, a humidifier, a cooling device, and a ventilating device.

Centrifugal fan 410 and air purifier 140 in the sixth embodiment of the present invention configured in this manner can achieve the effects described in the fourth embodiment similarly.

The structures of the fans described in the foregoing fourth to sixth embodiments may be combined as appropriate to configure a new fan. For example, centrifugal fan 410 in the sixth embodiment may be configured using the fan blades described in the fifth embodiment.

Seventh Embodiment

In the present embodiment, first of all, a structure of a cross-flow fan to which a fan in the present invention is applied will be described. Next, structures of an air conditioner using the cross-flow fan and a molding die for use in production of the cross-flow fan will be described.

(Description of Structure of Cross-Flow Fan)

Figure 41:
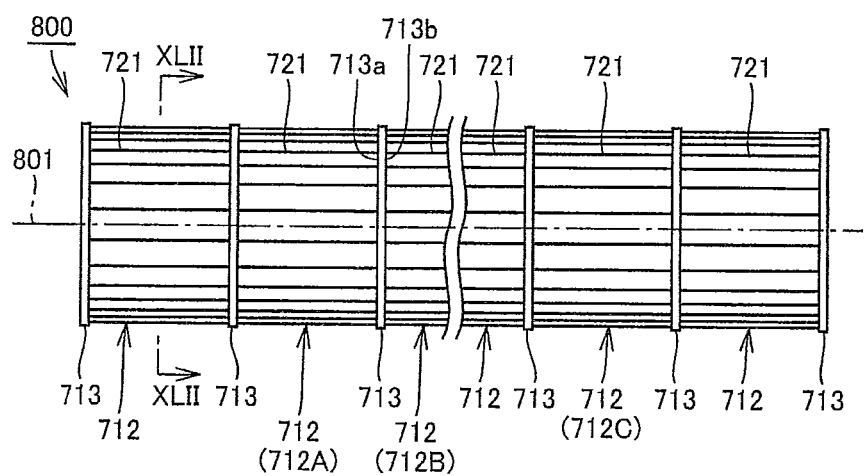
FIG. 41 is a side view of a cross-flow fan according to a seventh embodiment of the present invention.
Figure 42:
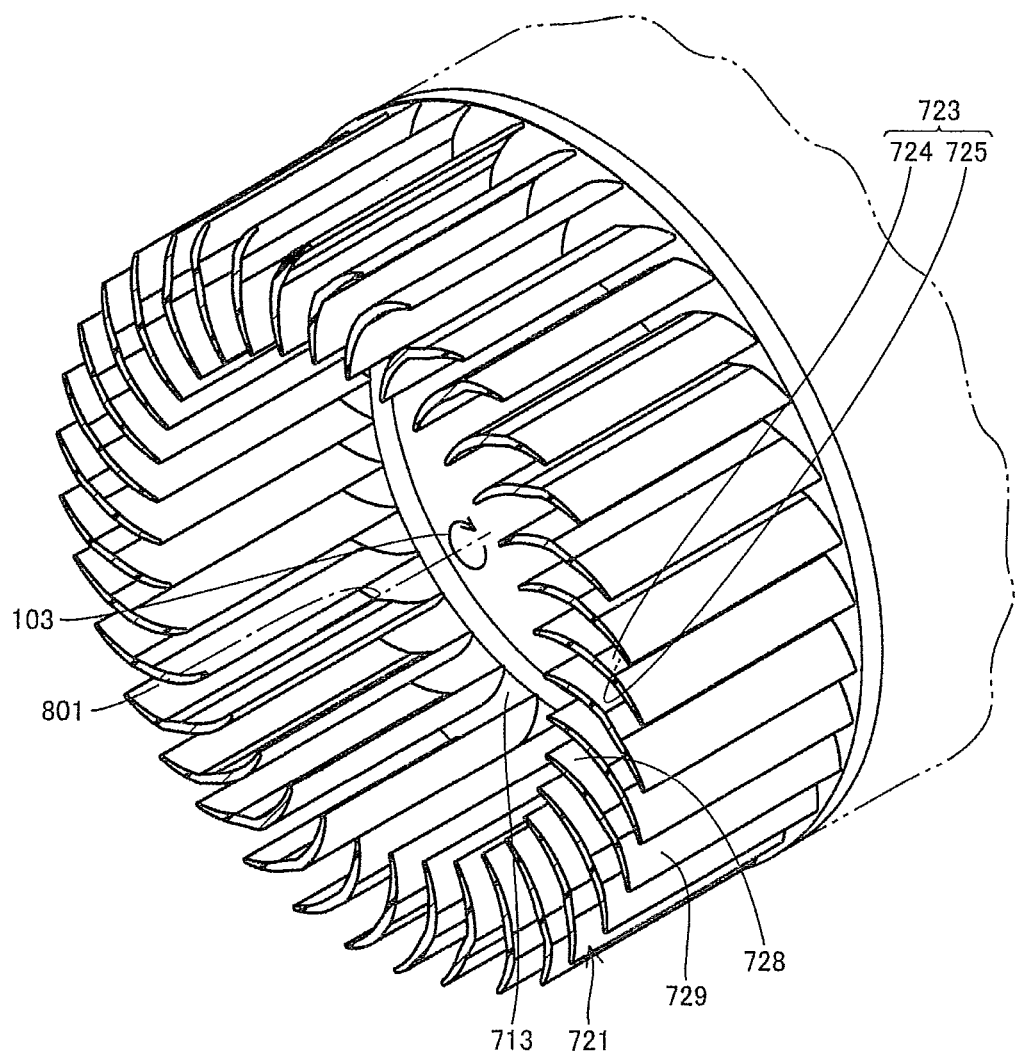
FIG. 42 is a cross-sectional perspective view of the cross-flow fan taken along a line XLII-XLII in FIG. 41.

FIG. 41 is a side view of a cross-flow fan in a seventh embodiment of the present invention. FIG. 42 is a cross-sectional perspective view of the cross-flow fan taken along a line XLII-XLII in FIG. 41.

Referring to FIG. 41 and FIG. 42, a cross-flow fan 800 in the present embodiment has a plurality of fan blades 721. Cross-flow fan 800 has an approximately cylindrical appearance as a whole. A plurality of fan blades 721 are disposed on a circumferential surface of the approximately cylindrical shape. Cross-flow fan 800 is integrally formed from resin. Cross-flow fan 800 rotates in the direction shown by arrow 103 around an imaginary center axis 801 shown in the figures.

Cross-flow fan 800 is a fan using a plurality of rotating fan blades 721 to flow air in a direction orthogonal to center axis 801 serving as the rotation axis. As viewed from the axial direction of center axis 801, cross-flow fan 800 takes in air from an outside space on one side with respect to center axis 801 to an inside space of the fan and outputs the intake air to the outside space on the other side with respect to center axis 801. Cross-flow fan 800 forms an air flow that flows in the direction crossing center axis 801 in a flat plane orthogonal to center axis 801. Cross-flow fan 800 forms an outlet flow in the form of a flat plane parallel to center axis 801.

Cross-flow fan 800 is used with rotation speeds in the low Reynolds number region applied to fans for home electric equipment, etc.

Cross-flow fan 800 is configured such that a plurality of impellers 712 aligned in the axial direction of center axis 801 are combined. In each impeller 712, a plurality of fan blades 721 are provided to be circumferentially spaced apart from each other around center axis 801.

Cross-flow fan 800 further has a peripheral frame 713 serving as a support. Peripheral frame 713 has a ring shape annularly extending around center axis 801. Peripheral frame 713 has an end surface 713*a* and an end surface 713*b*. End surface 713*a* is formed to face one direction along the axial direction of center axis 801. End surface 713*b* is disposed on the back side of end surface 713*a* and is formed to face the other direction along the axial direction of center axis 801.

Peripheral frame 713 is provided to be interposed between impellers 712 adjacent to each other in the axial direction of center axis 801.

Giving attention to impeller 712A and impeller 712B in FIG. 41 disposed adjacent to each other, a plurality of fan blades 721 provided in impeller 712A are provided to stand on end surface 713*a* and are formed to extend like plates along the axial direction of center axis 801. A plurality of fan blades 721 provided in impeller 712B are provided to stand on end surface 713*b* and are formed to extend like plates along the axial direction of center axis 801.

FIG. 42 shows a blade cross section of fan blade 721 when cut along a plane orthogonal to center axis 801 serving as a rotation axis of cross-flow fan 800.

Fan blade 721 has an inner peripheral blade tip portion 728 and an outer peripheral blade tip portion 729. Inner peripheral blade tip portion 728 is disposed at an end of fan blade 721 on the inner peripheral side. Outer peripheral blade tip portion 729 is disposed at an end of fan blade 721 on the outer peripheral side. Fan blade 721 is formed to be inclined in the circumferential direction around center axis 801 from inner peripheral blade tip portion 728 toward outer peripheral blade tip portion 729. Fan blade 721 is formed to be inclined in the rotational direction of cross-flow fan 800 from inner peripheral blade tip portion 728 toward outer peripheral blade tip portion 729.

Fan blade 721 has a blade surface 723 including a pressure surface 725 and a suction surface 724. Pressure surface 725 is disposed on the rotational direction side of cross-flow fan 800. Suction surface 724 is disposed on the back side of pressure surface 725. During rotation of cross-flow fan 800, as an air flow is produced on blade surface 723, a pressure distribution is generated in such a manner that pressure is relatively large at pressure surface 725 and is relatively small at suction surface 724. Fan blade 721 has a bent shape as a whole between inner peripheral blade tip portion 728 and outer peripheral blade tip portion 729 so that fan blade 721 is concave on the pressure surface 725 side and convex on the suction surface 724 side.

Fan blade 721 is formed to have a uniform blade cross section when cut anywhere in the axial direction of center axis 801. Fan blade 721 is formed to have a thin blade cross section between inner peripheral blade tip portion 728 and outer peripheral blade tip portion 729. Fan blade 721 is formed to have an almost constant thickness (the length between pressure surface 725 and suction surface 724) between inner peripheral blade tip portion 728 and outer peripheral blade tip portion 729.

In cross-flow fan 800 in the present embodiment, the shape and arrangement of fan blades 721 is determined so that an "outer peripheral blade tip angle" and an "inner peripheral blade tip angle" satisfy a predetermined relationship among a plurality of fan blades 721. First, the meaning of the terms "outer peripheral blade tip angle" and "inner peripheral blade tip angle" used to describe the structure of cross-flow fan 800 will be described.

Figure 43:
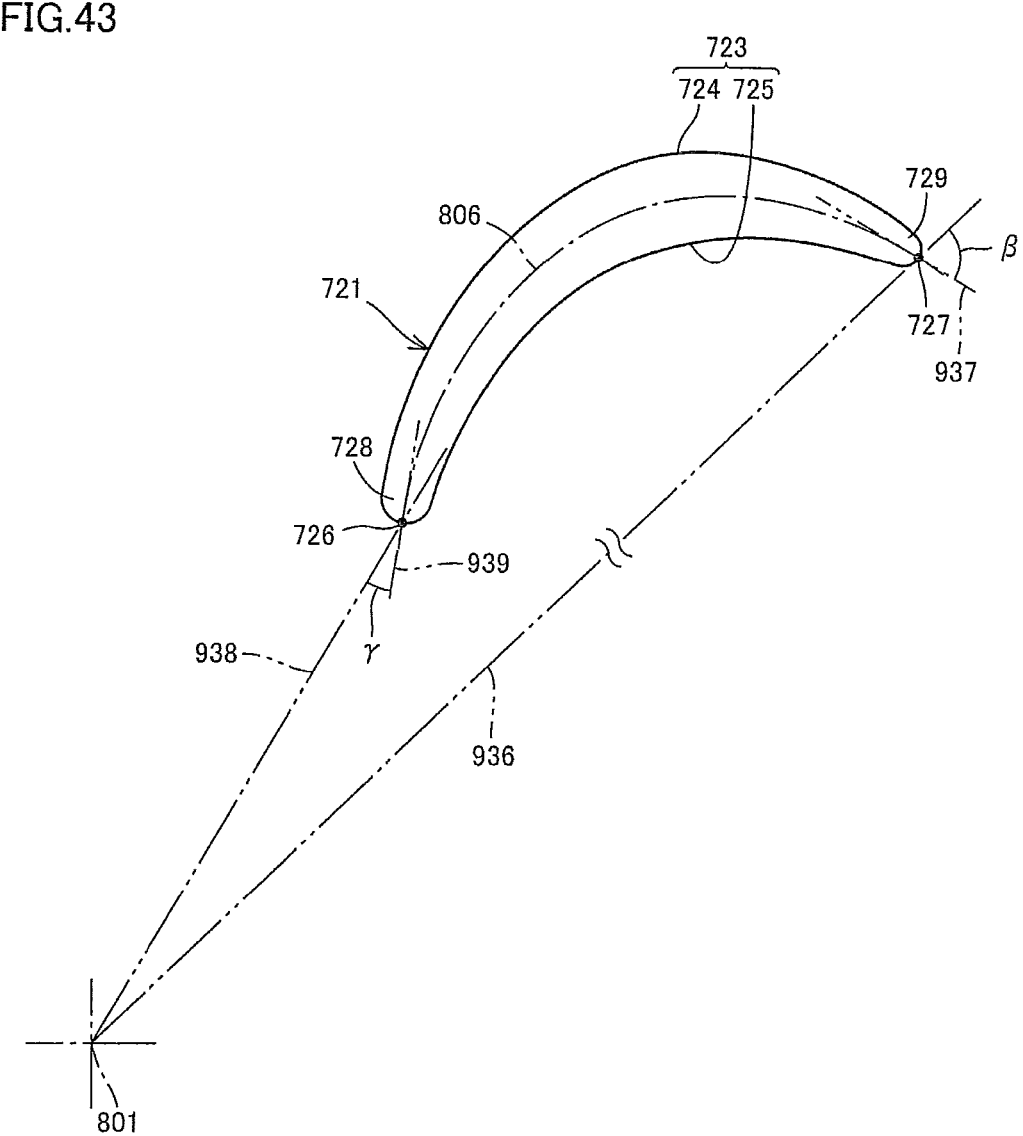
FIG. 43 is a diagram showing an "outer peripheral blade tip angle" and an "inner peripheral blade tip angle."

FIG. 43 is a diagram showing the "outer peripheral blade tip angle" and the "inner peripheral blade tip angle." FIG. 43 illustrates a center line 806 in the thickness direction (the direction connecting pressure surface 725 and suction surface 724) of the blade cross section of fan blade 721. Center line 806 extends in the blade cross section so as to divide the blade cross section of fan blade 721 into the pressure surface 725 side and the suction surface 724 side. Fan blade 721 has an outer edge portion 727 at a position where center line 806 intersects outer peripheral blade tip portion 729, and an inner edge portion 726 at a position where center line 806 intersects inner peripheral blade tip portion 728. Center line 806 continuously extends between outer edge portion 727 and inner edge portion 726.

The figure also shows a tangent 937 on outer edge portion 727 with respect to center line 806, and a tangent 939 on inner edge portion 726 with respect to center line 806. In the example in the figure, center line 806 is curved at outer edge portion 727 and inner edge portion 726. However, in the case where it extends in a straight line, tangent 937 and tangent 939 overlap with center line 806 at outer edge portion 727 and inner edge portion 726, respectively.

The figure also shows a straight line 936 passing through center axis 801 serving as the rotational center of cross-flow fan 800 and outer edge portion 727, and a straight line 938 passing through center axis 801 serving as the rotational center of cross-flow fan 800 and inner edge portion 726.

In this case, the angle $\beta$ between straight line 936 and tangent 937 is the outer peripheral blade tip angle, and the angle $\gamma$ between straight line 938 and tangent 939 is the inner peripheral blade tip angle. The outer peripheral blade tip angle means the angle of outer peripheral blade tip portion 729 at outer edge portion 727 with reference to straight line 936 passing through center axis 801 and outer edge portion 727. The inner peripheral blade tip angle means the angle of inner peripheral blade tip portion 728 at inner edge portion 726 with reference to straight line 938 passing through center axis 801 and inner edge portion 726. The outer peripheral blade tip angle $\beta$ and the inner peripheral blade tip angle $\gamma$ shown in the figure are smaller than 90°.

Figure 44:
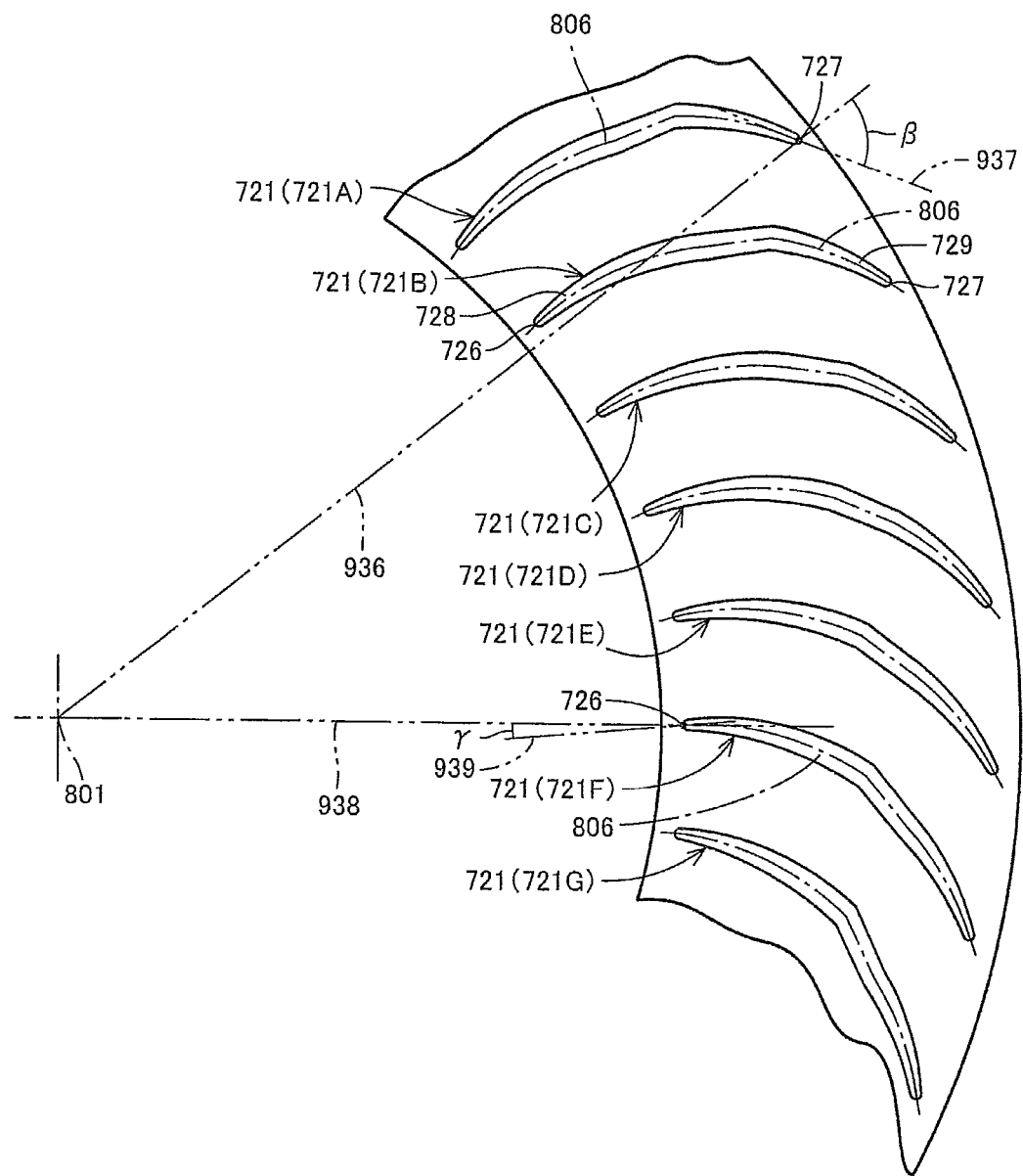
FIG. 44 is a cross-sectional view showing a shape and arrangement of fan blades in the cross-flow fan in FIG. 41.

FIG. 44 is a cross-sectional view showing a shape and arrangement of fan blades in the cross-flow fan in FIG. 41. Referring to FIG. 44, in cross-flow fan 800 in the present embodiment, a plurality of fan blades 721 are comprised of plural kinds of fan blades 721A, 721B, 721C, 721D, 721E, 721F, and 721G. Fan blades 721A to 721G have blade cross sections of different shapes. A plurality of fan blades are provided for each of fan blades 721A to 721G.

Figure 45:
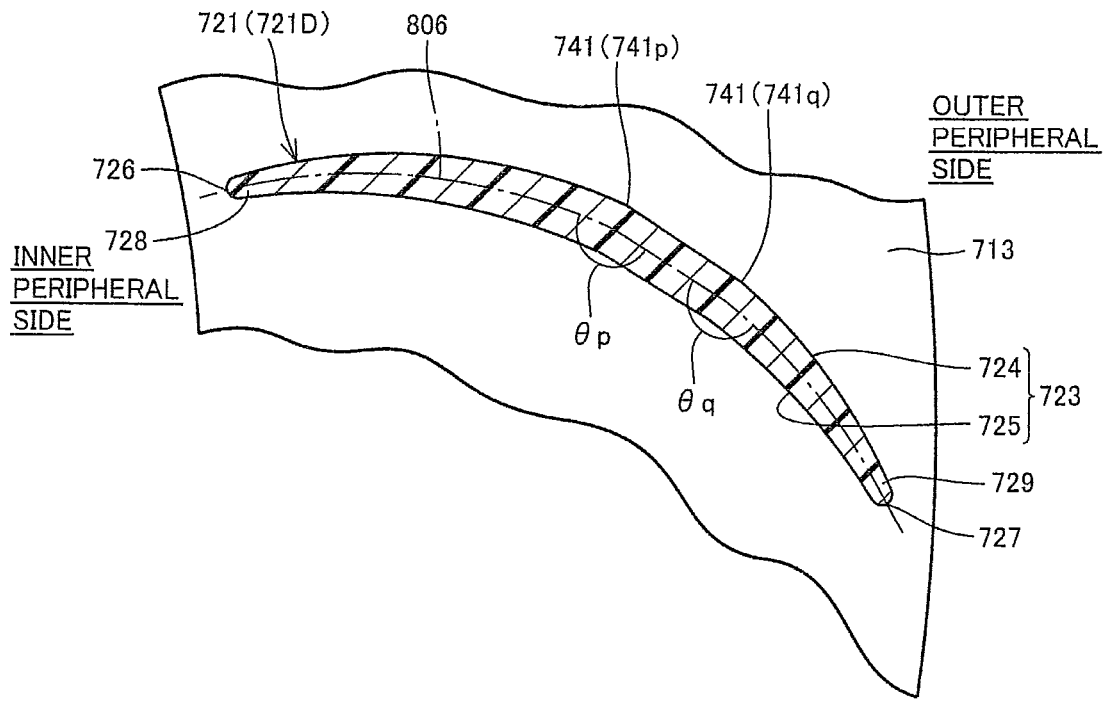
FIG. 45 is an enlarged cross-sectional view showing a blade cross section of the fan blade.
Figure 46:
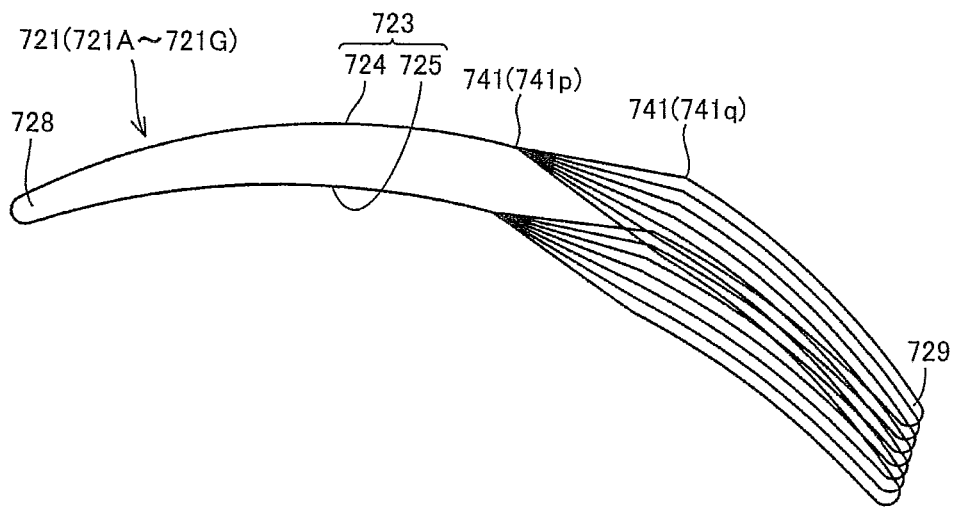
FIG. 46 is a diagram showing that plural kinds of fan blades in FIG. 44 are overlapped with each other.

FIG. 45 is an enlarged cross-sectional view showing a blade cross section of the fan blade. In the figure, a blade cross section of fan blade 721D in FIG. 44 is representatively illustrated. FIG. 46 is a diagram showing that plural kinds of fan blades in FIG. 44 are overlapped with each other.

Referring to FIG. 44 to FIG. 46, a plurality of fan blades 721 are provided such that the outer peripheral blade tip angle $\beta$ of each fan blade 721 is equal among fan blades 721 and that the inner peripheral blade tip angle $\gamma$ of each fan blade 721 is equal among fan blades 721. As far as the range shown in FIG. 44 is concerned, the outer peripheral blade tip angles $\beta$ of fan blades 721A to 721G are equal to each other, and the inner peripheral blade tip angles $\gamma$ of fan blades 721A to 721G are equal to each other.

A plurality of fan blades 721 include fan blades 721A to 721G in which when they are rotated around center axis 801 as the rotation axis of the fan and overlapped on any one of the fan blades 721, one of inner edge portion 726 and outer edge portion 727 is disposed to be coincident with each other, and the other of inner edge portion 726 and outer edge portions 727 is disposed to be displaced from each other.

In the present embodiment, as shown in FIG. 46, when fan blades 721A to 721G are rotated around center axis 801, inner edge portions 726 of fan blades 721A to 721G are coincident with each other, and outer edge portions 727 of fan blades 721A to 721G are displaced from each other. In FIG. 46, the blade cross sections of fan blades 721 are disposed to be displaced from each other on the side of outer peripheral blade tip portions 729, and the blade cross sections of fan blades 721 are disposed to be overlapped with each other on the side of inner peripheral blade tip portions 728.

Fan blade 721 has flection portions 741 at which center line 806 of the blade cross section of fan blade 721 is bent at different points between inner edge portion 726 and outer edge portion 727. In the present embodiment, fan blade 721 has flection portions 741 at two points between inner edge portion 726 and outer edge portion 727. Fan blade 721 has a flection portion 741*q* at a position adjacent to outer edge portion 727 and has a flection portion 741*p* at the blade midpoint between inner edge portion 726 and outer edge portion 727. At flection portion 741*q*, center line 806 is bent by a flection angle θq. At flection portion 741*p*, center line 806 is bent by a flection angle θp.

Fan blades 721A to 721G are formed such that the flection angle θq and the flection angle θp are different among fan blades.

More specifically, in fan blade 721A, flection portion 741*q* is formed so as to be convex on the suction surface 724 side and concave on the pressure surface 725 side (θq<180°). The flection angle θq gradually increases in fan blades 721B, 721C, 721D, 721E, 721F, and 721G in this order, and in fan blade 721G, flection portion 741*q* is formed to be convex on the pressure surface 725 side and concave on the suction surface 724 side (θq>180°). As the flection angle θq increases in order from fan blade 721A to fan blades 721B, 721C, 721D, 721E, 721F, and 721G, the flection angle θp at flection portion 741*p* gradually decreases. Here, flection portion 741*p* has the flection angle θp changed so that the blade cross sections of fan blades 721A to 721G are kept overlapped on the side of inner peripheral blade tip portions 728.

Accordingly, the shape of fan blade 721 is varied such that the blade cross section on the side of outer peripheral blade tip portion 729 is displaced in the thickness direction with the position of flection portion 741*p* being fixed. As a result, the outer peripheral blade tip angle $\beta$ and the inner peripheral blade tip angle $\gamma$ are each equal among fan blades 721A to 721G, while outer edge portions 727 are displaced from each other.

The flection structure of flection portions 741 can improve the strength of fan blade 721. As a result, the reliability of the strength of the fan can be improved although cross-flow fan 800 is a resin fan having a thin blade cross section. The improvement in strength can reduce the thickness of fan blade 721 accordingly. Therefore, the weight of cross-flow fan 800 can be reduced and the cost thereof also can be reduced.

In the present embodiment, flection portion 741 is formed to be bent to form a corner. However, flection portion 741 may be formed to be bent so as to be rounded. In this case, the blade cross section of fan blade 721 extends in the shape of an S at flection portion 741. Even when flection portion 741 is shaped like a corner, flection portion 741 may be slightly rounded in consideration of a process of removing fan blade 721 from a die for resin molding.

Figure 47:
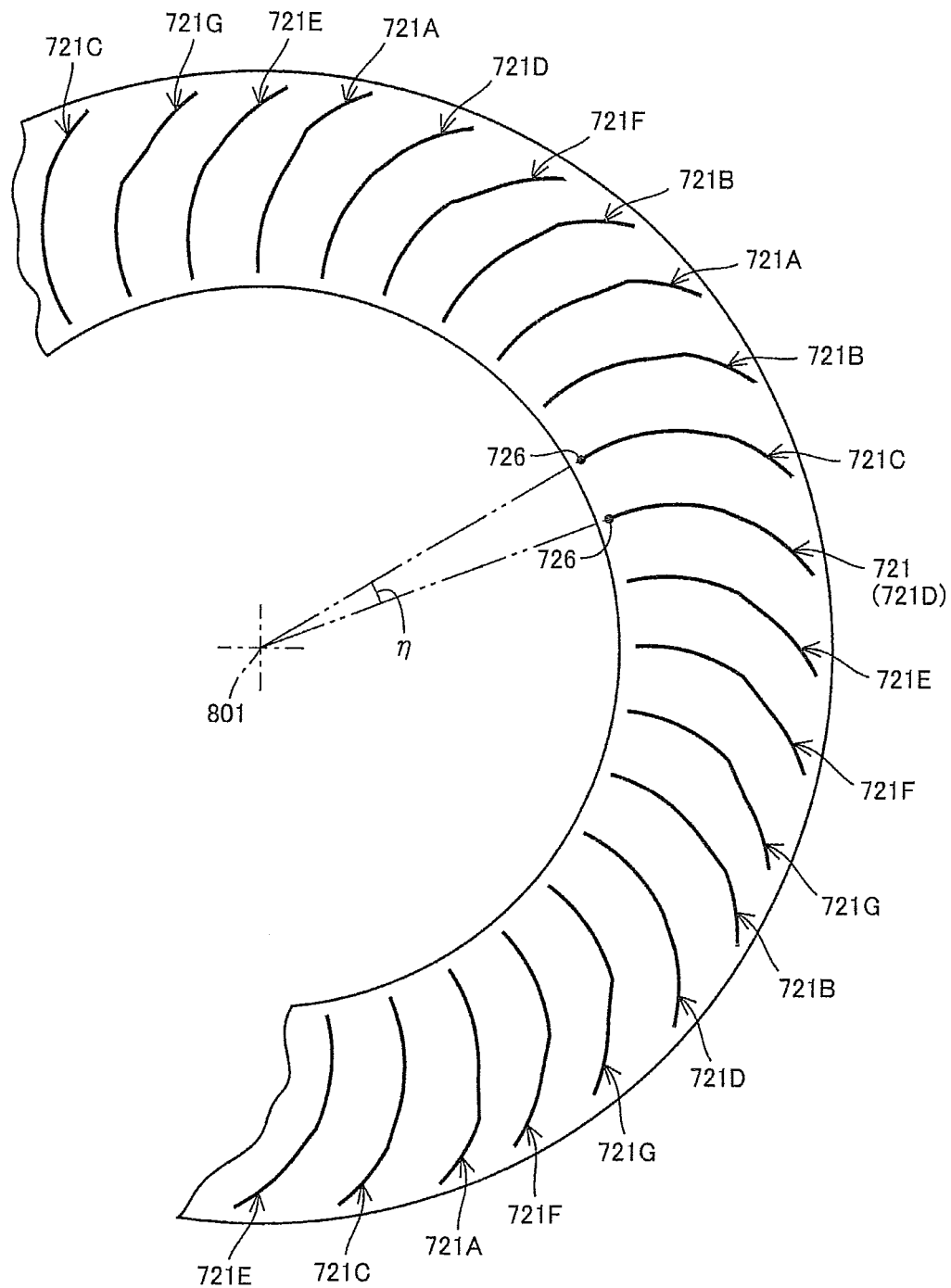
FIG. 47 is a diagram schematically showing an arrangement of fan blades in the cross-flow fan in FIG. 41.

FIG. 47 is a diagram schematically showing an arrangement of fan blades in the cross-flow fan in FIG. 41. Referring to FIG. 47, fan blades 721A, 721B, 721C, 721D, 721E, 721F, and 721G are arranged to be placed in an irregular (random) order in the circumferential direction around center axis 801. More specifically, fan blades 721A to 721E are arranged so as not be repeatedly placed in a regular order (for example, an order of fan blades 721A→721B→721C→721D→721E→721F→721G→721A→721B→721C→721D→721E→721F→721G→721A→721B . . . ).

In the example shown in FIG. 47, fan blades 721C, 721G, 721E, 721A, 721D, 721F, 721B, 721A, 721B, 721C, 721D, 721E, 721F, 721G, 721B, 721D, 721G, 721F, 721A, 721C, 721E are placed in order clockwise around center axis 801.

In the example above, seven kinds of fan blades 721A to 721G make one set, and plural sets of fan blades 721A to 721G placed in different orders are disposed in order. However, the configuration is not limited thereto. For example, a plurality of fan blades may be prepared for each of fan blades 721A to 721G, and fan blades selected therefrom as appropriate may be placed in order. As long as fan blades 721A to 721G are arranged without a regularity as a whole, fan blades of a particular kind may be placed in succession. The number of each of fan blades 721A to 721G for use in cross-flow fan 800 may not be completely equal. All of fan blades 721 for use in cross-flow fan 800 may have blade cross-sectional shapes different from each other. Preferably, at least three kinds, more preferably, at least four kinds of fan blades 721 are used.

Referring to FIG. 41 and FIG. 47, a plurality of fan blades 721 are arranged such that the pitch between adjacent fan blades 721 (in FIG. 47, the angle η of a straight line passing through center axis 801 and inner edge portion 726 between adjacent fan blades 721) is random. The random pitches are realized by disposing a plurality of fan blades 721 at irregular intervals according to random-number normal distribution.

A plurality of impellers 712 are configured such that the arrangement of fan blades 721 is the same. In other words, the intervals at which a plurality of fan blades 721 are arranged and the order in which fan blades 721 are arranged at such intervals in each impeller 712 are the same among impellers 712.

A plurality of fan blades 721 may be arranged at regular pitches rather than at random pitches.

A plurality of impellers 712 are stacked such that a displacement angle T is formed between adjacent impellers 712 as viewed from the axial direction of center axis 801. For example, attention is given to impeller 712A, impeller 712B, and impeller 712C in FIG. 41 disposed adjacent to each other in the order of appearance. Impeller 712B is stacked on impeller 712A so as to be displaced about center axis 801 by displacement angle T from the position where all of fan blades 721 in impellers 712A and 712B overlap in the axial direction of center axis 801. Impeller 712C is stacked on impeller 712B so as to be displaced about center axis 801 by displacement angle T (2T when viewed from impeller 712A) from the position where all of fan blades 721 in impellers 712B and 712C overlap in the axial direction of center axis 801.

The structure of cross-flow fan 800 in the seventh embodiment of the present invention as described above is summarized as follows. Cross-flow fan 800 as a fan in the present embodiment includes fan blades 721 as a plurality of blade portions arranged spaced apart from each other in the circumferential direction. Fan blade 721 has blade surface 723 including pressure surface 725 disposed on the rotational direction side of the fan and suction surface 724 disposed on the back side of pressure surface 725. When cut along the plane orthogonal to center axis 801 serving as the rotation axis of the fan, fan blade 721 has inner edge portion 726 at which center line 806 between pressure surface 725 and suction surface 724 intersects inner peripheral blade tip portion 728 that is a blade tip on the inner peripheral side, and outer edge portion 727 at which center line 806 intersects outer peripheral blade tip portion 729 that is a blade tip on the outer peripheral side. As the fan is rotated, an air flow as a fluid flow flowing between inner edge portion 726 and outer edge portion 727 is generated on blade surface 723.

The outer peripheral blade tip angle β is defined as the angle between straight line 936 passing through center axis 801 as the rotational center of the fan and outer edge portion 727, and tangent 937 of center line 806 at outer edge portion 727. The inner peripheral blade tip angle γ is defined as the angle between straight line 938 passing through center axis 801 as the rotational center of the fan and inner edge portion 726, and tangent 939 of center line 806 at inner edge portion 726. In this case, a plurality of fan blades 721 are provided such that the outer peripheral blade tip angle β and the inner peripheral blade tip angle γ are each equal among fan blades 721. A plurality of fan blades 721 include fan blades 721A to 721G as a first blade portion and a second blade portion in which when they are rotated around center axis 801 as the rotation axis of the fan and overlapped on one fan blade 721, inner edge portions 726, as one of inner edge portion 726 and outer edge portion 727, are disposed to be coincident with each other, and outer edge portions 727, as the other of inner edge portion 726 and outer edge portion 727, are disposed to be displaced from each other.

(Description of Structures of Air Conditioner and Molding Die)

Figure 48:
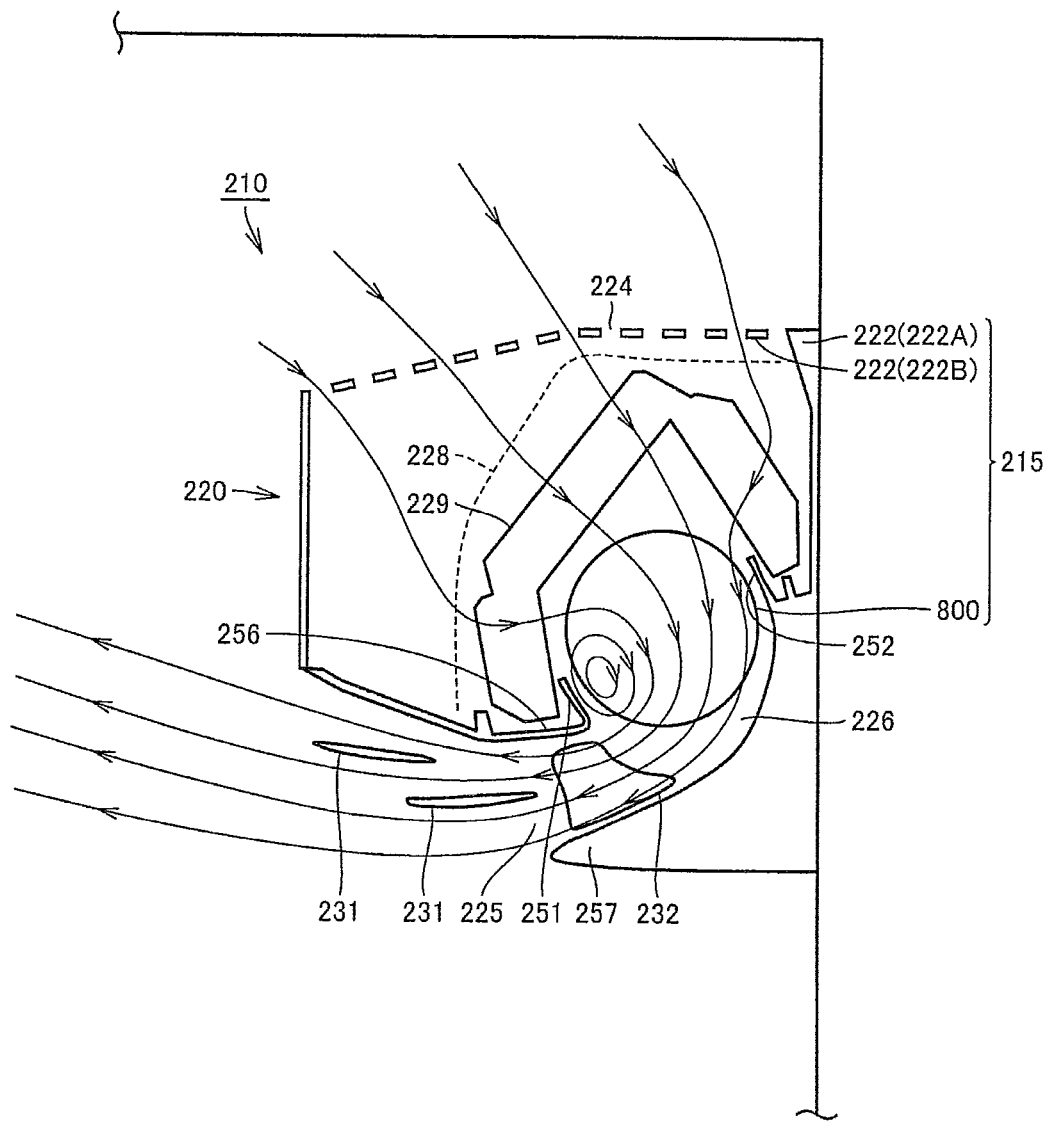
FIG. 48 is a cross-sectional view of an air conditioner using the cross-flow fan shown in FIG. 41.

FIG. 48 is a cross-sectional view of an air conditioner using the cross-flow fan in FIG. 41. Referring to FIG. 48, an air conditioner 210 is configured with an indoor unit 220 installed in a room and provided with an indoor heat exchanger 229 and a not-shown outdoor unit installed in the outside of the room and provided with an outdoor heat exchanger and a compressor. Indoor unit 220 and the outdoor unit are connected by piping for circulating refrigerant gas between indoor heat exchanger 229 and the outdoor heat exchanger.

Indoor unit 220 has a blower 215. Blower 215 is configured to include cross-flow fan 800, a not-shown driving motor for rotating cross-flow fan 800, and a casing 222 for producing a prescribed airflow with rotation of cross-flow fan 800.

Casing 222 has a cabinet 222A and a front panel 222B. Cabinet 222A is supported on a wall surface in the room. Front panel 222B is removably attached to cabinet 222A. An outlet port 225 is formed in a gap between a lower end portion of front panel 222B and a lower end portion of cabinet 222A. Outlet port 225 is formed in an approximately rectangular shape extending in the width direction of indoor unit 220 and is provided to be directed forward and downward. On the top surface of front panel 222B, a grid-like intake port 224 is formed.

At a position opposing front panel 222B, an air filter 228 is provided for collecting and removing dust included in the air taken in from intake port 224. A not-shown air filter cleaner is provided in a space formed between front panel 222B and air filter 228. The air filter cleaner automatically removes dust accumulated in air filter 228.

In the inside of casing 222, an air flow channel 226 is formed, through which air is circulated from intake port 224 toward outlet port 225. Outlet port 225 is provided with a vertical louver 232 that can change the blowing angle in the left and right directions and a plurality of horizontal louvers 231 that can change the blowing angle in the up and down directions to a forward-upward direction, a horizontal direction, a forward-downward direction, and an immediately downward direction.

Indoor heat exchanger 229 is arranged between cross-flow fan 800 and air filter 228 on a path of air flow channel 226. Indoor heat exchanger 229 has not-shown serpentine refrigerant pipes arranged side by side in a plurality of layers in the up and down directions and in a plurality of columns in the front and back directions. Indoor heat exchanger 229 is connected to the compressor of the outdoor unit installed in the outdoor, and the compressor is driven to operate a refrigeration cycle. Through the operation of the refrigeration cycle, indoor heat exchanger 229 is cooled to a temperature lower than the ambient temperature during cooling operation, and indoor heat exchanger 229 is heated to a temperature higher than the ambient temperature during heating operation.

Figure 49:
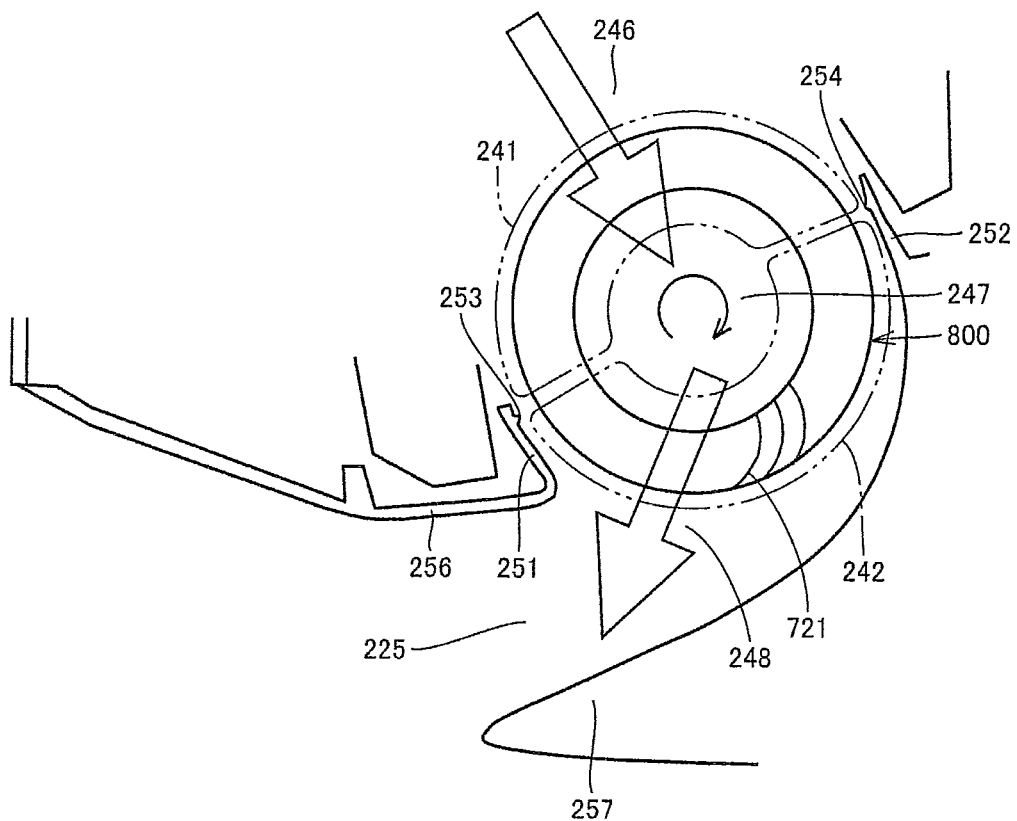
FIG. 49 is an enlarged cross-sectional view showing the proximity of an outlet port of the air conditioner in FIG. 48.

FIG. 49 is an enlarged cross-sectional view showing the proximity of the outlet port of the air conditioner in FIG. 48. Referring to FIG. 48 and FIG. 49, casing 222 has a front wall portion 251 and a rear wall portion 252. Front wall portion 251 and rear wall portion 252 are disposed to face each other at a distance from each other.

On a path of air flow channel 226, cross-flow fan 800 is disposed to be positioned between front wall portion 251 and rear wall portion 252. A protrusion portion 253 is formed at front wall portion 251 to protrude toward the radially outer surface of cross-flow fan 800 so as to decrease the gap between cross-flow fan 800 and front wall portion 251. A protrusion portion 254 is formed at rear wall portion 252 to protrude toward the radially outer surface of cross-flow fan 800 so as to decrease the gap between cross-flow fan 800 and rear wall portion 252.

Casing 222 has an upper guide portion 256 and a lower guide portion 257. Air flow channel 226 is defined by upper guide portion 256 and lower guide portion 257 on the downstream side of air flow from cross-flow fan 800.

Upper guide portion 256 and lower guide portion 257 are continuous from front wall portion 251 and rear wall portion 252, respectively, and extend toward outlet port 225. Upper guide portion 256 and lower guide portion 257 are formed to curve the air output by cross-flow fan 800 with upper guide portion 256 on the inner circumferential side and with lower guide portion 257 on the outer circumferential side, and to guide the air forward and downward. Upper guide portion 256 and lower guide portion 257 are formed such that the cross section of air flow channel 226 increases from cross-flow fan 800 toward outlet port 225.

In the present embodiment, front wall portion 251 and upper guide portion 256 are integrally formed with front panel 222B. Rear wall portion 252 and lower guide portion 257 are integrally formed with cabinet 222A.

Figure 50:
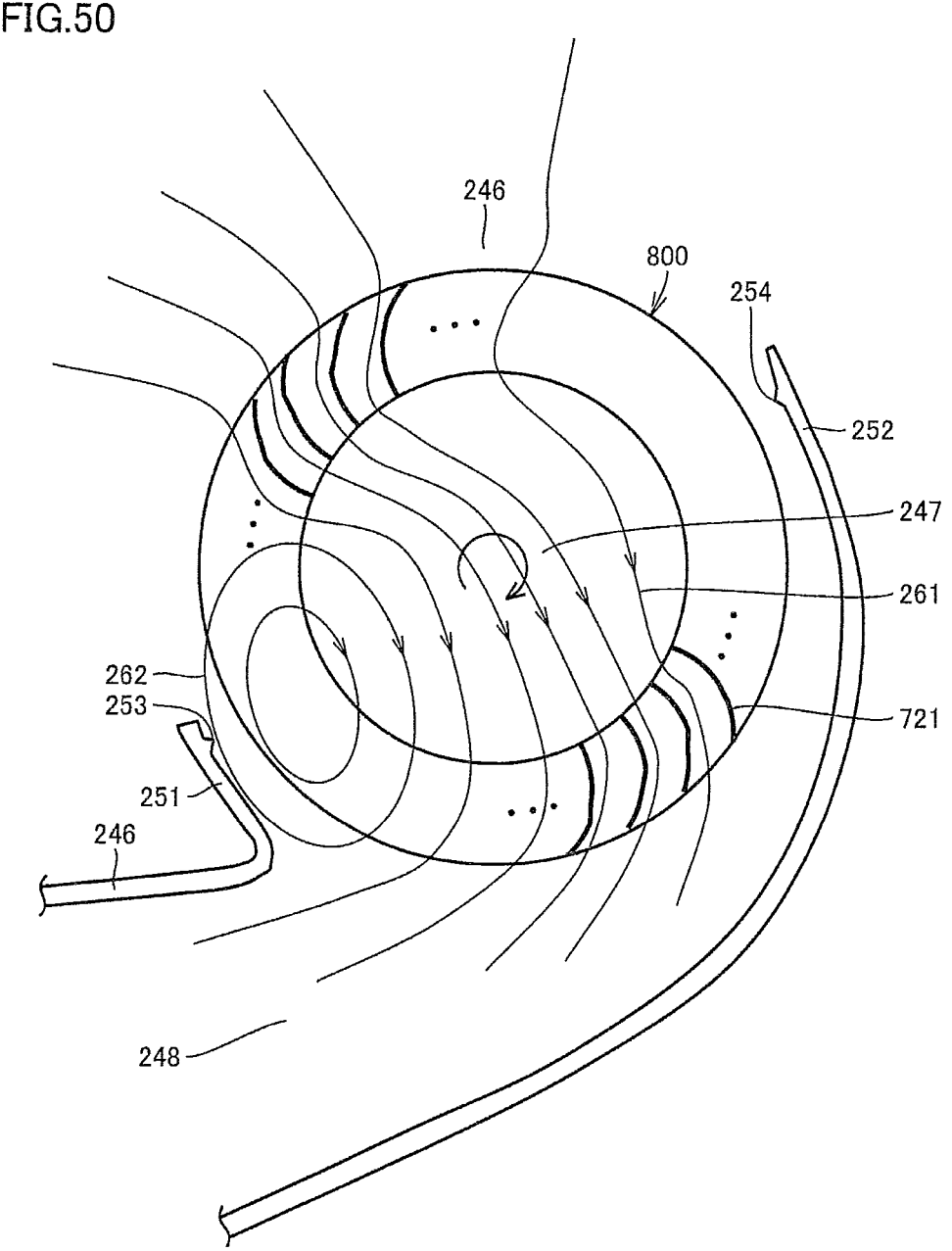
FIG. 50 is a cross-sectional view of an air flow produced in the proximity of the outlet port of the air conditioner in FIG. 48.

FIG. 50 is a cross-sectional view of an air flow produced in the proximity of the outlet port of the air conditioner in FIG. 48. Referring to FIG. 48 to FIG. 50, on the path on air flow channel 226, an upstream outside space 246 is formed to be positioned upstream of air flow from cross-flow fan 800, an inside space 247 is formed to be positioned in the inside of cross-flow fan 800 (the inner peripheral side of a plurality of fan blades 721 circumferentially arranged), and a downstream outside space 248 is formed to be positioned downstream of air flow from cross-flow fan 800.

During rotation of cross-flow fan 800, at an upstream region 241 of air flow channel 226 with respect to protrusion portions 253, 254 as a boundary, an air flow 261 is formed to pass through on blade surface 723 of fan blade 721 from upstream outside space 246 toward inside space 247. At a downstream region 242 of air flow channel 226 with respect to protrusion portions 253, 254 as a boundary, air flow 261 is formed to pass through on blade surface 723 of fan blade 721 from inside space 247 toward downstream outside space 248. Here, at a position adjacent to front wall portion 251, a forced vortex 262 of air flow is formed.

Although an air conditioner has been described in the present embodiment by way of example, the cross-flow fan in the present invention is also applicable to a fluid feeding device such as, for example, an air purifier, a humidifier, a cooling device, and a ventilating device.

Figure 51:
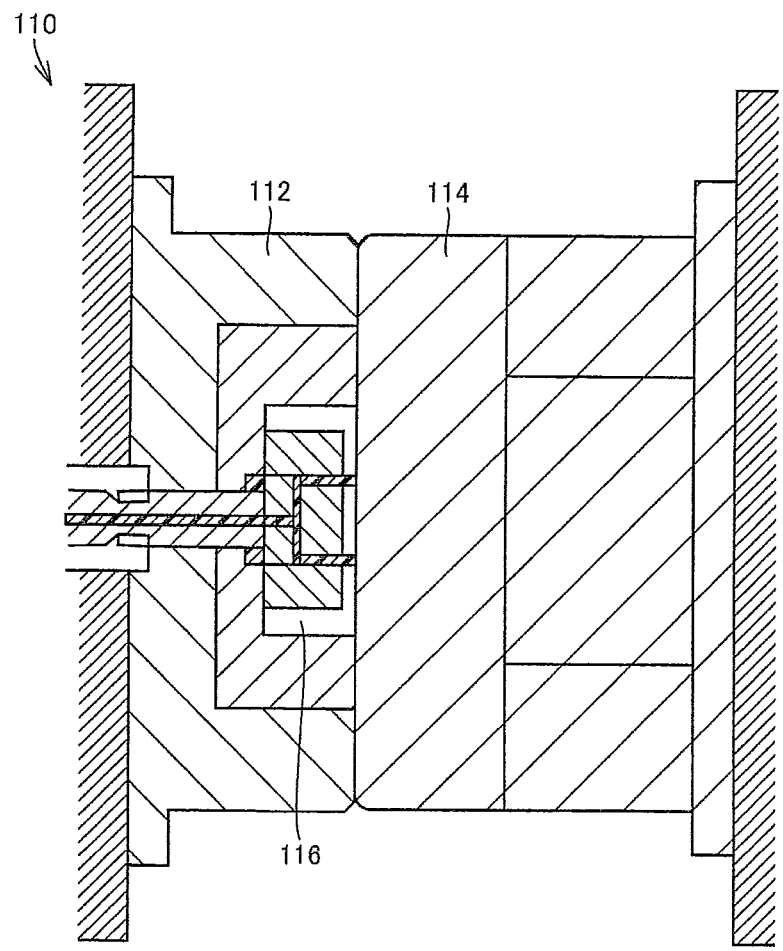
FIG. 51 is a cross-sectional view of a molding die for use in production of the cross-flow fan in FIG. 41.

FIG. 51 is a cross-sectional view of a molding die for use in production of the cross-flow fan in FIG. 41. Referring to FIG. 51, a molding die 110 has a stationary die 114 and a movable die 112. Stationary die 114 and movable die 112 define a cavity 116 which has approximately the same shape as cross-flow fan 800 and into which flowable resin is injected.

Molding die 110 may be provided with a not-shown heater for increasing the flowability of resin injected into cavity 116. The installation of such a heater is particularly effective, for example, when synthetic resin with an increased strength, such as glass-fiber-filled AS (acrylonitrile-styrene copolymer) resin, is used.

A centrifugal fan 710 in a ninth embodiment described later is also produced with a molding die having a similar structure as molding die 110 in FIG. 51.

(Detailed Description of Operation and Effects)

The operation and effects achieved by cross-flow fan 800 in the present embodiment will now be described assuming that cross flow-fan 800 is applied to an air conditioner.

Figure 52:
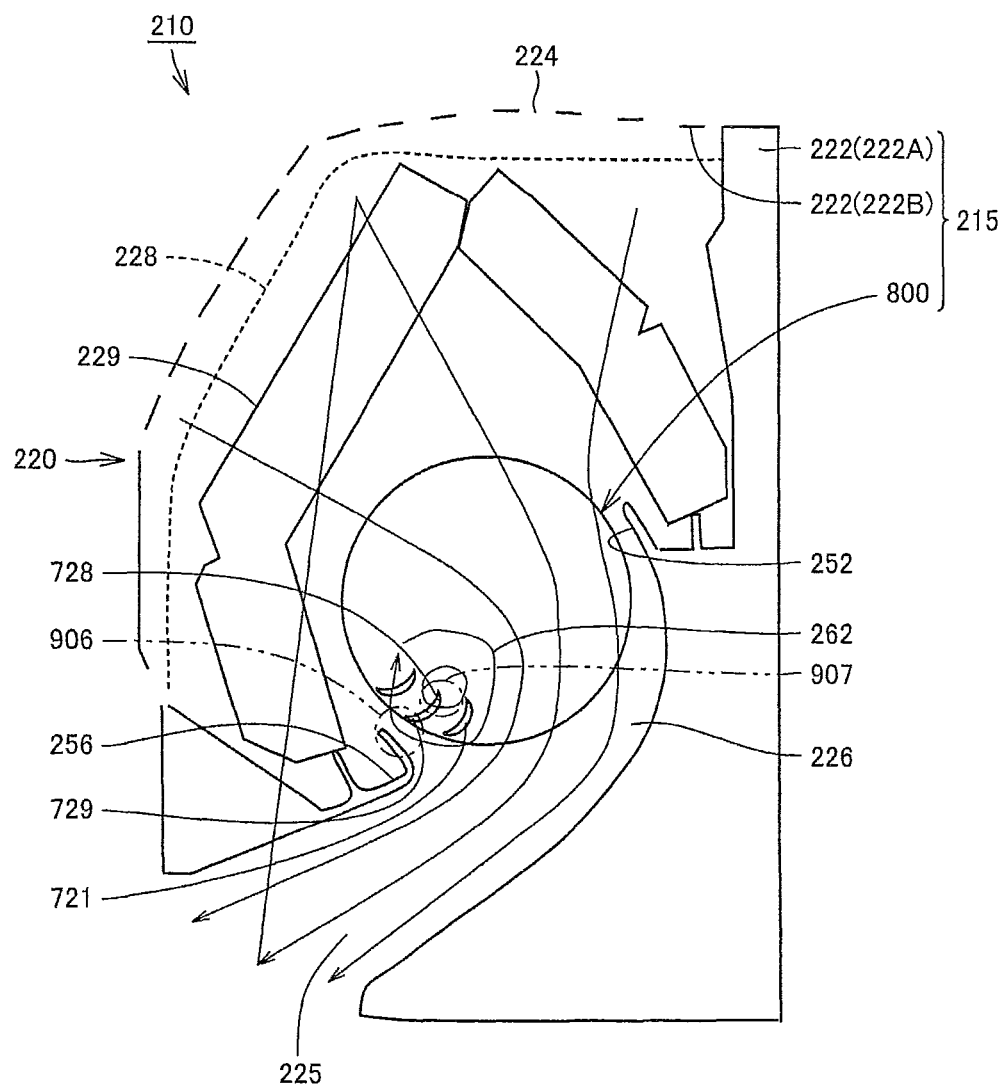
FIG. 52 is a diagram for explaining the operation and effects achieved by the cross-flow fan in FIG. 41.

FIG. 52 is a diagram for explaining the operation and effects achieved by the cross-flow fan in FIG. 41. In the figure, a cross section of an air conditioner corresponding to FIG. 48 is shown.

Referring to FIG. 52, a phenomenon that occurs on the side of outer peripheral blade tip portion 729 of fan blade 721 will be described. As cross-flow fan 800 is rotated, outer peripheral blade tip portions 729 of fan blades 721 pass through one by one to cause periodic pressure variations at an approach place 906 where fan blade 721 approaches casing 222 (a space where fan blade 721 faces front wall portion 251 of casing 222). The periodic pressure variations are a cause for narrow-band noise called a blade passing sound.

By contrast, in cross-flow fan 800 in the present embodiment, a plurality of fan blades 721 are comprised of fan blades 721A to 721G in which when a plurality of fan blades 721 are rotated around center axis 801 and overlapped, outer edge portions 727 are disposed to be displaced from each other. Accordingly, the cycle of outer peripheral blade tip end portion 729 of fan blade 721 passing through can be shifted more actively among fan blades 721A to 721G. As a result, the cycles of pressure variations become less uniform, thereby reducing narrow-band noise.

On the other hand, when fan blades 721A to 721G different in position of outer peripheral blade tip portion 729 are used, the air flow between adjacent fan blades 721 varies among a plurality of fan blades 721. In this case, it is difficult to set an optimum air flow channel between all the fan blades 721, and separation or constriction of air flow may occur between part of fan blades 721.

By contrast, in cross-flow fan 800 in the present embodiment, a plurality of fan blades 721 are provided such that the outer peripheral blade tip angle β and the inner peripheral blade tip angle γ are each equal among fan blades 721. With such a configuration, the direction in which the air flows in on blade surface 723 and the direction in which the air flows out on blade surface 723 between adjacent fan blades 723 can be made uniform among fan blades 721. This can prevent the direction of the air flow between adjacent fan blades 721 from being significantly changed between inner edge portion 726 and outer edge portion 727, thereby effectively preventing separation and constriction of air flow as described above. In the present embodiment, the blade cross section on the side of outer peripheral blade tip portion 729 is disposed to be actively displaced among fan blades 721, while the blade cross section on the side of inner peripheral blade tip portion 728 is disposed at a fixed position. Therefore, for example, the angle η in FIG. 47 can be set small between adjacent fan blades 721. Accordingly, the blade interval on the inner edge portion 726 side can be brought closer to the optimum interval, so that separation or constriction of air flow that may occur between part of fan blades 721 can be effectively prevented. In particular, when the angle η in FIG. 47 is equal among all the fan blades 721 (in other words, inner edge portions 726 are positioned at regular pitches), the blade interval on the inner edge portion 726 side can be set to an optimum interval. Accordingly, separation or constriction of air flow between fan blades 721 on the inner edge portion 726 side can be prevented suitably. As a result, the blowing capacity of cross-flow fan 800 can be improved.

In cross-flow fan 800 in the seventh embodiment of the present invention configured in this manner, the blowing capacity of cross-flow fan 800 can be improved, while narrow-band noise caused by rotation of fan blades 721 can be reduced. The use of cross-flow fan 800 in this manner reduces power consumption of the driving motor and provides air conditioner 210 that can contribute to energy savings. Furthermore, quiet air conditioner 210 is provided.

Eighth Embodiment

In the present embodiment, variations of plural kinds of fan blades 721 shown in FIG. 44 will be described.

Figure 53:
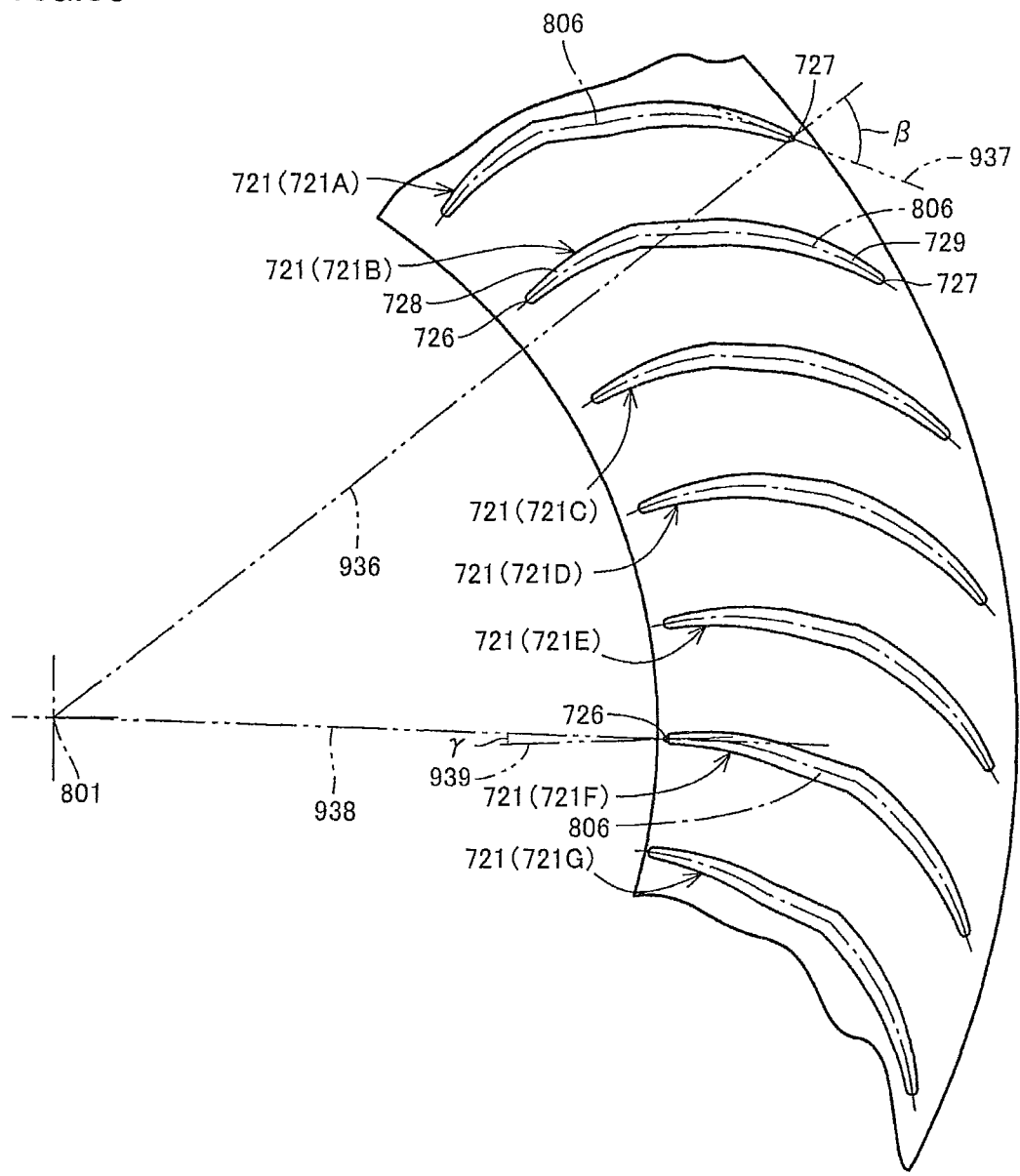
FIG. 53 is a cross-sectional view showing a first modification of plural kinds of fan blades in FIG. 44.

FIG. 53 is a cross-sectional view showing a first modification of plural kinds of fan blades in FIG. 44. Referring to FIG. 53, a plurality of fan blades 721 are comprised of plural kinds of fan blades 721A, 721B, 721C, 721D, 721E, 721F, and 721G.

Figure 54:
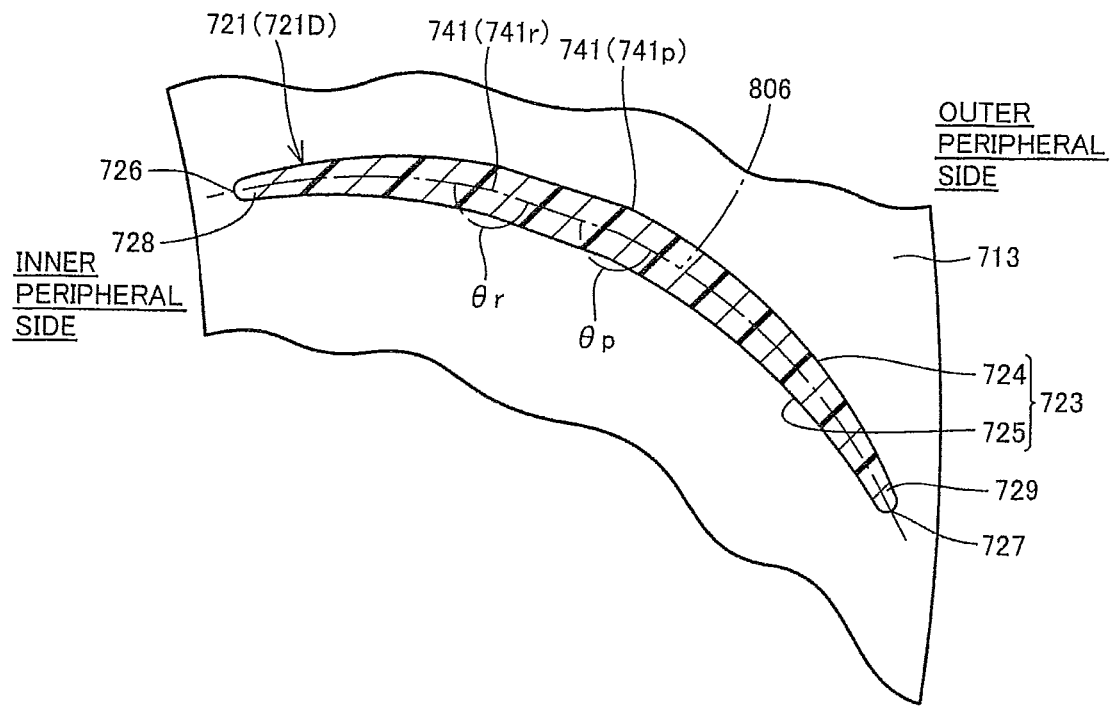
FIG. 54 is an enlarged cross-sectional view showing a blade cross section of the fan blade in FIG. 53.
Figure 55:
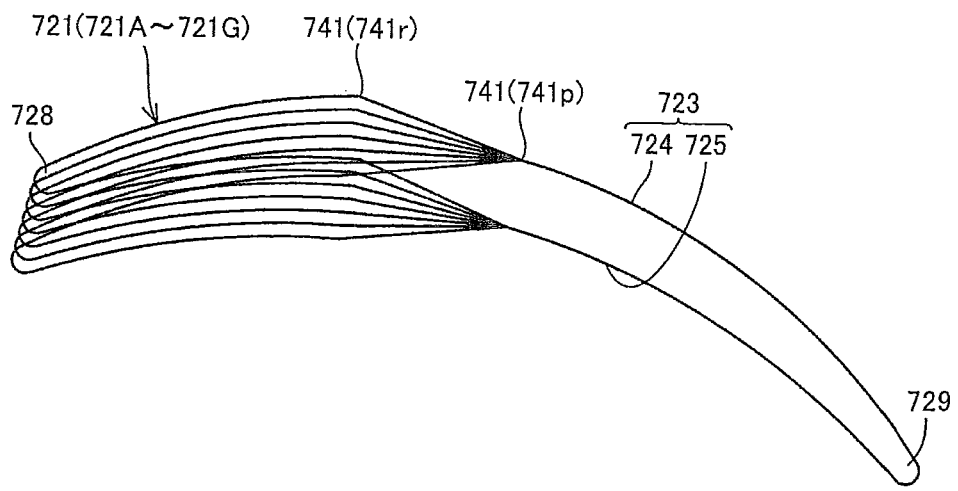
FIG. 55 is a diagram showing that plural kinds of fan blades in FIG. 53 are overlapped with each other.

FIG. 54 is an enlarged cross-sectional view showing a blade cross section of the fan blade in FIG. 53. In the figure, a blade cross section of fan blade 721D in FIG. 53 is representatively illustrated. FIG. 55 is a diagram showing that plural kinds of fan blades in FIG. 53 are overlapped with each other.

Referring to FIG. 53 to FIG. 55, also in this modification, a plurality of fan blades 721 are provided such that the outer peripheral blade tip angle β of each fan blade 721 is equal among fan blades 721 and that the inner peripheral blade tip angle γ of each fan blade 721 are equal among fan blades 721. As far as the range shown in FIG. 53 is concerned, the outer peripheral blade tip angles β of fan blades 721A to 721G are equal to each other, and the inner peripheral blade tip angles γ of fan blades 721A to 721G are equal to each other.

Furthermore, as shown in FIG. 55, when fan blades 721A to 721G are rotated around center axis 801, outer edge portions 727 of fan blades 721A to 721G are coincident with each other, and inner edge portions 726 of fan blades 721A to 721G are displaced from each other. In FIG. 55, the blade cross sections of fan blades 721 on the side of inner peripheral blade tip portions 728 are disposed to be displaced from each other, whereas the blade cross sections of fan blades 721 on the side of outer peripheral blade tip portions 729 are disposed to be overlapped with each other.

Fan blade 721 has flection portions 741 at two points between inner edge portion 726 and outer edge portion 727. In the present modification, fan blade 721 has a flection portion 741r at a position adjacent to inner edge portion 726 and a flection portion 741p at the blade midpoint between inner edge portion 726 and outer edge portion 727. At flection portion 741r, center line 806 is bent by a flection angle θr. At flection portion 741p, center line 806 is bent by a flection angle θp.

Fan blades 721A to 721G are formed such that the flection angle θr and the flection angle θp differ among the fan blades. More specifically, in fan blade 721A, flection portion 741r is convex on the suction surface 724 side and is concave on the pressure surface 725 side (θr<180°). The flection angle θr gradually increases in order of fan blades 721B, 721C, 721D, 721E, 721F, and 721G. In fan blade 721G, flection portion 741r is convex on the pressure surface 725 side and is concave on the suction surface 724 side (θr>180°). As the flection angle θr increases in order from fan blade 721A to fan blades 721B, 721C, 721D, 721E, 721F, and 721G, the flection angle θp at flection portion 741p gradually decreases. Here, flection portion 741p has the flection angle θp changed so that the blade cross sections of fan blades 721A to 721G are kept overlapped on the side of outer peripheral blade tip portions 729.

Accordingly, the shape of fan blade 721 is varied such that the blade cross section on the side of inner peripheral blade tip portion 728 is displaced in the thickness direction with the position of flection portion 741p being fixed. As a result, the outer peripheral blade tip angle β and the inner peripheral blade tip angle γ are each equal among fan blades 721A to 721G, while inner edge portions 726 are displaced from each other.

Also in this modification, as described with reference to FIG. 47, fan blades 721A, 721B, 721C, 721D, 721E, 721F, and 721G are arranged to be placed in an irregular (random) order in the circumferential direction around center axis 801. A plurality of fan blades 721 are arranged such that the pitch between adjacent fan blades 721 is random. Here, the pitch between adjacent fan blades 721 is represented by the angle of the straight line passing through center axis 801 and outer edge portion 727 between adjacent fan blades 721.

Referring to FIG. 52, a phenomenon that occurs on the side of inner peripheral blade tip portion 728 of fan blade 721 will be described. As described with reference to FIG. 50, forced vortex 262 is produced by rotation of fan blade 721 on the side of inner peripheral blade tip portion 728. When inner peripheral blade tip portions 728 of fan blades 721 pass through one by one at a center portion 907 in the region in which forced vortex 262 is formed, periodic pressure variations are caused by interference of forced vortex 262 with inner peripheral blade tip portions 728. Accordingly, narrow-band noise is produced as is the case with the side of outer peripheral blade tip portions 729.

By contrast, in the cross-flow fan in the present modification, a plurality of fan blades 721 are comprised of fan blades 721A to 721G in which when a plurality of fan blades 721 are rotated around center axis 801 and overlapped, inner edge portions 726 are displaced from each other. Accordingly, the cycle of inner peripheral blade tip portion 728 of fan blade 721 passing through can be shifted among fan blades 721A to 721G more actively. As a result, the cycles of pressure variations become less uniform, thereby reducing narrow-band noise.

On both the side of outer peripheral blade tip portion 729 and the side of inner peripheral blade tip portion 728, the noise generation mechanism is the same in that noise results from pressure variations caused by passage of blade tips. However, the center of forced vortex 262 is moved flexibly to some extent between forced vortex 262 and inner peripheral blade tip portion 728. Therefore, the pressure variations at center portion 907 become small and less affect narrow-band noise. By contrast, at approach place 906 between casing 222 and fan blade 721, the relative position therebetween does not change. Therefore, the pressure variations at approach place 906 become large and more affect narrow-band noise.

Figure 56:
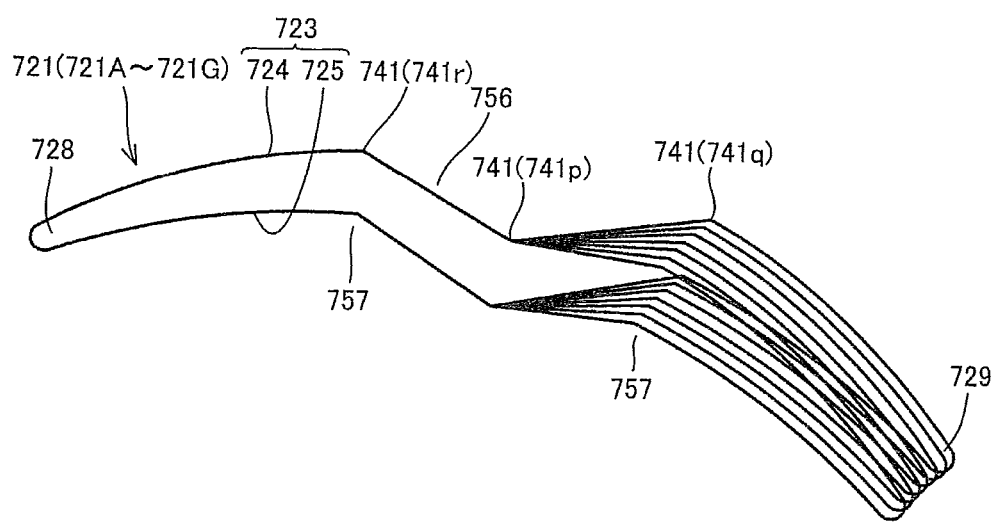
FIG. 56 is a cross-sectional view showing a second modification of plural kinds of fan blades in FIG. 44.

FIG. 56 is a cross-sectional view showing a second modification of plural kinds of fan blades in FIG. 44. FIG. 56 corresponds to FIG. 46 in the seventh embodiment.

Referring to FIG. 56, in this modification, fan blade 721 has flection portions 741 at three points between inner edge portion 726 and outer edge portion 727. Fan blade 721 has a flection portion 741$q$ at a position adjacent to outer edge portion 727, a flection portion 741$p$ at the blade midpoint between inner edge portion 726 and outer edge portion 727, and a flection portion 741$r$ at a position adjacent to inner edge portion 726.

In a similar manner as in the seventh embodiment, fan blades 721A to 721G are formed such that the flection angle θq and the flection angle θp (see FIG. 45) differ among the fan blades, whereby the outer peripheral blade tip angle β and the inner peripheral blade tip angle γ are each equal among fan blades 721A to 721G, and outer edge portions 727 are displaced from each other.

It is noted that the flection angle θq is smaller than 180° in all the fan blades 721A to 721G, whereas the flection angle θp is greater than 180° in all the fan blades 721A to 721G. On the other hand, when the flection angle θr of flection portion 741$r$ is defined in a similar manner as in θp and θq, the flection angle θr is equal among fan blades 721A to 721G. The flection angle θr is smaller than 180°.

In such a configuration, in this modification, fan blades 721A to 721G each have an approximately W-shaped blade cross-sectional shape. Fan blades 721A to 721G each have such a blade cross section in that concave portion 757 is formed at pressure surface 725 of blade surface 723 and concave portion 756 is formed at suction surface 724 of blade surface 723.

During rotation of cross-flow fan 800, the air flow passing through on blade surface 723 is produced between adjacent fan blades 721. Here, vortexes of air flow (secondary flows) are generated in concave portions 756 and 757 formed on blade surface 723, whereby the air flow (main flow) passing through on blade surface 723 flows along the outside of the vortexes produced in concave portions 756 and 757. Accordingly, although having a thin blade cross section, fan blade 721 exhibits a behavior like a thick blade as if the blade cross section is increased by the depth of concave portions 756 and 757 in which vortexes are formed. As a result, the lift produced in proximity to concave portions 756 and 757 can be significantly increased.

The cross-flow fan in the eighth embodiment of the present invention configured in this manner can achieve the effects as described in the seventh embodiment similarly.

Ninth Embodiment

In the present embodiment, first of all, a structure of a centrifugal fan to which a fan according to the present invention is applied will be described. Next, structures of a blower and an air purifier using the centrifugal fan will be described.

The centrifugal fan in the present embodiment partially has the same structure as cross-flow fan 800 in the seventh embodiment. In the following, a description of the overlapping structure will not be repeated.

(Description of Structure of Centrifugal Fan)

Figure 57:
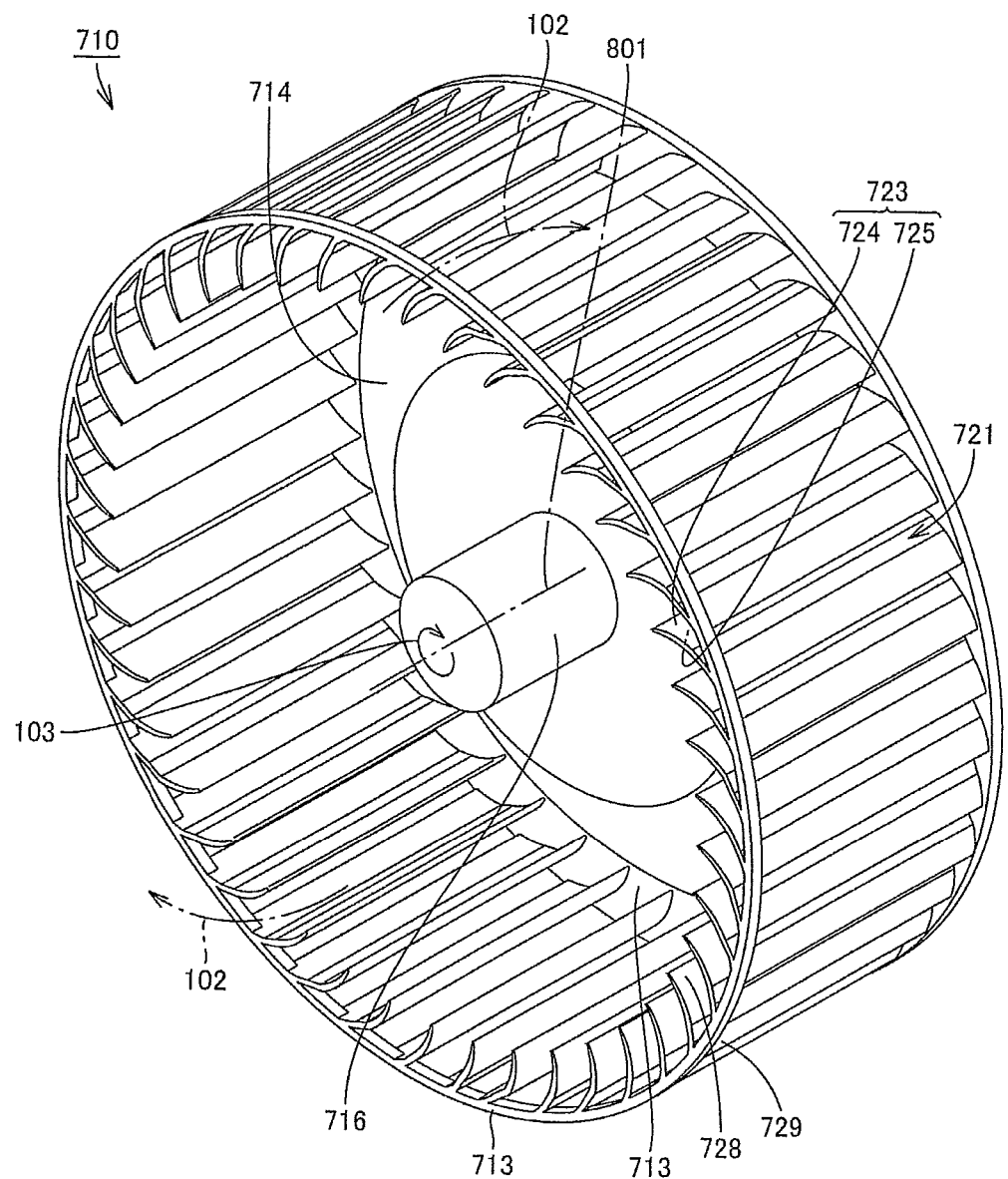
FIG. 57 is a perspective view of a centrifugal fan according to a ninth embodiment of the present invention.

FIG. 57 is a perspective view of a centrifugal fan in a ninth embodiment of the present invention. Referring to FIG. 57, a centrifugal fan 710 in the present embodiment has a plurality of fan blades 721. Centrifugal fan 710 has an approximately cylindrical appearance as a whole. A plurality of fan blades 721 are disposed on a circumferential surface of the approximately cylindrical shape. Centrifugal fan 710 is integrally formed from resin. Centrifugal fan 710 rotates in the direction shown by arrow 103 around an imaginary center axis 801 shown in FIG. 57.

Centrifugal fan 710 is a fan using a plurality of rotating fan blades 721 to output air taken in from the radially inner side to the radially outer side. Centrifugal fan 710 is a fan using a centrifugal force to output the air from the rotational center side of the fan to the radial direction thereof. Centrifugal fan 710 is a sirocco fan Centrifugal fan 710 is used with rotation speeds in a low Reynolds number region applied to fans for home electric equipment, etc.

Centrifugal fan 710 further has peripheral frames 713 serving as supports. Peripheral frames 713 are formed to annually extend around center axis 801. Peripheral frames 713 are disposed spaced apart from each other in the axial direction of center axis 801. A boss portion 716 for coupling centrifugal fan 710 to a driving motor is integrally formed with one of the peripheral frames 713 with a disk portion 714 interposed therebetween.

A plurality of fan blades 721 are arranged spaced apart from each other in the circumferential direction around center axis 801. A plurality of fan blades 721 are supported by peripheral frames 713 at opposite ends thereof in the axial direction of center axis 801. Fan blade 721 is provided to stand on one peripheral frame 713 and formed to extend along the axial direction of center axis 801 toward the other peripheral frame 713.

A plurality of fan blades 721 are comprised of plural kinds of fan blades 721A to 721G shown in FIG. 44 and have a similar structure as that of fan blades 721 described in the seventh embodiment (the outer peripheral blade tip angle β of each fan blade 721 is equal among fan blades 721 and the inner peripheral blade tip angle γ of each fan blade 721 is equal among fan blades 721; when fan blades 721A to 721G are rotated around center axis 801, inner edge portions 726 of fan blades 721A to 721G are coincident with each other and outer edge portions 727 of fan blades 721A to 721G are displaced from each other; and fan blades 721A to 721G are arranged in an irregular order).

However, centrifugal fan 710 in the present embodiment differs from cross-flow fan 800 in the seventh embodiment in that a plurality of fan blades 721 are arranged at regular intervals.

(Description of Structures of Blower and Air Purifier)

Figure 58:
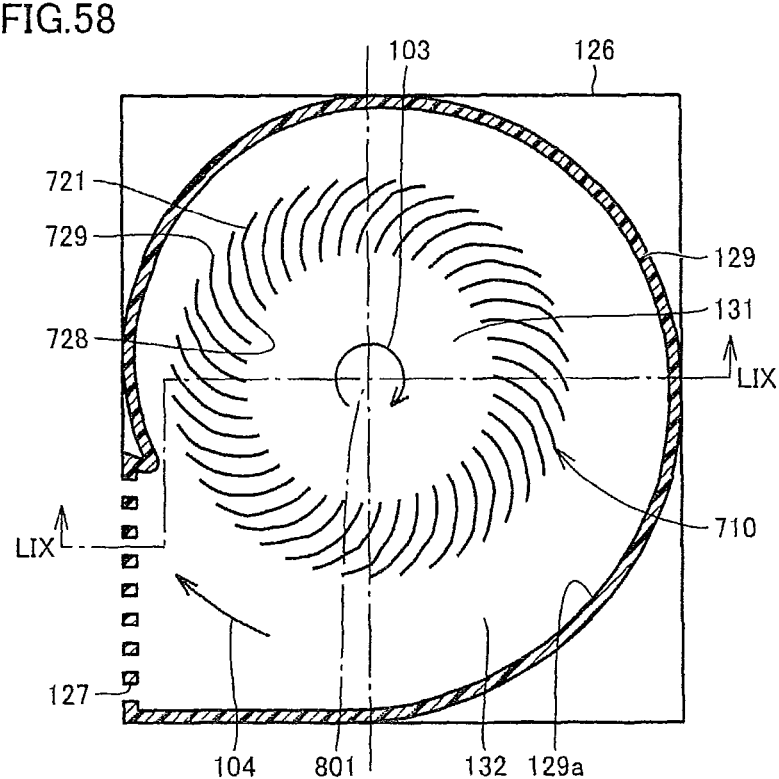
FIG. 58 is a cross-sectional view of a blower using the centrifugal fan in FIG. 57.
Figure 59:
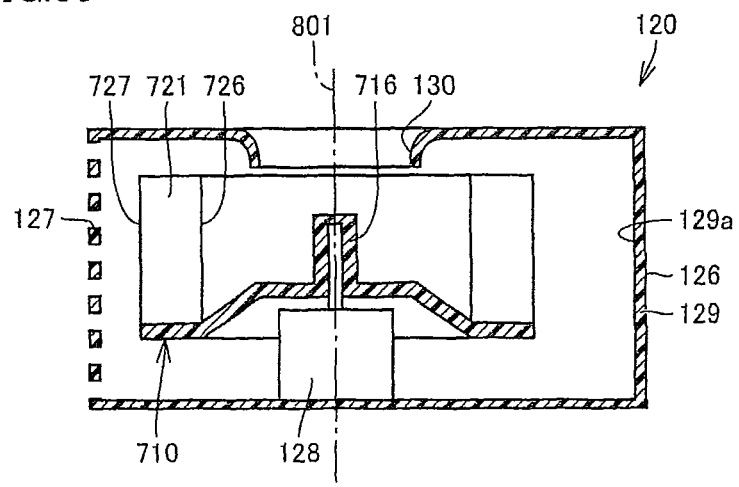
FIG. 59 is a cross-sectional view of the blower taken along a line LIX-LIX in FIG. 58.

FIG. 58 is a cross-sectional view of a blower using the centrifugal fan in FIG. 57. FIG. 59 is a cross-sectional view of the blower taken along a line LIX-LIX in FIG. 58. Referring to FIG. 58 and FIG. 59, a blower 120 has a driving motor 128, centrifugal fan 710, and a casing 129 inside an outer casing 126.

The output shaft of driving motor 128 is coupled to boss portion 716 of centrifugal fan 710. Casing 129 has a guide wall 129$a$. Guide wall 129$a$ is formed by an approximately ¾ arc disposed on the periphery of centrifugal fan 710. Guide wall 129$a$ is formed to guide an airflow generated by rotation of fan blade 721 to the rotational direction of fan blade 721 while increasing the speed of the airflow.

Casing 129 has an intake portion 130 and an outlet portion 127. Intake portion 130 is formed to be positioned on an extension of center axis 801. Outlet portion 127 is formed to be open to one side of the tangent direction of guide wall 129*a* from part of guide wall 129*a*. Outlet portion 127 is shaped like a prismatic cylinder protruding from part of guide wall 129*a* to one side of the tangent direction of guide wall 129*a*.

Driven by driving motor 128, centrifugal fan 710 rotates in the direction shown by arrow 103. Here, air is taken in from intake portion 130 to the inside of casing 129 and is output from a radially inside space 131 to a radially outside space 132 of centrifugal fan 710. The air output to radially outside space 132 circumferentially flows in the direction shown by an arrow 104 and is blown to the outside through outlet portion 127.

Figure 60:
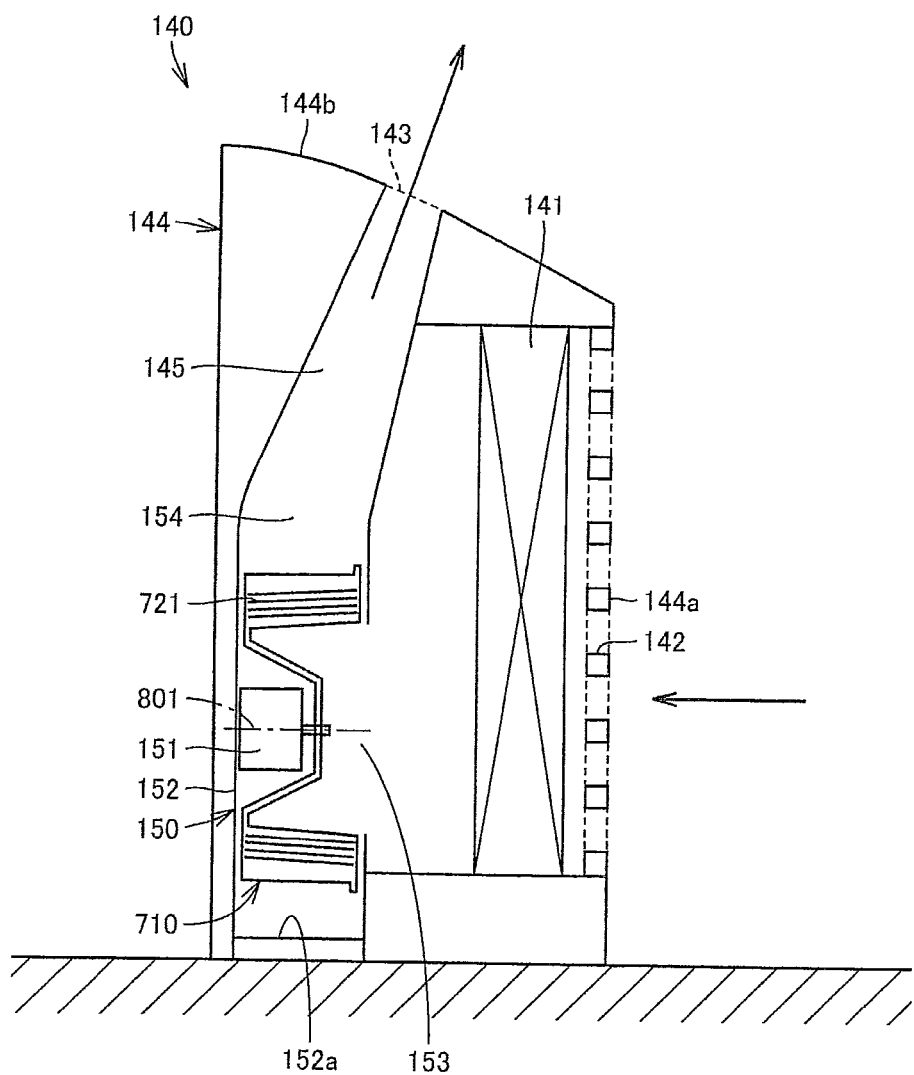
FIG. 60 is a cross-sectional view of an air purifier using the centrifugal fan in FIG. 57.

FIG. 60 is a cross-sectional view of an air purifier using the centrifugal fan in FIG. 57. Referring to FIG. 60, an air purifier 140 has a housing 144, a blower 150, a duct 145, and an HEPA (High Efficiency Particulate Air Filter) filter 141.

Housing 144 has a rear wall 144*a* and a top wall 144*b*. Housing 144 has an intake port 142 for sucking the air in the room in which air purifier 140 is installed. Intake port 142 is formed at rear wall 144*a*. Housing 144 further has an outlet port 143 discharging the purified air to the inside of the room. Outlet port 143 is formed at top wall 144*b*. Air purifier 140 is generally installed against a wall such that rear wall 144*a* is opposed to a wall in the room.

Filter 141 is disposed to face intake port 142 in the inside of housing 144. The air introduced to the inside of housing 144 through intake port 142 passes through filter 141. The foreign matters in the air are thus removed.

Blower 150 is provided to suck the room air to the inside of housing 144 and to output the air purified by filter 141 to the room through outlet port 143. Blower 150 has centrifugal fan 710, a casing 152, and a driving motor 151. Casing 152 has a guide wall 152*a*. Casing 152 has an intake portion 153 and an outlet portion 154.

Duct 145 is provided above blower 150 and is provided as an air channel for guiding the purified air from casing 152 to outlet port 143. Duct 145 has a prismatic cylindrical shape with its lower end connecting to outlet portion 154 and with its upper end open. Duct 145 is configured to guide the purified air blown from outlet portion 154 to a laminar flow toward outlet port 143.

In air purifier 140 having such a configuration, blower 150 is driven to rotate fan blades 721 to cause the room air to be taken in from intake port 142 to the inside of housing 144. Here, an airflow is generated between intake port 142 and outlet port 143, and foreign matters such as dust included in the intake air are removed by filter 141.

The purified air obtained by passage through filter 141 is taken in to the inside of casing 152. Here, the purified air taken in to the inside of casing 152 forms a laminar flow through guide wall 152*a* around fan blades 721. The air in the form of a laminar flow is guided to outlet portion 154 along guide wall 152*a* and blown from outlet portion 154 to the inside of duct 145. The air is discharged from outlet port 143 toward the external space.

Although an air purifier has been described by way of example in this embodiment, the centrifugal fan in the present invention is also applicable to a fluid feeding device such as, for example, an air conditioner, a humidifier, a cooling device, and a ventilating device.

Centrifugal fan 710 and air purifier 140 in the ninth embodiment of the present invention configured in this manner can achieve the effects described in the seventh embodiment similarly.

The structures of the fans described in the foregoing seventh to ninth embodiments may be combined as appropriate to configure a new fan. For example, centrifugal fan 710 in the ninth embodiment may be configured using the fan blades described in the eighth embodiment.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

The present invention is mainly applied to home electric equipment having an air blowing function, such as an air purifier and an air conditioner.

DESCRIPTION OF THE REFERENCE SIGNS

10 centrifugal fan, 12, 12A, 12B, 12C impeller, 13 peripheral frame, 13*a*, 13*b* end surface, 14 disk portion, 16 boss portion, 21, 21A, 21B, 21C, 21D, 21E fan blade, 23 blade surface, 24 suction surface, 25 pressure surface, 26 inner edge portion, 27 outer edge portion, 31, 61 air flow, 32, 62, 63, 67, 68 vortex, 41, 41A, 41B flection portion, 51, 51*p*, 51*q*, 52, 52*p*, 52*q* convex portion, 56, 57, 57*p*, 57*q* concave portion, 100 cross-flow fan, 101 center axis, 106 center axis, 110 molding die, 112 movable die, 114 stationary die, 116 cavity, 120, 150, 215 blower, 126 outer casing, 127, 154 outlet portion, 128, 151 driving motor, 129, 152, 222 casing, 129*a*, 152*a* guide wall, 130, 153 intake portion, 131 radially inside space, 132 radially outside space, 140 air purifier, 141 filter, 142, 224 intake port, 143, 225 outlet port, 144 housing, 144*a* rear wall, 144*b* top wall, 145 duct, 210 air conditioner, 220 indoor unit, 222A, 222B cabinet, 226 air flow channel, 228 air filter, 229 indoor heat exchanger, 231 horizontal louver, 232 vertical louver, 241 upstream region, 242 downstream region, 246 upstream outside space, 247 inside space, 248 downstream outside space, 251 front wall portion, 252 rear wall portion, 253, 254 protrusion portion, 256 upper guide portion, 257 lower guide portion, 262 forced vortex, 410 centrifugal fan, 412, 412A, 412B, 412C impeller, 413 peripheral frame, 413*a*, 413*b* end surface, 414 disk portion, 416 boss portion, 421, 421A to 421G fan blade, 423 blade surface, 424 suction surface, 425 pressure surface, 426 inner edge portion, 427 outer edge portion, 428 inner peripheral blade tip portion, 429 outer peripheral blade tip portion, 441, 441*p*, 441*q*, 441*r* flection portion, 456, 457 concave portion, 500 cross-flow fan, 501 center axis, 506 center line, 601, 602, 603 scroll shape, 606 approach place, 607 midpoint, 631 contact point, 632, 636, 638 straight line, 633 chord line, 637, 639 tangent, 710 centrifugal fan, 712, 712A, 712B, 712C impeller, 713 peripheral frame, 713*a*, 713*b* end surface, 714 disk portion, 716 boss portion, 721, 721A to 721G fan blade, 723 blade surface, 724 suction surface, 725 pressure surface, 726 inner edge portion, 727 outer edge portion, 728 inner peripheral blade tip portion, 729 outer peripheral blade tip portion, 741, 741*p*, 741*q*, 741*r* flection portion, 756, 757 concave portion, 800 cross-flow fan, 801 center axis, 806 center line, 906 approach place, 907 midpoint, 936, 938 straight line, 937, 939 tangent.

The invention claimed is:

1. A fan comprising:
a plurality of blade portions arranged spaced apart from each other in a circumferential direction, each blade portion of said plurality of blade portions having an inner edge portion disposed on an inner peripheral side thereof and an outer edge portion disposed on an outer peripheral side thereof, wherein
said blade portion has a blade surface extending between said inner edge portion and said outer edge portion and including a pressure surface disposed on a rotational direction side of the fan and a suction surface disposed on a back side of said pressure surface,
as the fan is rotated, a fluid flow is produced on said blade surface to flow between said inner edge portion and said outer edge portion,
when cut along a plane orthogonal to a rotation axis of the fan, said blade portion has a blade cross section having concave portions formed at said pressure surface and said suction surface,
a plurality of said blade portions include a first blade portion and a second blade portion having blade cross sections of different shapes,
said first blade portion and said second blade portion are different from each other in number of said concave portions.

2. The fan according to claim 1, wherein said first blade portion and said second blade portion are different from each other in positions of said concave portions.

3. The fan according to claim 1, wherein said first blade portion and said second blade portion are different from each other in shape of said concave portions.

4. The fan according to claim 1, wherein a plurality of said blade portions are arranged such that an angle of a line connecting the rotation axis of the fan with said outer edge portion is equal between adjacent said blade portions.

5. The fan according to claim 1, wherein said concave portion formed at said pressure surface forms a convex portion at said suction surface, and said concave portion formed at said suction surface forms a convex portion at said pressure surface.

6. The fan according to claim 1, wherein said blade portion has a blade cross section having a constant thickness between said inner edge portion and said outer edge portion.

7. The fan according to claim 1, wherein
an inside space is formed inside a plurality of said blade portions arranged in the circumferential direction, and an outside space is formed outside thereof, and
the fan is a centrifugal fan that outputs fluid from said inside space to said outside space.

8. A molding die for use to mold the fan of claim 1, the fan being formed of resin.

9. A fluid feeder comprising a blower configured with the fan of claim 1 and a driving motor coupled to said fan to rotate a plurality of said blade portions.

10. A fan comprising:
a plurality of blade portions arranged spaced apart from each other in a circumferential direction, each blade portion of said plurality of blade portions having an inner edge portion disposed on an inner peripheral side thereof and an outer edge portion disposed on an outer peripheral side thereof, wherein
said blade portion has a blade surface extending between said inner edge portion and said outer edge portion and including a pressure surface disposed on a rotational direction side of the fan and a suction surface disposed on a back side of said pressure surface,
as the fan is rotated, a fluid flow is produced on said blade surface to flow between said inner edge portion and said outer edge portion,
when cut along a plane orthogonal to a rotation axis of the fan, said blade portion has a blade cross section having concave portions formed at said pressure surface and said suction surface,
a plurality of said blade portions include a first blade portion and a second blade portion having blade cross sections of different shapes, and
a plurality of said blade portions are arranged such that an angle of a line connecting the rotation axis of the fan with a centroid of the blade cross section of said blade portion is equal between adjacent said blade portions.

11. A fan comprising:
a plurality of blade portions arranged spaced apart from each other in a circumferential direction, each blade portion of said plurality of blade portions having an inner edge portion disposed on an inner peripheral side thereof and an outer edge portion disposed on an outer peripheral side thereof, wherein
said blade portion has a blade surface extending between said inner edge portion and said outer edge portion and including a pressure surface disposed on a rotational direction side of the fan and a suction surface disposed on a back side of said pressure surface,
as the fan is rotated, a fluid flow is produced on said blade surface to flow between said inner edge portion and said outer edge portion,
when cut along a plane orthogonal to a rotation axis of the fan, said blade portion has a blade cross section having concave portions formed at said pressure surface and said suction surface,
a plurality of said blade portions include a first blade portion and a second blade portion having blade cross sections of different shapes, and
plural kinds of said blade portions having blade cross sections of different shapes are arranged to be placed in an irregular order.

12. A fan comprising:
a plurality of blade portions arranged spaced apart from each other in a circumferential direction, each blade portion of said plurality of blade portions having an inner edge portion disposed on an inner peripheral side thereof and an outer edge portion disposed on an outer peripheral side thereof, wherein
said blade portion has a blade surface extending between said inner edge portion and said outer edge portion and including a pressure surface disposed on a rotational direction side of the fan and a suction surface disposed on a back side of said pressure surface,
as the fan is rotated, a fluid flow is produced on said blade surface to flow between said inner edge portion and said outer edge portion,
when cut along a plane orthogonal to a rotation axis of the fan, said blade portion has a blade cross section having concave portions formed at said pressure surface and said suction surface,
a plurality of said blade portions include a first blade portion and a second blade portion having blade cross sections of different shapes,
said blade portion has flection portions at which a center line of the blade cross section between said pressure surface and said suction surface is flexed at different points, and
said concave portions are formed of said flection portions.

13. A fan comprising:
a plurality of blade portions arranged spaced apart from each other in a circumferential direction, each blade portion of said plurality of blade portions having an inner edge portion disposed on an inner peripheral side thereof and an outer edge portion disposed on an outer peripheral side thereof, wherein
said blade portion has a blade surface extending between said inner edge portion and said outer edge portion and including a pressure surface disposed on a rotational direction side of the fan and a suction surface disposed on a back side of said pressure surface,
as the fan is rotated, a fluid flow is produced on said blade surface to flow between said inner edge portion and said outer edge portion,
when cut along a plane orthogonal to a rotation axis of the fan, said blade portion has a blade cross section having concave portions formed at said pressure surface and said suction surface,
a plurality of said blade portions include a first blade portion and a second blade portion having blade cross sections of different shapes,
an inside space is formed inside a plurality of said blade portions arranged in the circumferential direction, and an outside space is formed outside thereof, and
the fan is a cross-flow fan that takes in fluid to said inside space from said outside space on one side with respect to the rotation axis, as viewed from a direction of the rotation axis of the fan, and outputs the taken-in fluid to said outside space on the other side with respect to the rotation axis.

\* \* \* \* \*